US00RE40571E

(19) United States
(12) Reissued Patent
Ohmatsuzawa et al.

(10) Patent Number: US RE40,571 E
(45) Date of Reissued Patent: Nov. 11, 2008

(54) CATALYST FOR POLYESTER PRODUCTION, PROCESS FOR PRODUCING POLYESTER USING THE CATALYST, POLYESTER OBTAINED BY THE PROCESS, AND USES OF THE POLYESTER

(75) Inventors: Takeshi Ohmatsuzawa, Tokyo (JP); Fujito Ehara, Yamaguchi (JP); Hideshi Hori, Yamaguchi (JP); Kazuo Toyota, Yamaguchi (JP); Kenzaburou Fukutani, Yamaguchi (JP); Junichi Imuta, Tokyo (JP); Akiyoshi Shimizu, Yamaguchi (JP); Takayuki Onogi, Sodegaura (JP); Seiji Noda, Shimonoseki (JP); Masayuki Sakai, Tokyo (JP); Shoji Hiraoka, Yamaguchi (JP); Koji Nakamachi, Tokyo (JP); Michio Tsugawa, Sodegaura (JP); Satoru Miyazoe, Sodegaura (JP)

(73) Assignee: Mitsui Chemicals, Inc., Tokyo (JP)

(21) Appl. No.: 10/942,080

(22) Filed: Sep. 16, 2004

Related U.S. Patent Documents

Reissue of:
(64) Patent No.: 6,451,959
Issued: Sep. 17, 2002
Appl. No.: 10/024,319
Filed: Dec. 21, 2001

U.S. Applications:
( 62) Division of application No. 09/470,664, filed on Dec. 22, 1999, now Pat. No. 6,346,070.

(30) Foreign Application Priority Data

| | | |
|---|---|---|
| Dec. 25, 1998 | (JP) | 371609/1998 |
| Jun. 22, 1999 | (JP) | 175596/1999 |
| Jun. 22, 1999 | (JP) | 175597/1999 |
| Jul. 13, 1999 | (JP) | 198847/1999 |
| Jul. 13, 1999 | (JP) | 198848/1999 |
| Jul. 14, 1999 | (JP) | 200393/1999 |
| Jul. 19, 1999 | (JP) | 204948/1999 |
| Aug. 12, 1999 | (JP) | 228859/1999 |
| Aug. 12, 1999 | (JP) | 228860/1999 |
| Aug. 12, 1999 | (JP) | 228861/1999 |
| Aug. 13, 1999 | (JP) | 229320/1999 |
| Sep. 24, 1999 | (JP) | 269709/1999 |
| Sep. 24, 1999 | (JP) | 269710/1999 |
| Oct. 14, 1999 | (JP) | 292332/1999 |

(51) Int. Cl.
*C08G 63/82* (2006.01)

(52) U.S. Cl. ..... 528/279; 524/779; 524/780; 524/781; 524/782; 524/783; 524/784; 524/785; 524/786; 524/788; 524/789; 528/272; 528/274; 528/277; 528/280; 528/281; 528/282; 528/283; 528/285; 528/286; 528/308; 528/308.1; 528/308.2; 528/308.3

(58) Field of Classification Search ..... 524/274, 524/277, 279, 280, 281, 282, 779, 780, 781, 524/782, 783, 784, 785, 786, 788, 789; 528/283, 528/285, 286, 308, 308.1, 308.2, 308.3
See application file for complete search history.

(56) References Cited

U.S. PATENT DOCUMENTS

| | | | | |
|---|---|---|---|---|
| 3,056,817 | A | | 10/1962 | Werber et al. |
| 3,463,742 | A | | 8/1969 | Bell et al. |
| 3,663,600 | A | | 5/1972 | McConnell et al. |
| 3,965,071 | A | | 6/1976 | McClelland |
| 4,128,533 | A | | 12/1978 | Kohler et al. |
| 4,374,949 | A | | 2/1983 | Massey et al. |
| 4,408,067 | A | * | 10/1983 | Nakamura et al. ..... 560/215 |
| 5,268,503 | A | | 12/1993 | Karasawa et al. |
| 5,270,444 | A | | 12/1993 | Shiraki et al. |
| 5,656,716 | A | | 8/1997 | Schmidt et al. |
| 5,684,116 | A | | 11/1997 | Nartl et al. |
| 5,688,899 | A | | 11/1997 | Strand et al. |
| 5,789,528 | A | | 8/1998 | Martl et al. |
| 5,852,164 | A | | 12/1998 | Akai et al. |
| 6,365,659 | B1 | | 4/2002 | Aoyama et al. |

FOREIGN PATENT DOCUMENTS

| | | | | |
|---|---|---|---|---|
| CH | 455290 | A | | 6/1968 |
| CH | 655 938 | A5 | | 5/1986 |
| EP | 0 389 948 | A2 | | 10/1990 |
| EP | 0 854 175 | A2 | | 7/1998 |
| EP | 0 867 458 | A2 | | 9/1998 |
| GB | 1179356 | B | | 1/1970 |
| JP | 43-18609 | | | 8/1943 |
| JP | 47-26597 | B | | 7/1972 |
| JP | 48-000892 | | | 1/1973 |
| JP | 49007356 | B4 | | 2/1974 |
| JP | 49011754 | B | | 3/1974 |
| JP | 49 011754 | B | | 3/1974 |
| JP | 50-8888 | | | 1/1975 |
| JP | 50-34092 | A | | 4/1975 |
| JP | 50034092 | | * | 4/1975 |
| JP | 50-156595 | A | | 12/1975 |
| JP | 51-37187 | A | | 3/1976 |
| JP | 51037187 | | * | 3/1976 |
| JP | 51-58495 | A | | 5/1976 |
| JP | 51058495 | | * | 5/1976 |
| JP | 51-19477 | B | | 6/1976 |

(Continued)

*Primary Examiner*—Terressa Boykin
(74) *Attorney, Agent, or Firm*—Birch, Stewart, Kolasch & Birch, LLP.

(57) ABSTRACT

The present invention provides a catalyst for polyester production capable of producing a polyester with high catalytic activity, a process for producing a polyester using the catalyst and a polyester produced thereby. The catalyst comprises a solid titanium compound obtained by dehydrodrying a hydrolyzate obtained by hydrolysis of a titanium halide and which has a molar ratio (OH/Ti) of a hydroxyl group (OH) to titanium (Ti) exceeding 0.09 and less than 4. In the process, the polyester is obtained by polycondensing an aromatic dicarboxylic acid, or an ester-forming derivative thereof, and an aliphatic diol, or ester-forming derivative thereof, in the presence of the catalyst. The resulting polyester has excellent transparency and tint, a titanium content of 1 to 100 ppm, a magnesium content of 1 to 200 ppm and a magnesium to titanium weight ratio of not less than 0.01.

56 Claims, 2 Drawing Sheets

FOREIGN PATENT DOCUMENTS

| | | | |
|---|---|---|---|
| JP | 52-57291 | A | 5/1977 |
| JP | 53-24392 | A | 3/1978 |
| JP | 55-13715 | A | 1/1980 |
| JP | 55-13715 | A | 1/1980 |
| JP | 55-003426 | | 1/1980 |
| JP | 55-23136 | A | 2/1980 |
| JP | 55-023136 | | 2/1980 |
| JP | 58-120633 | | 7/1983 |
| JP | 59-25815 | A | 2/1984 |
| JP | 59-30854 | A | 2/1984 |
| JP | 59-219328 | A | 12/1984 |
| JP | 62-199648 | A | 9/1987 |
| JP | 5-43677 | A | 2/1993 |
| JP | 5-97990 | A | 4/1993 |
| JP | 6-3498050 | A | 12/1994 |
| JP | 64920 | B2 | 7/1995 |
| JP | 08-020638 | | 1/1996 |
| JP | 8-41182 | A | 2/1996 |
| JP | 8-99354 | A | 4/1996 |
| JP | 08-208822 | | 8/1996 |
| JP | 8-283393 | A | 10/1996 |
| JP | 8-283393 | A | 10/1996 |
| JP | 8-283394 | A | 10/1996 |
| JP | 9-40853 | A | 2/1997 |
| JP | 9-110998 | A | 4/1997 |
| JP | 09-507514 | | 7/1997 |
| JP | 10-067924 | | 3/1998 |
| JP | 11-130856 | A | 5/1999 |
| JP | 2000-109552 | A | 4/2000 |
| JP | 2000-169683 | A | 6/2000 |
| JP | 2000-226444 | A | 8/2000 |
| JP | 2001-048966 | | 2/2001 |
| JP | 2001-81161 | A | 3/2001 |
| JP | 2001-064377 | | 3/2001 |
| JP | 2001-064378 | | 3/2001 |
| WO | 97/47675 | A1 | 12/1997 |
| WO | 98/38235 | A1 | 9/1998 |
| WO | 98/56848 | A1 | 12/1998 |
| WO | 00/24827 | A1 | 5/2000 |

* cited by examiner

CATALYST FOR POLYESTER PRODUCTION, PROCESS FOR PRODUCING POLYESTER USING THE CATALYST, POLYESTER OBTAINED BY THE PROCESS, AND USES OF THE POLYESTER

Matter enclosed in heavy brackets [ ] appears in the original patent but forms no part of this reissue specification; matter printed in italics indicates the additions made by reissue.

This application is a divisional of application Ser. No. 09/470,664, filed Dec. 22, 1999, now U.S. Pat. No. 6,346,070.

FIELD OF THE INVENTION

The present invention relates to a catalyst for polyester production, a process for producing a polyester using the catalyst, a polyester obtained by the process and uses of the polyester.

BACKGROUND OF THE INVENTION

Because of their excellent mechanical strength, heat resistance, transparency and gas barrier properties, polyesters such as polyethylene terephthalate are favorably used as not only materials of containers of various beverages such as juice, soft drinks and carbonated beverages but also materials of films, sheets and fibers.

The polyesters can be generally produced using, as starting materials, dicarboxylic acids such as aromatic dicarboxylic acids and diols such as aliphatic diols. In more detail, a dicarboxylic acid and a diol are first subjected to esterification reaction to form a low condensate (low molecular weight polyester), and the low condensate is then subjected to deglycolation reaction (liquid phase polycondensation) to increase the molecular weight. In some cases, solid phase polycondensation is performed to further increase the molecular weight.

In the process for producing polyesters mentioned above, a conventional antimony compound, a conventional germanium compound or the like is used as a polycondensation catalyst.

However, the polyester produced by the use of the antimony compound as a polycondensation catalyst is inferior to the polyester produced by the use of a germanium compound as a polycondensation catalyst in the transparency and the heat resistance. In the use of the antimony compound as a polycondensation catalyst, further, the acetaldehyde content in the resulting polyester is desired to be decreased. On the other hand, the germanium compound is considerably expensive, so that the production cost of polyester becomes high. To decrease the production cost, a process including recovering the germanium compound scattered during the polycondensation and reusing it has been studied.

By the way, it is known chat titanium is an element having a function of promoting polycondensation reaction of a low condensate. Titanium compounds such as titanium alkoxide, titanium tetrachloride, titanyl oxalate and orthotitanic acid are publicly known as polycondensation catalysts, and various studies have been made to utilize such titanium compounds as the polycondensation catalysts.

However, when the conventional titanium compounds are used as the polycondensation catalysts, their activity is inferior to that of the antimony compound or the germanium compounds. In addition, the resulting polyester has a problem of being markedly colored yellow, and hence they have not been put into practical use yet. In the industrial production of polyesters using these titanium compounds as the polycondensation catalysts, further, there is a problem of corrosion caused by elution of chlorine content in case of catalysts containing a large amount of chlorine, such as titanium tetrachloride and partial hydrolyzate of titanium tetrachloride. Therefore, catalysts having low chlorine content are sometimes desired.

Under such circumstances as described above, catalysts for polyester production capable of producing polyesters with high polycondensation activity or catalysts for polyester production capable of producing such polyesters as satisfy any one of requirements of low acetaldehyde content, high transparency and excellent tint with high catalytic activity are desired.

There are also desired a process for producing polyesters by which polyesters having desired intrinsic viscosity (IV) can be obtained for a short period of time, a process for producing polyesters by which polyesters having low acetaldehyde content can be obtained with high polymerization activity, and a process for producing polyesters by which polyesters having excellent tint can be obtained with high polymerization activity.

As described above, the polyester, particularly polyethylene terephthalate, is favorably used as a material of containers of beverages such as juice, soft drinks and carbonated beverages.

To produce a blow molded article from the polyester, the polyester is fed to a molding machine such as an injection molding machine to form a preform for a blow molded article, then the preform is inserted in a mold of a given shape, and the preform is subjected to stretch blow molding and a heat treatment (heat setting)

As for the molded product obtained from the conventional polyester such as conventional polyethylene terephthalate, however, the content of acetaldehyde is increased during the molding and the acetaldehyde remains in the resulting molded product, so that flavor or scent of the contents filled in the molded product is sometimes considerably deteriorated As a process for producing polyethylene terephthalate having small increase of the acetaldehyde content during the molding, a process, which includes treating a particulate polyethylene terephthalate with water vapor of 110° C. or higher prior to solid phase polycondensation of the polyethylene terephthalate, is disclosed in Japanese Patent Laid-Open Publication No 25815/1984, or a process for producing polyethylene terephthalate of high polymerization degree, which includes a step of moisture controlling polyethylene terephthalate having an intrinsic viscosity of not less than 0.4 dl/g and a density of not more than 1.35 g/cm$^3$ to vary the moisture content to not less than 0.2% by weight, a step of precrystallizing the polyethylene terephthalate at a temperature of 140° C. or higher, and a step of solid phase polymerization at a temperature of 180 to 240° C. in an inert gas atmosphere or reduced pressure, is disclosed in Japanese Patent Laid-Open Publication No. 219328/1984.

However, the increase of the acetaldehyde content in the polyethylene terephthalate obtained by these processes cannot be lowered down below a certain level.

In Japanese Patent Laid-Open Publication No. 97990/1993, a method for treating polyethylene terephthalate comprising bringing pellets of polyethylene terephthalate having been subjected to solid phase polymerization into contact with a phosphoric acid aqueous solution having a concentration of not less than 1 ppm is disclosed.

In this method, however, the phosphoric acid functions as an aced catalyst to perform hydrolysis, and as a result, decrease of the intrinsic viscosity is accelerated during the melt molding.

The conventional polyester, e.g., polyethylene terephthalate, contains oligomers such as a cyclic trimer, and the oligomers such as a cyclic trimer adhere to an inner surface of a mold for blow molding or a gas exhaust vent or a gas exhaust pipe of a mold to cause stain of the mold, or adhere to a vent zone of an injection molding machine. The stain of the mold causes surface roughening or whitening of the resulting blow molded article. The whitened blow molded article must be discarded. In the production of a blow molded article using the conventional polyester, the stain of the mold must be frequently removed, and this results in conspicuous lowering of productivity of the blow molded article.

In addition, the polyester obtained by the use of the antimony compound or the germanium compound as a polycondensation catalyst sometimes has low melt flowability and is insufficient in the moldability.

Under such circumstances as described above, there is desired a polyester having a low acetaldehyde content, hardly increased in the acetaldehyde content during the molding and hardily causing stain of a mold or a polyester having high melt flowability and excellent moldability.

Further, there is also desired a polyester molded product having excellent transparency and tint or a molded product such as a blow molded article preform or a blow molded article, e.g., a polyester blow molded article having a low content of a cyclic primer.

One of the present applicants has found that the main cause of the stain of a mold in the molding process resides in that large amounts of oligomers such as a cyclic trimer are produced in the molding of the polyester to increase the total amount of the oligomers such as a cyclic trimer contained in the polyester, and has also found that the increase of the oligomers such as a cyclic trimer can be remarkably inhibited by bringing polyester obtained through the solid phase polycondensation into contact with water of the like, so they have proposed this in Japanese Patent Laid-Open Publication No. 283393/1996

OBJECT OF THE INVENTION

The present invention has been made in view of the prior arts as described above, and it is an object of the invention to provide a catalyst for polyester production capable of producing a polyester with high catalytic activity or a catalyst for polyester production capable of producing such a polyester of high quality as satisfies any ore of requirements of a low acetaldehyde content, high transparency and excellent tint with high catalytic activity.

It is another object of the invention to provide a process for producing a polyester by which a polyester having a desired intrinsic viscosity (IV) can be obtained for a short period of time, a process for producing a polyester by which a polyester having a low acetaldehyde content can be produced with high polymerization activity, and a process for producing a polyester by which a polyester having excellent tint can be obtained with high polymerization activity.

It is a further object of the invention to provide a polyester having small increase of the acetaldehyde content during the molding, particularly a polyester having a low acetaldehyde content and small increase of the acetaldehyde content during the molding, a polyester hardly bringing about stain of a mold, a polyester having excellent transparency and tint, or a polyester having high melt flowability and excellent moldability.

It is a still further object of the invention to provide a Polyester molded product having excellent transparency and tint or a polyester molded product such as a blow molded article prrform or a blow molded article, e.g., a polyester blow molded article having a low content of a cyclic trimer.

SUMMARY OF THE INVENTION

One embodiment of the catalyst for polyester production according to the present invention includes:

a catalyst for polyester production, comprising a solid titanium compound (I-a) which is obtained by dehydro-drying a hydrolyzate obtained by hydrolyzing a titanium halide and has a molar ratio (OH/Ti) of a hydroxyl group (OH) to titanium (Ti) exceeding 0.09 and less than 4;

a catalyst for polyester production, comprising a titanium-containing solid compound (I-b) which is obtained by dehydro-drying a hydrolyzate obtained by hydrolyzing a mixture of a titanium halide and a compound of at least one element selected from elements other than titanium or a precursor of the compound and has a molar ratio (OH/Ti) of a hydroxyl group (OH) to titanium (Ti) exceeding 0.09 and less than 4; and a catalyst for polyester production, comprising:

(I) a polycondensation catalyst component comprising the solid titanium compound (I-a) and/or the titanium-containing solid compound (I-b), and (II) a co-catalyst component comprising a compound of at least one element selected from the group consisting of beryllium, magnesium, calcium, strontium, barium, boron, aluminum, gallium, manganese, cobalt, zinc, germanium, antimony and phosphorus.

Another embodiment of the catalyst for polyester production according to the present invention includes:

a catalyst for polyester production, comprising:

(I) a polycondensation catalyst component comprising a solid titanium compound (I-c) obtained by dehydro-drying a hydrolyzate obtained by hydrolyzing a titanium halide, and (II) a co-catalyst component comprising a compound of at least one element selected from the group consisting of beryllium, magnesium, calcium, strontium, barium, boron, aluminum, gallium, manganese, cobalt, zinc, germanium, antimony and phosphorus;

a catalyst for polyester production, comprising a titanium-containing solid compound (I-d) obtained by dehydro-drying a hydrolyzate obtained by hydrolyzing a mixture of a titanium halide and a compound of at least one element selected from elements other than titanium or a precursor of the compound; and a catalyst for polyester production, comprising:

(I) a polycondensation catalyst component comprising the titanium-containing solid compound (I-d), and (II) a co-catalyst component comprising a compound of at least one element selected from the group consisting of beryllium, magnesium, calcium, strontium, barium, boron, aluminum, gallium, manganese, cobalt, zinc, germanium, antimony and phosphorus.

In the catalyst for polyester production described above, the co-catalyst component (II) is preferably a magnesium compound.

A further embodiment of the catalyst for polyester production according to the present invention includes:

a catalyst for polyester production, comprising a solid titanium compound (I-e) obtained by a process comprising bringing a titanium halide into contact with water to hydrolyze the titanium halide and thereby obtain an acid solution containing a hydrolyzate of the titanium halide, rendering the solution basic by the use of a base, then adjusting pH of the solution to 2 to 6 by the use of an acid, and dehydro-drying the resulting precipitate;

a catalyst for polyester production, comprising a solid titanium compound (I-f) obtained by a process comprising bringing a titanium halide into contact with water to hydrolyze the titanium halide and thereby obtain an acid solution containing a hydrolyzate of the titanium halide, adjusting pH of the solution to 2 to 6 by the use of a base, and dehydro-drying the resulting precipitate;

a catalyst for polyester production, comprising:

(I) a polycondensation catalyst component comprising the solid titanium compound (I-e) or the solid titanium compound (I-f),and (II) a co-catalyst component comprising a compound of at least one element selected from the group consisting of beryllium, magnesium, calcium, strontium, barium, boron, aluminum, gallium, manganese, cobalt, zinc, germanium, antimony and phosphorus;

a catalyst for polyester production, comprising a titanium-containing solid compound (I-g) obtained by a process comprising bringing a mixture of a titanium halide and a compound of at leas one element selected from elements other than titanium or a precursor of the compound into contact with water to hydrolyze the titanium halide and thereby obtain an acid solution containing a hydrolyzate of the titanium halide, rendering the solution basic by the use of a base, then adjusting pH of the solution of 2 to 6 by the use of an acid, and dehydro-drying the resulting precipitate;

a catalyst for polyester production, comprising a titanium-containing solid compound (I-h) obtained by a. process comprising bringing a mixture of a titanium halide and a compound of at least one element selected from elements other than titanium or a precursor of the compound into contact with water to hydrolyze the titanium halide and thereby obtain an acid solution containing a hydrolyzate of the titanium halide, adjusting pH of the solution to 2 to 6 by the use of a base, and dehydro-drying the resulting precipitate;

a catalyst for polyester production, comprising:

(I) a polycondensation catalyst component comprising the titanium-containing solid compound (I-g) or (I-h), and (II) a co-catalyst component comprising a compound of at least one element selected from the group consisting of beryllium, magnesium, calcium, strontium, barium, boron, aluminum, gallium, manganese, cobalt, zinc, germanium, antimony and phosphorus In the catalyst for polyester production described above, the co-catalyst component (II) is preferably a magnesium compound.

A still further embodiment of the catalyst for polyester production according to the present invention includes:

a catalyst for polyester production, comprising a solid titanium compound (I-i) which is obtained by dehydro-drying titanium hydroxide and has a crystallinity, as calculated from an X-ray diffraction pattern having 2θ (diffraction angle) of 18° to 35°, of not more than 50%; and a catalyst for polyester production, comprising:

(I) a polycondensation catalyst component comprising the solid titanium compound (I-i), and (II) a co-catalyst component comprising a compound of at least one element selected from the group consisting of beryllium, magnesium, calcium, strontium, barium, boron, aluminum, gallium, manganese, cobalt, zinc, germanium, antimony and phosphorus.

A still further embodiment of the catalyst for polyester production according to the present invention includes:

a catalyst for polyester production, comprising a slurry obtained by heating a mixture of:

(A-1) a hydrolyzate (I-j) obtained by hydrolyzing a titanium compound or a hydrolyzate (I-k) obtained by hydrolyzing a mixture of a titanium compound and a compound of at least one element selected from elements other than titanium or a precursor of the compound, (B) a basic compound, and (C) an aliphatic diol.

In the catalyst for polyester production described above, the basic compound (B) is preferably at least one compound selected from tetraethylammonium hydroxide, tetraethylammonium hydroxide, aqueous ammonia, sodium hydroxide, potassium hydroxide, N-ethylmorpholine and N-methylmorpholine.

The aliphatic diol (C) is preferably ethylene glycol.

A still further embodiment of the catalyst for polyester production according to the present invention includes:

a catalyst for polyester production, comprising:

(A-2) a hydrolyzate (I-m) obtained by hydrolyzing a titanium halide or a hydrolyzate (I-n) obtained by hydrolyzing a mixture of a titanium halide and a compound of at least one element selected from elements other than titanium or a precursor of the compound, and (D) a metallic phosphate containing at least one element selected from beryllium, magnesium, calcium, strontium, boron, aluminum, gallium, manganese, cobalt and zinc; and a catalyst for polyester production, comprising a slurry obtained by heating a mixture of:

(A-2) a hydrolyzate (I-m) obtained by hydrolyzing a titanium halide or a hydrolyzate (I-n) obtained by hydrolyzing a mixture of a titanium halide and a compound of at least one element selected from elements other than titanium or a precursor of the compound, (E) a metallic compound containing at least one element selected from beryllium, magnesium, calcium, strontium, boron, aluminum, gallium, manganese, cobalt and zinc, (F) at least one phosphorus compound selected from phosphoric acid and phosphoric esters, and (G) an aliphatic diol.

In the catalyst for polyester production described above, the metallic phosphate (D) is preferably magnesium hydrogenphosophate or trimagnesium diphosphate. Further, it is preferable that the metallic compound (E) is a magnesium compound, the phosphorus compound (F) is phosphoric acid or trimethyl phosphate, and the aliphatic diol (G) is ethylene glycol.

The heating temperature of the mixture of the components (A-2), (E), (F) and (G) is preferably in the range of 100 to 200° C., and the heating time is preferably in the range of 3 minutes to 5 hours.

In the catalyst for polyester production according to the invention described above, the compound of at least one element selected from elements other than titanium or the precursor of the compound is a compound of at leas one element selected from the group consisting of beryllium, magnesium, calcium, strontium, barium, scandium, yttrium, lanthanum, zirconium, hafnium, vanadium, niobium, tantalum, chromium, molybdenum, tungsten, manganese, iron, ruthenium, cobalt, rhodium, nickel, palladium, copper, zinc, boron, aluminum, gallium, silicon, germanium, tin, antimony and phosphorus, or a precursor of the compound.

One embodiment of the process for producing a polyester according to the present invention is a process comprising polycondensing an aromatic dicarboxylic acid or an ester-forming derivative thereof and an aliphatic diol or an ester-forming derivative thereof in the presence of the above-mentioned catalyst for polyester production.

Another embodiment of the process for producing a polyester according to the present invention is a process comprising an esterification step in which an aromatic dicarboxylic acid or an ester=-forming derivative thereof and an aliphatic diol or an ester-forming derivative thereof are esterified to form a low condensate and a polycondensation step in which the low condensate is polycondensed in the presence of a polycondensation catalyst to increase the molecular weight, wherein:

the polycondensation catalyst used is a catalyst comprising:

(I) a polycondensation catalyst component comprising a hydrolyzate (I-j) obtained by hydrolyzing a titanium compound or a hydrolyzate (I-k) obtained by hydrolyzing a mixture of a titanium compound and a compound of at least one element selected from elements other than titanium or a precursor of the compound, and (II) a co-catalyst compound comprising a compound of at least one element selected from the group consisting of beryllium, magnesium, calcium, strontium, barium, boron, aluminum, gallium, manganese, cobalt, zinc, germanium, antimony and phosphorus; and the polycondensation catalyst component (I) is added to the esterification reactor before the beginning of the esterification reaction or immediately after the beginning of the esterification reaction.

In the process for producing a polyester described above, the co-catalyst component (II) is preferably a magnesium compound.

A further embodiment of the process for producing a polyester according to the present invention is a process comprising polycondensing an aromatic dicarboxylic acid or an ester-forming derivative thereof and an aliphatic diol or an ester-forming derivative thereof in the presence of a polycondensation catalyst selected from the following catalysts (1) to (3) and a phosphoric ester to produce a polyester;

(1) a polycondensation catalyst comprising a hydrolyzate (I-m) obtained by hydrolyzing a titanium halide;

(2) a polycondensation catalyst comprising a hydrolyzate (I-n) obtained by hydrolyzing a mixture of a titanium halide and a compound of at least one element selected from elements other than titanium or a precursor of the compound, and (3) a polycondensation catalyst comprising:

the hydrolyzate (I-m) or (I-n), and a compound of at least one element selected from beryllium, magnesium, calcium, strontium, barium boron, aluminum, gallium, manganese, cobalt, zinc, germanium and antimony, a phosphate or a phosphite.

In the process for producing a polyester described above, the phosphoric ester is preferably tributyl phosphate, trioctyl phosphate or triphenyl phosphate.

A still further embodiment of the process for producing a polyester according to the present invention is a process comprising polycondensing an aromatic dicarboxylic acid or an ester-forming derivative thereof and an aliphatic diol or an ester-forming derivative thereof in the presence of a polycondensation catalyst selected from the following catalysts (1) to (3) and at least one compound selected from cyclic lactone compounds and hindered phenol compounds to produce a polyester;

(1) a polycondensation catalyst comprising a hydrolyzate (I-m) obtained by hydrolyzing a titanium halide, (2) a polycondensation catalyst comprising a hydrolyzate (I-n) obtained by hydrolyzing a mixture of a titanium halide and a compound of at least one element selected from elements other than titanium or a precursor of the compound, and (3) a polycondensation catalyst comprising:

the hydrolyzate (I-m) or (I-n), and a compound of at least one element selected from beryllium, magnesium, calcium, strontium, barium, boron, aluminum, gallium, manganese, cobalt, zinc, germanium and antimony, a phosphate or a phosphite.

In the process for producing a polyester described above, at least one phosphorus compound selected from phosphoric acid and phosphoric esters can be further used in combination.

The at least one compound selected from cyclic lactone compounds and hindered phenol compounds is preferably a mixture of 5,7-di-t-butyl-3-(3,4-dimethylphenyl)-3H-benzofuran-2-one, tetrakis(methylene-3(3,5-di-t-butyl-4-hydroxyphenyl)propionate)methane and tris(2,4-di-t-butylphenyl)phosphite.

A still further embodiment of the process for producing a polyester according to the present invention is a process comprising an esterification step in which an aromatic dicarboxylic acid or an ester-forming derivative thereof and an aliphatic diol or an ester-forming derivative thereof are esterified to form a low condensate and a polycondensation step in which the low condensate is polycondensed in the presence of a polycondensation catalyst to increase the molecular weight, wherein:

the polycondensation catalyst used in a catalyst comprising:

(I) a polycondensation catalyst component comprising a hydrolyzate (I-m) obtained by hydrolyzing a titanium halide or a hydrolyzate (I-n) obtained by hydrolyzing a mixture of a titanium halide and a compound of at least one element selected from elements other than titanium or a precursor of the compound, and (II) a co-catalyst component comprising a compound of at least one element selected from the group consisting of beryllium, magnesium, calcium, strontium, barium, boron, aluminum, gallium, manganese, cobalt, zinc, germanium, antimony and phosphorus; and a tint adjusting agent is added in the esterification step of the polycondensation step.

In the process for producing a polyester described above, the tint adjusting agent is preferably at least one agent selected from Solvent Blue 104, Pigment Red 263, Solvent Red 135, Pigment Blue 29, Pigment Blue 15:1, Pigment Blue 15:3, Pigment Red 187 and Pigment Violet 19.

The co-catalyst component (II) is preferably a magnesium compound.

Embodiments of the method for treating a polyester according to the present invention include:

a method for treating a polyester, comprising bringing a polyester, which is obtained by the use of a titanium compound catalyst and in which the reaction has been completed, into contact with a phosphorous acid aqueous solution, a hypophosphorous acid aqueous solution, a phosphoric ester aqueous solution, a phosphorous ester aqueous solution or a hypophosphorous eater aqueous solution, each of said solutions having a concentration of not less than 10 ppm in terms of phosphorus atom;

a method for treating a polyester, comprising bringing a polyester, which is obtained by the use of a titanium compound catalyst and in which the reaction has been completed, into contact with an organic solvent; and a method for treating a polyester, comprising bringing a polyester, which is obtained by the use of a titanium compound catalyst and in which the reaction has been completed, into contact with an organic solvent solution of phosphoric acid, an organic solvent solution of a phosphoric ester, an organic solvent solution of phosphorous acid, an organic solvent solution of hypophosphorous ester or an organic solvent solution of a hypophosphorous ester, each of said solutions having a concentration of not less than 10 ppm in terms of phosphorus atom.

The polyester preferably has an intrinsic viscosity of not less than 0.50 dl/g, a density of not less than 1.37 g/cm$^3$ and an acetaldehyde content of not more than 5 ppm.

The organic solvent is a solvent selected from alcohols, saturated hydrocarbons and ketones, preferably isopropanol or acetone.

The phosphoric ester is preferably tributyl phosphate, triphenyl phosphate or trimethyl phosphate.

The polyester used in the above method is preferably polyethylene terephthalate.

One embodiment of the polyester according to the present invention is a polyester (P-1) obtained by polycondensing an aromatic dicarboxylic acid or an ester-forming derivative thereof and an aliphatic diol or an ester-forming derivative thereof in the presence of a catalyst for polyester production which comprises:

(I) a polycondensation catalyst component comprising the solid titanium compound (I-c) or the titanium-containing solid compound (I-d), and (II) a co-catalyst compound comprising a magnesium compound, wherein the titanium content is in the range of 1 to 100 ppm, the magnesium content is in the range of 1 to 200 ppm, and the weight ratio (Mg/Ti) of magnesium to titanium is not less than 0.01.

The polyester (P-1) is preferably polyethylene terephthalate.

Another embodiment of the polyester according to the present invention is a polyester (p-2) having the following properties:

a titanium atom is contained in an amount of 0.1 to 200 ppm, a metal atom M selected from beryllium, magnesium, calcium, strontium, barium, boron, aluminum, gallium, manganese, cobalt, zinc and antimony is contained in an amount of 0.1 to 500 ppm, the molar ratio (titanium atom/metal atom M) of the titanium atom to the metal atom M is in the range of 1/50 to 50/1, and a tint adjusting agent is contained in an amount of 0.01 to 100 ppm.

The polyester (P-2) is preferably polyethylene terephthalate.

A further embodiment of the polyester according to the present invention is a polyester (p-3) having the following properties:

the intrinsic viscosity is not less than 0.50 dl/g, a titanium atom is contained in an amount of 0.1 to 200 ppm, a metal atom M selected from beryllium, magnesium, calcium, strontium, barium, boron, aluminum, gallium, manganese, cobalt, zinc and antimony is contained in an amount of 0.1 to 500 ppm, the molar ratio (titanium atom/meal atom M) of the titanium atom to the metal atom M is in the range of 0.05 to 50, and The content of acetaldehyde is not more than 4 ppm, and when this acetaldehyde content is taken as $W_0$ ppm and a content of acetaldehyde in a stepped square plate molded product obtained by heating said polyester to a temperature of 275° C. to melt it and molding the molten polyester is taken as $W_1$ ppm, the value of $W_1-W_0$ is not more than 10 ppm.

In the polyester (P-3), the titanium atom is preferably one derived from a polycondensation catalyst obtained by hydrolysis of a titanium halide.

The polyester (P-3) is preferably polyethylene terephthalate.

A still further embodiment of the polyester according to the present invention is a polyester (P-4) having the following properties:

the intrinsic viscosity is not less than 0.50 dl/g, a titanium atom is contained in an amount of 0.1 to 200 ppm, a metal atom M selected from beryllium, magnesium, calcium, strontium, barium, boron, aluminum, gallium, manganese, cobalt, zinc and antimony is contained in an amount of 0.1 to 500 ppm, the molar ratio (titanium atom/metal atom M) of the titanium atom to the metal atom M is in the range of 0.05 to 50, and the content of a cyclic trimer is not more than 0.5% by weigh, and when this cyclic trimer content is taken as x % by weight and a content of a cyclic trimer in a stepped square plate molded product obtained by heating said polyester to a temperature of 290° C. to melt it and molding the molten polyester is taken as y % by weight, x and y satisfy the following relation $$y \leqq -0.2x+0.2.$$

In the polyester (P-4), the titanium atom is preferably one derived from a polycondensation catalyst obtained by hydrolysis of a titanium halide.

The polyester (P-4) is preferably polyethylene terephthalate

A still further embodiment of the polyester according to the present invention is a polyester (P-5) having the following properties:

when the ratio (L/T) of a flow length (L) to a flow thickness (T) in the injection molding of said polyester at 290° C. is taken as Y and the intrinsic viscosity of a molded product obtained by the injection molding is taken as X (dl/g), X and Y satisfy the following relation $$Y \geqq 647-500X.$$

The Polyester (P-5) is obtained by, for example, polycondensing an aromatic dicarboxylic acid or an ester-forming derivative thereof and an aliphatic diol or an ester-forming derivative hereof in the presence of:

a polycondensation catalyst comprising a hydrolyzate (I-m) obtained by hydrolyzing a titanium halide;

a polycondensation catalyst comprising a hydrolyzate (I-n) obtained by hydrolyzing a mixture of a titanium halide and a compound of at least one element selected from elements other than titanium or a precursor of the compound, or a polycondensation catalyst comprising:

(I) a polycondensation catalyst component comprising the hydrolyzate (I-m) or the hydrolyzate (I-n), and (II) a co-catalyst component comprising a compound of at least one element selected from the group consisting of beryllium, magnesium, calcium, strontium, barium, boron, aluminum, gallium, manganese, cobalt, zinc, germanium, antimony and phosphorus.

The compound of at least one element selected from elements other than titanium or the precursor of the compound is the same compound or precursor as previously described.

The co-catalyst compound (II) is preferably a magnesium compound.

In the polyester (P-5), it is preferable that the titanium atom content is in the range of 1 to 100 ppm, the magnesium atom content is in the range of 1 to 200 ppm, and the weight ratio (Mg/Ti) of the magnesium atom to the titanium atom is not less than 0.01.

The polyester (P-5) is preferably polyethylene terephthalate.

One embodiment of the polyester molded product according to the present invention is a molded product obtained from the polyester (P-1), and examples of the polyester molded products include a blow molded article, a film, a sheet and a fiber.

Another embodiment of the polyester molded product according to the present invention is a blow molded article obtained from the polyester (P-4) and having a cyclic trimer content of not more than 0.6% by weight.

A further embodiment of the polyester molded product according to the present invention is a blow molded article preform or a blow molded article each of which is obtained from the polyester (P-5).

DETAILED DESCRIPTION OF THE INVENTION

Figure 1:
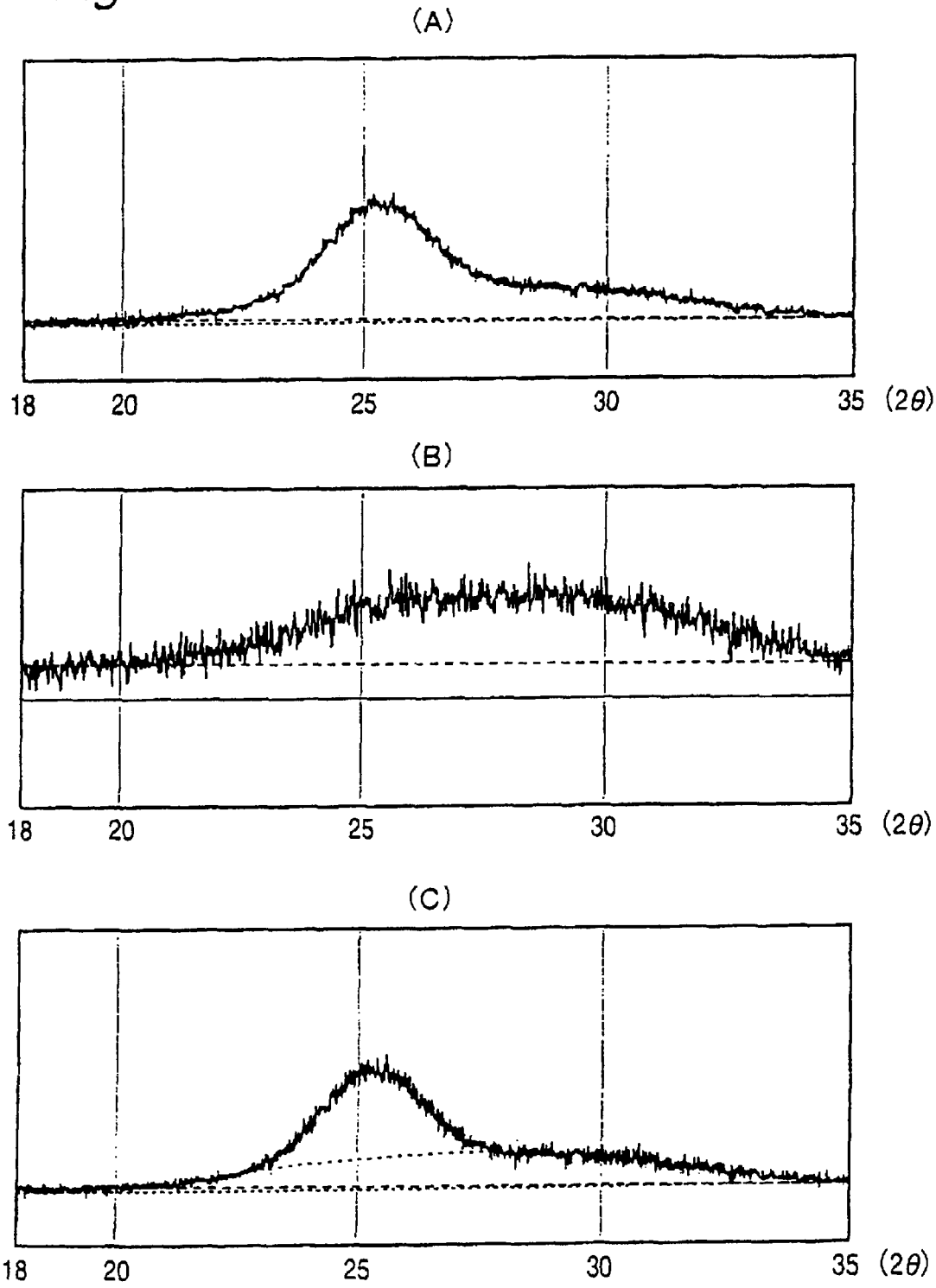
FIG. 1 shows X-ray diffraction patterns to explain a method of measuring a crystallinity of a solid titanium compound.
Figure 2:
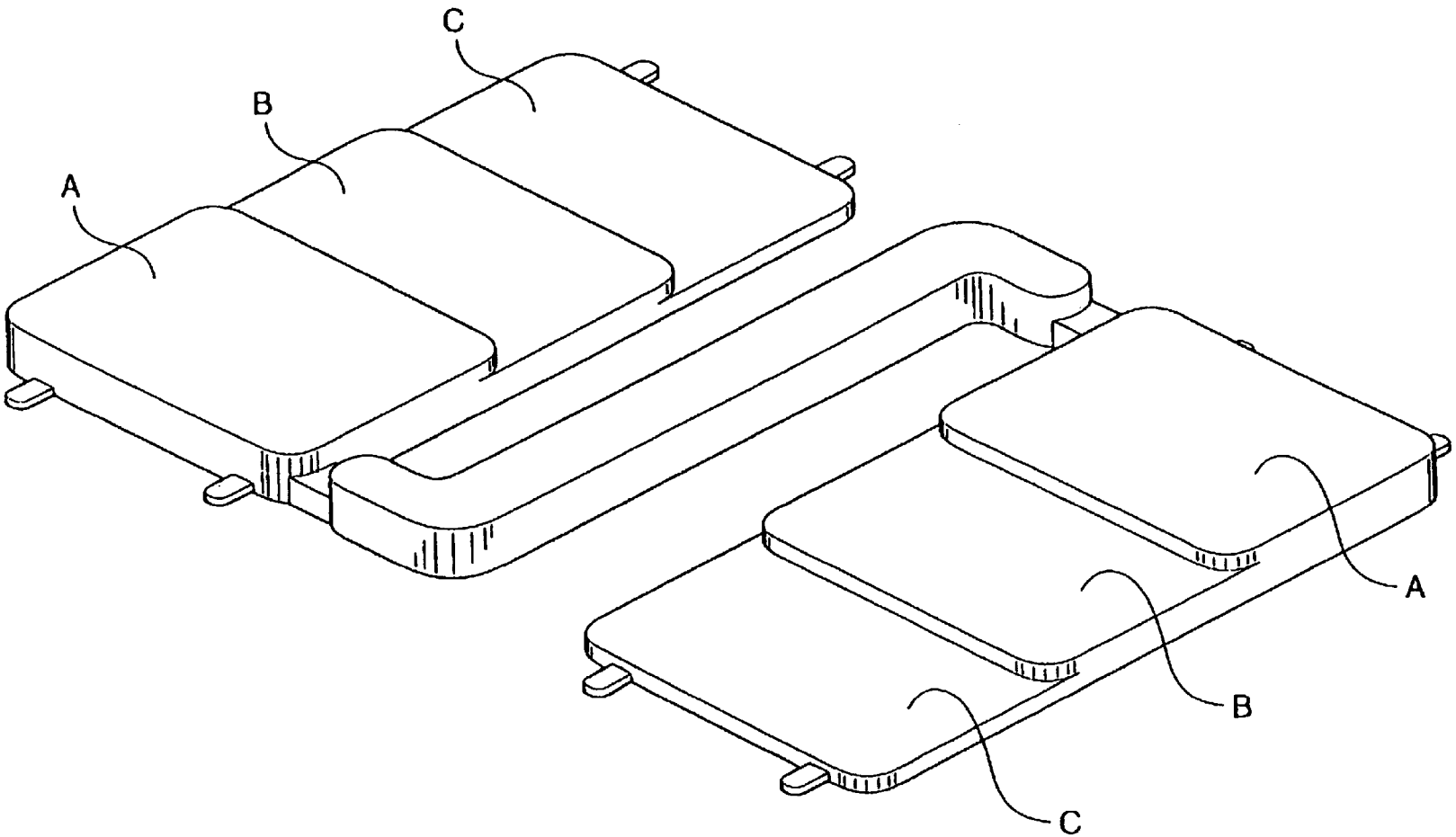
FIG. 2 is a perspective view of a stepped square plate molded product used for measuring a haze, a content of a cyclic trimer and a content of acetaldehyde.

The catalyst for polyester production according to the present invention, a process for producing a polyester using the catalyst, a polyester obtained by the process and uses of the polyester are described in detail hereinafter.

One embodiment of the catalyst for polyester production according to the invention comprises a solid titanium compound (I-a) and/or a titanium-containing solid compound (I-b) described below, and if necessary, a co-catalyst component (II) described below.

Solid Titanium Compound (7-a), Titanium-containing Solid Compound (7-b)

The solid titanium compound (I-a) of the invention is obtained by hydrolyzing a titanium halide and then dehydro-drying the resulting hydrolyzate.

The titanium halide is a compound having at least one titanium atom-halogen atom bond in a molecule. Examples such compounds include titanium tetrahalides, such as titanium tetrachloride, titanium tetrabromide and titanium tetraiodide; titanium trihalides, such as titanium trichloride; titanium dihalides, such as titanium dichloride; and titanium monohalides.

There is no specific limitation on the method to hydrolyze the titanium halide, and for example, there can be mentioned (1) a method of adding the titanium halide to water, (2) a method of adding water into the titanium halide, (3) a method of passing a gas containing vapor of the titanium halide through water, (4) a method of passing a gas containing water vapor through the titanium halide, (5) a method of contacting a gas containing the titanium halide with a gas containing water vapor.

In the present invention, the method of hydrolysis is not specifically limited as described above, but in each method, it is necessary to allow a large excess of water to act on the titanium halide and thereby completely carry out the hydrolysis. If the hydrolysis is not completely carried out and if the resulting hydrolyzate is such a partial hydrolyzate as described in Japanese Patent Publication No. 19477/1976, the polycondensation rate may be insufficient.

The temperature for the hydrolysis is usually not higher than 100° C., preferably in the range of 0 to 70° C.

The titanium-containing solid compound (I-b) of the invention is obtained by hydrolyzing a mixture of a titanium halide and a compound of at least one element selected from elements other than titanium or a precursor of the compound (sometimes referred to as a "compound of another element" hereinafter) and then dehydro-drying the resulting hydrolyzate. That is, the titanium compound is hydrolyzed in the presence of a compound of another element, and the resulting precipitate is dried to obtain the titanium-containing solid compound (I-b)

The compound of another element is a compound of at least one element selected from the group consisting of beryllium, magnesium, calcium, strontium, barium, scandium, yttrium, lanthanum, zirconium, hafnium, vanadium, niobium, tantalum, chromium, molybdenum, tungsten, manganese, iron, ruthenium, cobalt, rhodium, nickel, palladium, copper, zinc, boron, aluminum, gallium, silicon, germanium, tin, antimony and phosphorus (each of these elements sometimes being referred to as "another element" hereinafter), or a precursor of the compound. The compound of another element is, for example, a hydroxide.

The compounds of another element can be used singly or in combination of two or more kinds.

There is no specific limitation on the method to hydrolyze the mixture of the titanium halide and the compound of another element, and for example, there can be mentioned (1) a method of adding the titanium halide to water in which the compound of another element has been dissolved or suspended, (2) a method of adding a mixture of the titanium halide and the compound of another element to water, (3) a method of adding water to a mixture of the titanium halide and the compound of another element, (4) a method adding water, in which the compound of another element has been dissolved or suspended, to the titanium halide, (5) a method of passing a gas containing vapor of the titanium halide through water in which the compound of another element has been dissolved or suspended, (o6) a method of passing a gas containing vapor of the titanium halide and vapor of the compound of another element through water, (7) a method of passing a gas containing water vapor through a mixture of the titanium halide and the compound of another element, (8) a method of passing a gas containing water vapor and vapor of the compound of another element through the titanium halide, and (9) a method of contacting a gas containing the titanium halide, a gas containing the compound of another element and a gas containing water vapor with one another.

In the hydrolysis, the molar ratio (E/Ti) of another element (E) in the compound of another element to titanium (Ti) in the titanium halide is desirably in the range of 1/50 to 50/1. The temperature for the hydrolysis is usually not higher than 100° C., preferably in the range of 0 to 70° C.

When the titanium halide or the mixture of the titanium halide and the compound of another element is hydrolyzed, the resulting liquid exhibits acidic property by virtue of hydrogen halide produced by the hydrolysis of the titanium halide. Because of the acidic property, the hydrolysis is not completed in some cased, so that a base may be added to perform neutralization. Examples of the bases (sometimes referred to as "neutralizing base(s)" hereinafter) employable herein include aqueous ammonia; hydroxides of Group 1 and Group 2 elements of the periodic table, such as sodium hydroxide, potassium hydroxide, magnesium hydroxide; carbonate (hydrogencarbonate) compounds of Groud 1 and Group 2 elements of the periodic table, such as sodium caronate, sodium hydrogencarbonate, potassium carbonate and potassium hydrogencarbonate; urea; and basic organic compounds. At the end point of the neutralization, the pH value is preferably not less than 4, and the neutralization is preferably carried out at a temperature of not higher than 70° C.

The hydrolyzate of the titanium halide or the hydrolyzate of the mixture of the titanium halide and the compound of another element obtained by the hydrolysis is, in this stage, a gel of a hydrous hydroxide (sometimes called "orthotitanic acid") or a hydrous complex hydroxide gel. By dehydrodrying the hydrous hydroxide gel or the hydrous complex hydroxide gel, the solid titanium compound (I-a) or the titanium-containing solid compound (I-b) according to the invention is obtained. Through the drying, a part of hydroxyl groups are removed.

The drying can be carried out at ordinary pressure or under reduced pressure in a state of solid phase or a state where the gel is suspended in a liquid phase having higher boiling point than water. Although the drying temperature is not specifically limited, it is preferably not lower than 30° C. and lower than 350° C. The hydrous hydroxide gel or the hydrous complex hydroxide gel may be washed with water before drying, or the solid titanium compound or the titanium-containing solid compound may be washed with water after drying, to remove water-soluble components. It is preferable to conduct the drying rapidly.

Although the composition of the solid titanium compound (I-a) or the titanium-containing solid compound (I-b) obtained as above varies depending upon presence or absence of another element, amount thereof, washing or non-washing, method of drying and degree of drying, the molar ratio (OH/Ti) of a hydroxyl group (OH) to titanium (Ti) is usually more than 0.09 and less than 4, preferably in the range of 0.1 to 3, more preferably in the range of 0.1 to 2. The molar ratio of a hydroxyl group to titanium can be determined by measuring an absorbed water content and a thermally desorbed water content, and can be specifically determined in the following manner.

In order to determine the hydroxyl group content, the absorbed water content is first measured by a Karl Fischer's water content meter. Then, the weight loss on heating up to 600° C. is measured by thermogravimetric analysis. By heating up to 600° C., the absorbed water is desorbed. It is considered that the hydroxyl group is eliminated as water, and therefore, the absorbed water content is subtracted from the weight loss on heating to obtain the hydroxyl group content. The titanium content in the titanium-containing solid compound is determined by a high-frequency plasma emission analyzer (Inductively coupled plasma spectroscopy). From the titanium content and the hydroxyl group content, the OH/Ti ratio is determined.

More specifically, in case of, for example, a solid titanium compound prepared using ammonia as a neutralizing agent and having a titanium content of 46% by weight, an absorbed water content of 6.73% by eight, a weight loss on heating up to 600° C. of 9.67% by weight, a nitrogen content of 1.3% by weight and a chlorine content of 14 ppm, the OH/Ti ratio is calculated as described below. The nitrogen cotnent is analyzed by an all nitrogen microanalyzer (chemiluminescence method), and the chlorine content is analyzed by chromatography.

The amount by mol of titanium in 100 g of the titanium-containing solid compound is calculated as follows.

$$46(\text{Ti content})+47.88\ (\text{atomic weight of Ti})=0.9607$$

Nitrogen and chlorine the solid titanium compound are eliminated as ammonia and hydrogen chloride, respectively, so that the thermally desorbed water content (% by weight) is determined as follows.

$$9.67(\text{weight loss on 600° C. heating})-(1.3(\text{nitrogen content})\times(17/14)(\text{in terms of ammonia}))-(0.0014\ (\text{chlorine content})\times(36.5/35.5)(\text{in terms of hydrogen chloride}))=8.090$$

From the calculation result and the measured value of the absorbed water content, the thermally desorbed water content (% by weight) derived from the hydroxyl group is determined as follows.

$$8.090-6.73=1.360$$

From the above, the amount by mol of the hydroxyl group is determined as follows.

$$(1.360/18)\times 2=0.1511$$

From the above, the molar ratio (OH/Ti) of the hydroxyl group content to the titanium content in the solid titanium compound is determined as follows.

$$0.1511+0.9607=0.157$$

In the solid titanium compound (I-a) and the titanium-containing solid compound (I-b), the hydroxyl group remains even at temperatures at which the polycondensation reaction is performed, e.g., about 280° C.

The fact that the solid titanium compound (I-a) and the titanium-containing solid compound (I-b) have a OH/Ti ratio in the above range and that the hydroxyl group remains therein even at temperatures at which the polycondensation reaction is performed, e.g., about 280° C., indicates that the solid titanium compound (I-a) and the titanium-containing solid compound (I-b) are inherently different from orthotitanic acid (represented by $H_4TiO_4$, titanium:hydroxyl group (by mol)=1:4) referred to in Japanese Patent Laid-Open Publication No. 57291/1977 and Japanese Patent Publication 26597/1972, and are inherently different from titanium oxide used as a catalyst or polyester production described in Japanese Patent Laid-Open Publication No. 156595/1975, etc.

In the titanium-containing solid compound (I-b) according to the invention, the molar ratio (E/Ti) of another element (E) to titanium (Ti) is in the range of 1/50 to 50/1, preferably 1/40 to 40/1, more preferably 1/30 to 30/1.

In the solid titanium compound (I-a) and the titanium-containing solid compound (I-b) according to the invention, the chlorine content is in the range of usually 0 to 10000 ppm, preferably 0 to 100 ppm.

The solid titanium compound (I-a) or the titanium-containing solid compound (I-b) is used in combination with a co-catalyst (II) comprising the following co-catalyst compound, if desired.

Co-catalyst Compound

The co-catalyst compound is a compound of at least one element selected from the group consisting of beryllium, magnesium, calcium, strontium, barium, boron, aluminum, gallium, manganese, cobalt, zinc, germanium, antimony and phosphorus.

Examples of the compounds of at least one element selected from the group consisting of beryllium, magnesium, calcium, strontium, barium, boron, aluminum, gallium, manganese, cobalt, zinc, germanium, antimony and phosphorus include aliphatic acid salts of these elements, such as acetates thereof; carbonates, sulfates and nitrates of these elements; halide of these elements, such as chlorides thereof; acetylacetonato salts of these elements; and oxides of these elements. Of these, preferably are acetates and carbonates.

Examples of phosphorus compounds include phosphates and phosphites of at least one metal selected from Group 1 and Group 2 of the periodic table, transition metals of Period 4 of the period table, zirconium, hafnium and aluminum.

The co-catalyst compounds employable in the invention are described below more specifically.

Examples of aluminum compound include an aliphatic acid aluminum salt such as aluminum acetate, aluminum carbonate, aluminum chloride, and an acetylacetonato salt of aluminum. Of these, aluminum acetate and aluminum carbonate are particularly preferable.

Examples of barium compounds include an aliphatic acid barium salt such as barium acetate, barium carbonate, barium chloride, and an acetylacetonato salt of barium. Of these, barium acetate and barium carbonate are particularly preferable.

Examples of cobalt compounds include an aliphatic acid cobalt salt such as cobalt acetate, cobalt carbonate, cobalt chloride, and an acetylacetonato salt of cobalt. Of these, cobalt acetate and cobalt carbonate are particularly preferable.

Examples of magnesium compounds include an aliphatic acid magnesium salt such as magnesium acetate, magnesium carbonate, magnesium chloride, and an acetylacetonato salt of magnesium. Of these, magnesium acetate and magnesium carbonate are particularly preferable.

Examples of manganese compounds include an aliphatic acid manganese salt such as manganese acetate, manganese carbonate, manganese chloride, and an acetylacetonato salt of manganese. Of these, manganese acetate and manganese carbonate are particularly preferable.

Examples of strontium compounds include an aliphatic acid strontium salt such as strontium acetate, strontium carbonate, strontium chloride, and an acetylacetonato salt of strontium. Of these, strontium acetate and strontium carbonate are particularly preferable.

Examples of zinc compounds include an aliphatic acid zinc salt such as zinc acetate, zinc carbonate, zinc chloride, and an acetylacetonato salt of zinc. Of these, zinc acetate and zinc carbonate are particularly preferable.

Examples of germanium compounds include germanium dioxide and germanium acetate.

Examples of antimony compounds include antimony dioxide and antimony acetate.

Examples of the phosphates as the phosphorus compounds include lithium phosphate, lithium dihydrogenphosphate, dilithium hydrogenphosphate, sodium phosphate, sodium dihydrogenphosphate, disodium hydrogenphosphate, potassium phosphate, potassium dihydrogenphosphate, dipotassium hydrogenphosphate, strontium phosphate, strontium dihydrogenphosphate, distrontium hydrogenphosphate, zirconium phosphate, barium phosphate, aluminum phosphate and zinc phosphate. Of these, sodium phosphate, sodium hydrogenphosphate, disodium hydrogenphosphate, potassium phosphate, potassium dihydrogenphosphate and dipotassium hydrogenphosphate are particularly preferably employed.

The phosphite as the phosphorus compound is a phosphite of at least one metal selected from alkali metals, alkaline earth metals, transition metals of Period 4 of the periodic table, zirconium hafnium and aluminum. Examples of the phosphites include lithium phosphite, sodium phosphate, potassium phosphite, strontium phosphite, zirconium phosphite, barium phosphite, aluminum phosphite and zinc phosphite. Of these, sodium phosphite and potassium phosphite are particularly preferably employed.

Of the above co-catalyst compounds, preferably are magnesium compounds, such as magnesium carbonate and magnesium acetate; calcium compounds, such as calcium carbonate and calcium acetate; and zinc compounds such as zinc chloride and zinc acetate.

The co-catalyst compounds can be used singly or in combination of two or more kinds as the co-catalyst component.

The co-catalyst component (II) is desirably used in such an amount that the molar ratio ((II/(I-a)) of the metal atom in he co-catalyst component (II) to titanium in the solid titanium compound (I-a) or the molar ratio ((II)/(I-b)) of the metal atom in the co-catalyst component (II) to titanium and another element in the titanium-containing solid compound (I-b) is in the range of 1/50 to 50/1, preferably 1/40 to 40/1, more preferably 1/30 to 30/1. When a phosphorus compound such as a phosphate or a phosphite is used, the amount thereof is an amount in terms of a metal atom contained in the phosphorus compound.

The production of a polyester using the above catalyst is carried out by the process described later, and in the polycondensation reaction of the process, the solid titanium compound (I-a) or the titanium-containing solid compound (I-b) is desirably used in an amount of 0.001 to 0.2% by mol, preferably 0.002 to 0.1% by mol, in terms of a metal atom, based on the aromatic dicarboxylic acid units in the low condensate.

When the co-catalyst component (II) is used in addition to the solid titanium compound (I-a) or the titanium-containing solid compound (I-b), the co-catalyst component (II) is desirably used in an amount of 0.001 to 0.5% by mol, preferably 0.002 to 0.3% by mol, in terms of a metal atom, based on the aromatic dicarboxylic acid units in the low condensate.

The catalyst for polyester production comprising the solid titanium compound (I-a) and/or the titanium-containing solid compound (I-b), and optionally, the co-catalyst component (II) is sufficient to be present during the polycondensation reaction. Therefore, the catalyst may be added in any of a starting slurry preparation step, an esterification step and a liquid phase polycondensation step. Further, the total amount of the catalyst may be added a t once, or the catalyst may be added plural times by portions. When the co-catalyst component (11) is used in combination, it may be added in a step identical with or different from the step where the solid titanium compound (I-a) or the titanium-containing solid compound (1-b) is added.

The polyester obtained by the use of the above-mentioned catalyst for polyester production is melt molded and used as blow molded articles (e.g., bottles), sheets, films, fibers, etc., but it is preferably used as bottles.

The catalyst for polyester production described above can produce a polyester with higher catalytic activity as compared with a germanium compound or an antimony compound which has been heretofore used as a polycondensation catalyst. Further, when the catalyst for polyester production is used, a polyester having more excellent transparency and tint and lower acetaldehyde content can be obtained as compared with the case of using an antimony compound as a polycondensation catalyst.

Another embodiment of the catalyst for polyester production according to the invention comprises a solid titanium compound (I-c) and a co-catalyst component (II) described below, or comprises a titanium-containing solid compound (I-d) and optionally a co-catalyst component (II) described below.

Solid Titanium Compound (I-c) T4Titanium-containing Solid Compound (T-d)

The solid titanium compound (I-c) or the invention is obtained by hydrolyzing a titanium halide and then dehydro-drying the resulting hydrolyzate.

Examples the titanium halides include the same titanium halide as previously described.

There is no specific limitation on the method to hydrolyze the titanium halide, and for example, the aforesaid methods (1) to (5) used in the preparation of the solid titanium compound (I-a) are available.

In the present invention, the method of hydrolysis is not specifically limited as described above, but in each method, it is preferable to allow a large excess of water to act on the titanium halide and thereby completely carry out the hydrolysis. The temperature for the hydrolysis is usually not higher than 100° C., preferably in the range of 0 to 70° C.

The solid titanium compound (I-c) is used in combination with the aforesaid co-catalyst component (II) comprising the co-catalyst compound.

The titanium-containing solid compound (I-d) of the invention is obtained by hydrolyzing a mixture of the titanium halide and the compound of another element previously described and then dehydro-drying the resulting hydrolyzate. That is, the titanium compound is hydrolyzed in the presence of the compound of another element, and the resulting precipitate is subjected to solid-liquid separation, whereby the titanium-containing solid compound (I-d) is obtained.

There is no specific limitation on the method to hydrolyze the mixture of the titanium halide and the compound of another element, and for example, the aforesaid methods (1) to (9) used in the preparation of the titanium-containing solid compound (I-b) are available.

In the hydrolysis, the molar ratio (E/Ti) of the element (E) in the compound of another element to titanium (T4) in the titanium halide is desirably in the range of 1/50 to 50/1. The temperature for the hydrolysis is usually not higher than 100° C., preferably in the range of 0 to 70° C.

When the titanium halide or the mixture of the titanium halide and the compound of another element is hydrolyzed, the resulting liquid exhibits acidic property by virtue of hydrogen halide produced by the hydrolysis of the titanium halide. Because of the acidic property, the hydrolysis is not completed in some cases, so that the aforesaid neutralizing base may be added to perform neutralization. At the end point of the neutralization, the pH value is preferably not less than 4, and the neutralization is preferably carried out at a temperature of not higher than 70° C.

By dehydro-drying the hydrolyzate of the titanium halide or the hydrolyzate of the mixture of the titanium halide and the compound of another element obtained by the hydrolysis (hydrous hydroxide gel or hydrous complex hydroxide gel), the solid titanium compound (I-c) or the titanium-containing solid compound (I-d) is obtained.

The drying can be carried out at ordinary pressure or under reduced pressure in a state of solid phase or a state where the gel is suspended in a liquid phase having higher boiling point than water. Although the drying temperature is not specifically limited, it is preferably not lower than 30° C. and lower than 350° C. The hydrous hydroxide gel or the hydrous complex hydroxide gel may be washed with water before drying, or the solid titanium compound or the titanium-containing solid compound may be washed with water after drying, to remove water-soluble components. It is preferable to conduct the drying rapidly.

Although the composition of the solid titanium compound (I-c) or the titanium-containing solid compound (I-d) obtained as above varies depending upon presence or absence of another element, amount thereof, washing or non-washing, method of drying and degree of drying, the molar ratio (OH/Ti) of a hydroxyl group (OH) to titanium (Ti) is usually more than 0 and less than 4, preferably in the range of 0.001 to 3, more preferably in, the range of 0.01 to 2. The molar ratio of a hydroxyl group to titanium can be determined by the aforesaid method.

In the solid titanium compound (I-c) and the titanium-containing solid compound (I-d), the hydroxyl group remains even at temperatures at which the polycondensation reaction is performed, e.g., about 280° C.

In the titanium-containing solid compound (I-d), the molar ratio (E/Ti) of another element (E) to titanium (Ti) is in the range of 1/50 to 50/1, preferably 1/40 to 40/1, more preferably 1/30 to 30/1.

In the solid titanium compound (I-c) and the titanium-containing solid compound (I-d), the chlorine content is in the range of usually 0 to 10000 ppm, preferably 0 to 100 ppm.

The solid titanium compound (I-c) is used in combination with the aforesaid co-catalyst component (II). The titanium-containing solid compound (I-d) is used in combination with the co-catalyst component (II), if desired.

The co-catalyst component (II) is desirably used in such an amount that the molar ratio ((II)/(I-c)) of the metal atom in the co-catalyst component (II) to titanium in the solid titanium compound (I-c) or the molar ratio ((II)/(I-d)) of the metal atom in the co-catalyst component (II) to titanium and another element in the titanium-containing solid compound (I-d) is in the range of 1/50 to 50/1, preferably 1/40 to 40/1, more preferably 1/30 to 30/1. When a phosphorus compound such as a phosphate or a phosphite is used, the amount thereof is an amount in terms of a metal atom contained in the phosphorus compound. When a magnesium compound is used as the co-catalyst component (II), the magnesium compound is desirably used in such an amount that the weight ratio (Mg/(I-c)) of Mg atom in the magnesium compound to titanium in the solid titanium compound (I-c) or the weight ratio (Mg/(I-d)) of Mg atom in the magnesium compound to titanium and another element in the titanium-containing solid compound (I-d) is not less than 0.01, preferably in the range of 0.06 to 10, particularly preferably in the range of 0.06 to 5. If the magnesium compound is used in the above amount, the resulting polyester has excellent transparency.

The production of a polyester using the above catalyst is carried out by the process described later, and in the polycondensation reaction of the process, the solid titanium compound (I-c) or the titanium-containing solid compound (I-d) is desirably used in an amount of 0.001 to 0.2% by mol, preferably 0.002 to 0.1% by mol, in terms of a metal atom, based on the aromatic dicarboxylic acid units in the low condensate.

The amount of the co-catalyst component (II), which is used in combination with the solid titanium compound (I-c) or which is optionally used when the titanium-containing solid compound (I-d) is used, is desired to be in the range of 0.001 to 0.5% by mol, preferably 0.002 to 0.3% by mol, in terms of a metal atom, based on the aromatic dicarboxylic acid units in the low condensate.

The polyester produced by the use of the above catalyst for polyester production, for example, polyethylene terephthalate, is excellent in tint, particularly in transparency, and has a low content of acetaldehyde.

The polyester obtained by the use of the above catalyst for polyester production can be used as a material of various molded products For example, the polyester is melt molded and used as blow molded articles (e.g., bottles), sheets, films, fibers, etc., but it is particularly preferably used as bottles.

In order to produce bottles, sheets, films, fibers, etc. from the polyester such as polyethylene terephthalate, hitherto known processes are available.

The catalyst for polyester production described above can produce a polyester with higher catalytic activity as compared with a germanium compound or an antimony compound which has been heretofore used as a polycondensation catalyst. Further, when the catalyst for polyester production is used, a polyester having more excellent transparency and tint and lower acetaldehyde content can be obtained as compared with the case of using an antimony compound as a polycondensation catalyst. Moreover, polyethylene terephthalate obtained by the use of the catalyst for polyester production and molded products formed from the polyethylene terephthalate have excellent transparency and tint and have a low content of acetaldehyde.

A farther embodiment of he catalyst for polyester production according to the invention comprises a solid titanium compound (I-e), a solid titanium compound (7-f), the titanium-containing solid compound (I-g) or a titanium-containing solid compound (I-h) described below, and optionally, a co-catalyst component (II) described below.

Solid Titanium Compound (I-e) or (I-f) Titanium-containing Solid Compound (I-g) or (I-h)

The solid titanium compound (I-e) of the invention is obtained by a process comprising bringing a titanium halide into contact with water to hydrolyze the titanium halide and thereby obtain an acid solution containing a hydrolyzate of the titanium halide, rendering the solution basic by the use of a base, then adjusting pH of the solution to 2 to 6 by the use of an acid, and dehydro-drying the resulting precipitate. The solid titanium compound (I-f) is obtained by a process comprising bringing a titanium halide into contact with water to hydrolyze the titanium halide and thereby obtain an acid solution containing a hydrolyzate of the titanium halide, adjusting pH of the solution to 2 to 6 by the use of a base, and dehydro-drying the resulting precipitate.

Examples the titanium halides used for preparing the solid titanium compound (I-e) and the solid titanium compound (I-f) include the same titanium halide as previously described.

In each of the processes to prepare the solid titanium compound (I-e) and the solid titanium compound (I-f), there is no specific limitation on the method to hydrolyze the titanium halide, and for example, the aforesaid methods (1) to (5) used in the preparation of the solid titanium compound (I-a) are available.

In the present invention, the method of hydrolysis is not specifically limited as described above, but in each method, it is preferable to allow a large excess of water to act on the titanium halide and thereby completely carry out the hydrolysis. The temperature for the hydrolysis is usually not higher than 100° C., preferably in the range of 0 to 70° C.

By hydrolyzing the titanium halide as described above, an acid solution containing a hydrolyzate of the titanium halide is obtained. The pH of the acid solution is usually about 1.

In the preparation of the solid titanium compound (I-e), the acid solution containing the hydrolyzate is rendered basic (pH 9 to 12, preferably pH 9 to 11) by the use of a base and then adjusted to pH 2 to 6, preferably pH 3 to 6, by the use of an acid. The temperature used herein is usually not higher than 50° C., preferably not higher than 40° C. Adjustment of the solution to pH 2 to 6 results in a precipitate.

Examples of the bases include ammonia, sodium hydroxide, potassium hydroxide, sodium carbonate and potassium carbonate. Of these, ammonia and sodium hydroxide are preferable. Examples of the acids include acetic acid and nitric acid. Of these, acetic acid is preferable.

When the acid solution containing the hydrolyzate is temporarily made basic and then made acidic to form a precipitate as described above, the dehydration after solid-liquid separation can be carried out for a short period of time. In addition, nitrogen, sodium, potassium or the like derived from the base hardly remains in the resulting solid titanium compound (I-e), and hence this solid titanium compound becomes a catalyst for polyester production having excellent polycondensation activity and capable of producing a polyester of high quality.

In the preparation of the solid titanium compound (I-f), the acid solution containing the hydrolyzate is adjusted to pH 2 to 6, preferably pH 3 to 6, by the use of a base. The temperature used herein is usually not higher than 50° C., preferably not higher than 40° C. Adjustment of the solution to pH 2 to 6 results in a precipitate.

Examples of the bases include the same bases as used in the preparation of the solid titanium compound (I-e). Of these, ammonia and sodium hydroxide are preferable.

When the acid solution containing the hydrolyzate is adjusted to pH 2 to 6 to form a precipitate as described above, the dehydration after solid-liquid separation can be carried out for a short period of time. In addition, nitrogen, sodium, potassium or the like derived from the base hardly remains in the resulting solid titanium compound (I-f), and hence this solid titanium compound becomes a catalyst for polyester production having excellent polycondensation activity and capable of producing a polyester of high quality.

In each of the processes to prepare the solid titanium compound (I-e) and the solid titanium compound (I-f), pH of the acid solution is adjusted to 2 to 6 to form a precipitate. This precipitate in this stage is a gel of a hydrous hydroxide sometimes called "orthotitanic acid". She hydrous hydroxide gel is dehydro-dried to obtain the solid titanium compound (I-e) or the solid titanium compound (I-f) according to the invention. Through the dehydro-drying, a part of the hydroxyl groups contained in the hydrous hydroxide gel are removed.

As described above, pH of the acid solution is adjusted to 2 to 6 to form a precipitate, and the precipitate is subjected to solid-liquid separation and then dried, whereby the solid titanium compound (I-e) or the solid titanium compound (I-f) is obtained.

The drying is carried out at ordinary pressure or under reduced pressure in a state of solid phase or a state where the gel is suspended in a liquid phase having higher boiling point than water. Although the drying temperature is not specifically limited, it is preferably not lower than 30° C. and lower than 350° C. The hydrous hydroxide gel may be washed with water before drying, or the solid titanium compound (I-e) and the solid titanium compound (I-f) may be washed with water after drying, to remove water-soluble components. It is preferable to conduct the drying rapidly.

The titanium-containing solid compound (I-g) is obtained by a process comprising bringing a mixture of a titanium halide and the aforesaid compound of another element into contact with water to hydrolyze the titanium halide and thereby obtain an acid solution containing a hydrolyzate of the titanium halide, rendering the solution basic by the use of a base, then adjusting pH of the solution to 2 to 6 by the use of an acid, and dehydro-drying the resulting precipitate. The titanium-containing solid compound (I-h) is obtained by a process comprising bringing a titanium halide and a compound of at least one element selected from elements other than titanium or a precursor of the compound into contact with water to hydrolyze the titanium halide and thereby obtain an acid solution containing a hydrolyzate of the titanium halide, adjusting pH of the solution to 2 to 6 by the use of a base, and dehydro-drying the resulting precipitate.

Examples the titanium halide used for preparing the titanium-containing solid compound (I-g) and the titanium-containing solid compound (I-h) include the same titanium halide as previously described.

The compounds of another element can be used singly or in combination of two or more kinds.

In each of the processes to prepare the titanium-containing solid compound (I-g) and the titanium-containing solid compound (I-h), there is no specific limitation on the method to hydrolyze the mixture of the titanium halide and the compound of another element, and for example, the aforesaid methods (1) to (9) used in the preparation of the titanium-containing solid compound (I-b) are available.

In the present invention, the method of hydrolysis is not specifically limited as described above, but in each method, it is preferable to allow a large excess of water to act on the mixture of the titanium halide and the compound of another element and thereby completely carry out the hydrolysis.

In the hydrolysis, the molar ratio (E/Ti) of the element (E) in the compound of another element to titanium (Ti) in the titanium halide is desirably in the range of 1/50 to 50/1. The temperature for the hydrolysis is usually not higher than 100° C., preferably in the range of 0 to 70° C.

By hydrolyzing the mixture of the titanium halide and the compound of another element as described above, an acid solution containing a hydrolyzate of the titanium halide and the compound of another element is obtained. The pH of the acid solution is usually about 1.

In the preparation of the titanium-containing solid compound (I-g), the acid solution containing the hydrolyzate and the compound of another element is rendered basic (pH 9 to 12, preferably pH 9 to 11) by the use of a base and then adjusted to pH 2 to 6, preferably pH 3 to 6, by the use of an acid. The temperature used herein is usually not higher than 50° C., preferably not higher than 40° C. Adjustment of the solution to pH 2 to 6 results in a precipitate.

Examples of the bases include the same bases as used in the preparation of the solid titanium compound (I-e). Of these, ammonia and sodium hydroxide are preferable. Examples of the acids include the same acids as used in the preparation of the solid titanium compound (I-e). Of these, acetic acid is preferable.

When the acid solution containing the hydrolyzate and the compound of another element is temporarily made basic and then made acidic to form a precipitate as described above, the dehydration after solid-liquid separation can be carried out for a short period of time. In addition, nitrogen, sodium, potassium or the like derived from the base hardly remains 4n the resulting titanium-containing solid compound (I-g), and hence this titanium-containing solid compound becomes a catalyst for polyester production having excellent polycondensation activity and capable of producing a polyester of high quality.

In the preparation of the titanium-containing solid compound (I-h), the acid solution containing the hydrolyzate and the compound of another element is adjusted to pH 2 to 6, preferably pH 3 to 6, by the use of a base. The temperature used herein is usually not higher than 50° C., preferably not higher than 40° C. Adjustment of the solution to pH 2 to 6 result in a precipitate.

Examples of the bases include the same bases as used in the preparation of the solid titanium compound (I-e). Of these, ammonia and sodium hydroxide are preferable.

When the acid solution containing the hydrolyzate and the compound of another element is adjusted to pH 2 to 6 to form a precipitate as described above, the dehydration after solid-liquid separation can be carried out for a short period of time. In addition, nitrogen, sodium, potassium or the like derived from the base hardly remains in the resulting titanium-containing solid compound (I-h), and hence this titanium-containing solid compound becomes a catalyst for polyester production having excellent polycondensation activity and capable of producing a polyester of high quality.

In each of the processes to prepare the titanium-containing solid compound (I-g) and the titanium-containing solid compound (I-h), pH of the acid solution is adjusted to 2 to 6 to form a precipitate. This precipitate in this stage is a hydrous complex hydroxide gel containing a hydrous hydroxide sometimes called "orthotitanic acid". The hydrous complex hydroxide gel is dehydro-dried to obtain the titanium-containing solid compound (I-g) or the titanium-containing solid compound (I-h) according to the invention. Through the dehydro-drying, a part of the hydroxyl groups contained in the hydrous complex hydroxide gel are removed.

The drying is carried out at ordinary pressure or under reduced pressure in a state of solid phase or a state where the gel is suspended in a liquid phase having higher boiling point than water. Although the drying temperature is not specifically limited, it is preferably not lower than 30° C. and lower than 350° C. The hydrous complex hydroxide gel may be washed with water before drying, or the titanium-containing solid compound (I-g) and the titanium-containing solid compound (I-h) may be washed with water after drying, to remove water-soluble components. It is preferable to conduct the drying rapidly.

Although the composition of the solid titanium compound (I-e), the solid titanium compound (I-f), the titanium-containing solid compound (I-g) or the titanium-containing solid compound (I-h) obtained as above varies depending upon presence or absence of another element, amount thereof, washing or non-washing, method of drying and degree of drying, the molar ratio (OH/Ti) of a hydroxyl group (OH) to titanium (Ti) is usually more than 0.09 and less than 4, preferably in the range of 0.1 to 3, more preferably in the range of 0.1 to 2. The molar ratio of a hydroxyl group to titanium can be determined by measuring an absorbed water content and a thermally desorbed water content, specifically by the aforesaid method.

In the solid titanium compound (I-e), the solid titanium compound (I-f), the titanium-containing solid compound (I-g) and the titanium-containing solid compound (I-h), the hydroxyl group remains even at temperatures at which the polycondensation reaction is performed, e.g., about 280° C.

In the titanium-containing solid compound (I-g) and the titanium-containing solid compound(I-h), the molar ratio (E/Ti) of another element (E) to titanium (Ti) is in the range of 1/50 to 50/1, preferably 1/40 to 40/1, more preferably 1/30 to 30/1.

In the solid titanium compound (I-e), the solid titanium compound (I-f), the titanium-containing solid compound (I-g) and the titanium-containing solid compound (I-h), the chlorine content is in the range of usually 0 to 10000 ppm, preferably 0 to 100 ppm.

Examples of the co-catalyst components (II) optionally used in combination with the solid titanium compound (I-e), the solid titanium compound (I-f), the titanium-containing solid compound (I-g) or the titanium-containing solid compound (I-h) include the same co-catalyst compounds as previously described. Of these, preferably are magnesium compounds such as magnesium carbonate and magnesium acetate; calcium compounds such as calcium carbonate and calcium acetate; and zinc compounds such as zinc chloride and zinc acetate. The co-catalyst compounds can be used singly or in combination of two or more kinds.

The co-catalyst component (II) is desirably used in such an amount that the molar ratio ((II)/(I-e) or (I-f)) of the metal atom in the co-catalyst compound (II) to titanium in the solid titanium compound (I-e) or the solid titanium compound (I-f) or the molar ratio ((II)/(I-g) or (I-h)) or the metal atom in the co-catalyst compound (II) to titanium and another element in the titanium-containing solid compound (I-g) or the titanium-containing solid compound (I-h) is in the range of 1/50 to 50/1, preferably 1/40 to 40/1, more preferably 1/30 to 30/1. When a phosphorus compound such as a phosphate or a phosphite is used, the amount thereof is an amount in terms of a metal atom contained in the phosphorus compound. When a magnesium compound is used as the co-catalyst component (II), the magnesium compound is desirably used in such an amount that the weight ratio (Mg/(I-e) or (I-f)) of Mg atom in the magnesium compound to titanium in the solid titanium compound (I-e) or the solid titanium compound (I-f) or the weight ratio (Mg/(I-g) or (I-h)) or Mg atom in the magnesium compound to titanium and another element in the titanium-containing solid compound (I-g) or the titanium-containing sold compound (I-h) is not less than 0.01, preferably in the range of 0.06 to 10, particularly preferably in the range of 0.06 to 5. If the magnesium compound is used in the above amount, the resulting polyester has excellent transparency.

The production of a polyester using the above catalyst is carried out by the process described later, and in the polycondensation reaction, the solid titanium compound (I-e), the solid titanium compound (I-f), the titanium-containing solid compound (I-g) or the titanium-containing solid compound (I-h) is desirably used in an amount of 0.001 to 0.2% by mol, preferably 0.002 to 0.1% by mol, in terms of a metal atom, based on the aromatic dicarboxylic acid units in the low condensate.

When the co-catalyst component (II) is used in addition to the solid titanium compound (I-e), the solid titanium compound (I-f), the titanium-containing solid compound (I-g) or the titanium-containing solid compound (I-h), the amount of the co-catalyst component (II) is desired Lo be in the range of 0.001 to 0.5% by mol, preferably 0.002 to 0.3% by mol, in terms of a metal atom, based on the aromatic dicarboxylic acid units in the low condensate.

The catalyst comprising one of the solid titanium compound (I-e), the solid titanium compound (I-f), the titanium-containing solid compound (I-g) and the titanium-containing solid compound (I-h), and optionally, the co-catalyst component (II) is sufficient to be present during the polycondensation reaction. Therefore, the catalyst may be added in any of a starting slurry preparation step, an esterification step and a liquid phase polycondensation step. Further, the total amount of the catalyst may be added at once, or the catalyst may be added plural times by portions. When the co-catalyst component (II) is used in combination, it may be added in a step identical with or different from the step where the solid titanium compound (I-e), the solid titanium compound (I-f), the titanium-containing solid compound (I-g) or the titanium-containing solid compound (I-h) is added.

The catalyst for polyester production, particularly a catalyst comprising the solid titanium compound (I-e), the solid titanium compound (I-f), the titanium-containing solid compound (I-g) or the titanium-containing solid compound (I-h) and the co-catalyst component (II) that is a magnesium compound, is favorable as a catalyst for producing polyethylene terephthalate. In order to produce polyethylene terephthalate using the catalyst comprising the solid titanium compound (I-e), the solid titanium compound (I-f), the titanium-containing solid compound (I-g) or the titanium-containing solid compound (I-h) and the magnesium compound, for example, terephthalic acid or an ester-forming derivative thereof, ethylene glycol or an ester-forming derivative thereof, and optionally, an aromatic dicarboxylic acid other than terephthalic acid and/or an aliphatic diol other than ethylene glycol are used as starting materials, and they are subjected to esterification, liquid phase polycondensation, and if necessary, solid phase polycondensation in accordance with the process described later.

In the production of polyethylene terephthalate, terephthalic acid or an ester-forming derivative thereof is used in an amount of not less than 80% by mol, preferably not less than 90% by mol, based on 100% by mol of the aromatic dicarboxylic acids, and ethylene glycol or an ester-forming derivative thereof is used in an amount of not less than 80% by mol, preferably not less than 90% by mol, based on 100% by mol of the aliphatic diols.

In the resulting polyethylene terephthalate, the titanium content is preferably in the range of 1 to 200 ppm, particularly 1 to 100 ppm, and the magnesium content is preferably in the range of 1 to 200 ppm, particularly 1 to 100 ppm. The weight ratio (Mg/Ti) of magnesium to titanium contained in the polyethylene terephthalate is desired to be not less than 0.01, preferably 0.06 to 10, particularly preferably 0.06 to 5. In the polyethylene terephthalate, further, the chlorine content is in the range of 0 to 1000 ppm, preferably 0 to 100 ppm.

The polyethylene terephthalate is excellent in tint, particularly in transparency, and has a low content of acetaldehyde. Such polyethylene terephthalate is particularly preferably used for bottles.

The polyester obtained by the use of the above catalyst for polyester production can be used as a material of various molded products. For example, the polyester is melt molded and used as blow molded articles (e.g., boggles), sheets, films, fibers, etc., but it is particularly preferably used as bottles.

In order to produce bottles, sheets, films, fibers, etc. from the polyester such as polyethylene terephthalate, hitherto known processes are available.

The catalyst for polyester production described above can produce a polyester with higher catalytic activity as compared with a germanium compound or an antimony compound which has been heretofore used as a polycondensation catalyst. Further, when the catalyst for polyester production is used, a polyester having more excellent transparency and tint and lower acetaldehyde content can be obtained as compared with the case of using an antimony compound as a polycondensation catalyst.

A still further embodiment of the catalyst for polyester production according to the invention comprises a solid titanium compound (I-i) described below and if necessary a co-catalyst component (II) described below.

Solid Titanium Compound (I-i)

The solid titanium compound (I-i) of the invention is obtained by dehydro-drying titanium hydroxide. The titanium hydroxide can be obtained by, for example, hydrolyzing a titanium compound.

The titanium compound used for the hydrolysis is, for example, a titanium halide or a titanium alkoxide.

Examples of the titanium halides include the same titanium halides as previously described. Examples of the titanium alkoxide include titanium butoxide and titanium tetraisopropoxide.

It is a preferred embodiment of the present invention to use a titanium halide as the titanium compound. The method of hydrolyzing the titanium halide is described below in detail, and hydrolysis of the titanium alkoxide can be carried out in a manner similar to that described below.

There is no specific limitation on the method to hydrolyze the titanium halide, and for example, the aforesaid methods (1) to (5) used in the preparation of the solid titanium compound (I-a) are available.

In the present invention, the method of hydrolysis is not specifically limited as described above, but in each method, it is preferable to allow a large excess of water to act on the titanium halide and thereby completely carry out the hydrolysis.

The temperature for the hydrolysis is usually not higher than 60° C., preferably in the range of 0 to 50° C. When the hydrolysis is carried out at the above temperature, a solid titanium compound having a low crystallinity tends to be obtained.

In the hydrolysis of the titanium halide, the compound of another element previously described may be present. The compounds of another element can be used singly or in combination of two or more kinds.

In the hydrolysis, the molar ratio (E/Ti) of another element (E) in the compound of another element to titanium (Ti) in the titanium halide is desirably in the range of 1/50 to 50/1. The temperature for the hydrolysis is usually not higher than 60° C., preferably in the range of 0 to 50° C. When the hydrolysis is carried out at the above temperature, a solid titanium compound having a low crystallinity tends to be obtained.

When the titanium halide is hydrolyzed, the resulting liquid exhibits acidic property by virtue of hydrogen halide produced by the hydrolysis of the titanium halide. Because of the acidic property, the hydrolysis is not completed in some cases, so that the aforesaid neutralizing base may be added to perform neutralization. At the end point of the neutralization, the pH value is preferably not less than b 4, and the neutralization is desirably carried out at a temperature of not higher than 60° C., preferably 0 to 50° C. When the neutralization is carried out at the above temperature, a solid titanium compound having a low crystallinity tends to be obtained.

The compound containing titanium or the compound containing titanium and another element obtained by the hydrolysis is, in this stage, a gel of a hydrous hydroxide (sometimes called "orthotitanic acid").

In the present invention, the hydrous hydroxide gel is dehydro-dried to give a solid hydrolyzate (solid titanium compound). Through the drying, a part of hydroxyl groups are removed.

Drying of the hydrolyzate can be carried out at ordinary pressure or under reduced pressure in a state of solid phase or a state where the hydrolyzate is suspended in a liquid phase having higher boiling point than water. Although the drying temperature is not specifically limited, it is preferably not lower than 30° C. and lower than 350° C., particularly preferably in the range of 30 to 200° C. When the drying of the hydrolyzate is carried out at the above temperature, a solid titanium compound having a low crystallinity tends to be obtained.

The hydrous hydroxide gel may be washed with water before drying, or the solid titanium compound may be washed with water after drying, to remove water-soluble components. It is preferable to conduct the drying rapidly.

The solid titanium compound (I-i) thus obtained has a crystallinity, as calculated from an X-ray diffraction pattern having 2θ (diffraction angle) of 18° to 35°, of not more than 50%, preferably not more than 45%, particularly preferably not more than 40%, or is amorphous. The solid titanium compound having the above crystallinity exhibits excellent activity as a polycondensation catalyst used for polyester production.

The crystallinity of the solid titanium compound (I-i) is measured by, for example, the following method.

In FIG. 1, X-ray diffraction patterns to explain a method of measuring a crystallinity of a solid titanium compound are shown.

An X-ray diffraction pattern (FIG. 1(A)) of a sample and an X-ray diffraction pattern (FIG. 1(B)) of an amorphous solid titanium compound are measured. Under the conditions that the base line is taken between 18° and 35° and the position of 2θ (=28.5°, being a position which does not hinder the crystal peak) of the X-ray diffraction pattern of the amorphous solid titanium compound is taken as a base, the pattern of FIG. 1(B) is reduced in the intensity direction so as to be overlapped with the X-ray diffraction pattern of the sample, whereby a pattern of FIG. 1(C) is drawn.

From the thus synthesized pattern, an area ($I_0$) of the X-ray diffraction pattern (except the background) of the sample within the diffraction angle range of 18° to 35° and an area ($I_a$) of the X-ray diffraction pattern (except the background) of the amorphous solid titanium compound within the diffraction angle range of 18° to 35° are measured, and the crystallinity (%) is determined as a value of $(I_0-I_a)/(I_0)\times 100$.

Although the composition of the solid titanium compound (I-i) varies depending upon presence or absence of another element, amount thereof, washing or non-washing, method of drying and degree of drying, the molar ratio (OH/Ti) of a hydroxyl group (OH) to titanium (Ti) is usually more than 0.09 and less than 4, preferably in the range of 0.1 to 3, more preferably in the range of 0.1 to 2, from the viewpoint of polymerization activity. The molar ratio of a hydroxyl group to titanium can be determined by measuring an absorbed water content and a thermally desorbed water content, and can be specifically determined by the aforesaid method.

When the solid titanium compound (I-i) contains another element, the molar ratio (E/Ti) of another element (E) to titanium (Ti) in this compound is in the range of 1/50 to 50/1, preferably 1/40 to 40/1, more preferably 1/30 to 30/1.

In the solid titanium compound (I-i), the chlorine content is in the range of usually 0 to 10000 ppm, preferably 0 to 100 ppm.

In the solid titanium compound (I-i), the hydroxyl group remains even at temperatures at which the polycondensation reaction is performed, e.g., about 280° C.

The solid titanium compound (I-i) is used in combination with a co-catalyst component (II), if desired. Examples of the co-catalyst components (II) optionally used in combination include the same co-catalyst compound as previously described. Of these, preferable are magnesium compounds such as magnesium carbonate and magnesium acetate; calcium compounds such as calcium carbonate and calcium acetate; and zinc compounds such as zinc chloride and zinc acetate. The co-catalyst compounds can be used singly or in combination of two or more kinds.

The co-catalyst component (II) is desirably used in such an amount that the molar ratio (II)/(I-i)) of the metal atom in the co-catalyst component (II) to titanium (and another element if the solid titanium compound (I-i) contains another element) in the solid titanium compound (I-i) in the range of 1/50 to 50/1, preferably 1/40 to 40/1, more preferably 1/30 to 30/1. When a phosphorus compound such as a phosphate or a phosphite is used, the amount thereof is an amount in terms of a metal atom contained in the phosphorus compound.

The production of a polyester using the above catalyst for polyester production is carried out by the process described later, and in the polycondensation reaction, the solid titanium compound (I-i) is desirably used in an amount of 0.001 to 0.2% by mol, preferably 0.002 to 0.1% by mol, in terms of a metal atom, based on the aromatic dicarboxylic acid units in the low condensate.

When the co-catalyst component (II) is used in addition to the solid titanium compound (I-i), the amount of the co-catalyst component (II) is desired to be in the range of 0.001 to 0.5% by mol, preferably 0.002 to 0.3% by mol, in terms of a metal atom, based on the aromatic dicarboxylic acid units in the low condensate.

The catalyst comprising the solid titanium compound (I-i) and optionally the co-catalyst component (II) is sufficient to be present during the polycondensation reaction. Therefore, the catalyst may be added in any of a starting slurry preparation step, an esterification step and a liquid phase polycondensation step. Further, the total amount of the catalyst may be added at once, or the catalyst may be added plural times by portions. When the co-catalyst component (II) is used in combination, it may be added in a step identical with or different from the step where the solid titanium compound (I-i) is added.

The polyester obtained by the use of the above catalyst for polyester production, preferably polyethylene terephthalate, is melt molded and used as blow molded articles (e.g., bottles), sheets, films, fibers, etc., but it is particularly preferably used as bottles.

The catalyst for polyester production described above can produce a polyester with higher catalytic activity as compared with a germanium compound or an antimony compound which has been heretofore used as a polycondensation catalyst. Further, when the catalyst for polyester production is used, a polyester having more excellent transparency and tint and lower acetaldehyde content can be obtained as compared with the case of using an antimony compound as a polycondensation catalyst.

A still further embodiment of the catalyst for polyester production according to the invention comprises a slurry obtained by heating a mixture of:

(A-1) a hydrolyzate (I-j) obtained by hydrolyzing a titanium compound or a hydrolyzate (I-k) obtained by hydrolyzing a mixture of a titanium compound and a compound of at least one element selected from elements other than titanium or a precursor of the compound (each hydrolyzate sometimes being referred to as a "titanium-containing hydrolyzate (A-1)" hereinafter), (B) a basic compound, and (C) an aliphatic diol.

Hydrolyzate (I-j) Hydrolyzate (I-k)

The hydrolyzate (I-j) is obtained by hydrolyzing a titanium compound, and the hydrolyzate (I-k) is obtained by hydrolyzing a mixture of a titanium compound and the aforesaid compound of another element.

The titanium compound used for the hydrolysis is, for example, a titanium alkoxide or a titanium halide, and particular examples thereof include the same compounds previously described.

It is a preferred embodiment of the present invention to use a titanium halide as the titanium compound. The method of preparing the titanium-containing hydrolyzate using a titanium halide as the titanium compound is described below in detail, and preparation of a hydrolyzate of a titanium alkoxide can be carried out in a manner similar to that described below.

There is no specific limitation on the method to hydrolyze the titanium halide, and for example, the aforesaid methods (1) to (5) used in the preparation of the solid titanium compound (I-a) are available.

In the present invention, the method of hydrolysis is not specifically limited as described above, but in each method, it is preferable to allow a large excess of water to act on the titanium halide and thereby completely carry out the hydrolysis. The temperature for the hydrolysis is usually not higher than 100° C., preferably in the range of 0 to 70° C.

The titanium-containing hydrolyzate (A-1) may be a hydrolyzate obtained by hydrolyzing a mixture of the titanium halide and the aforesaid compound of another element. That is, this hydrolyzate is obtained by hydrolyzing the titanium halide in the presence of the compound of another element. The compounds of another element can be used singly or in combination of two or more kinds.

There is no specific limitation on the method to hydrolyze the mixture of the titanium halide and the compound of another element, and for example, the aforesaid methods (1) to (9) used in the preparation of the titanium-containing solid compound (I-b) are available.

In the hydrolysis, the molar ratio (E/Ti) of the element (E) in the compound of another element to titanium (Ti) in the titanium halide is desirably in the range of 1/50 to 50/1. The temperature for the hydrolysis is usually not higher than 100° C., preferably in the range of 0 to 70° C.

When the titanium halide or the mixture of the titanium halide and the compound of another element is hydrolyzed, the resulting liquid exhibits acidic property by virtue of hydrogen halide produced by the hydrolysis of the titanium halide. Because of the acidic property, the hydrolysis is not completed in some cases, so that the aforesaid neutralizing base may be added to perform neutralizing. At the end point of the neutralization, the pH value is preferably not less than 4, and the neutralization is preferably carried out at a temperature of not higher than 70° C.

The hydrolyzate (hydrous hydroxide gel or hydrous complex hydroxide gel) obtained by the hydrolysis can be per se used as a polycondensation catalyst, but the hydrolyzate is preferably dehydro-dried to give a solid hydrolyzate (titanium-containing solid compound (I-k)).

Drying of the hydrolyzate can be carried out at ordinary pressure or under reduced pressure in a state of solid phase or a skate where the hydrolyzate is suspended in a liquid phase having higher boiling point than water. Although the drying temperature is not specifically limited, it is preferably not lower than 30° C. and lower than 350° C. The hydrous hydroxide gel or the hydrous complex hydroxide gel may be washed with water before drying, or the titanium-containing solid compound (I-k) may be washed with water after drying, to remove water-soluble components. It is preferable to conduct the drying rapidly.

Although the composition of the titanium-containing solid compound (I-k) varies depending upon presence or absence of another element, amount thereof, washing or non-washing, method of drying and degree of drying, the molar ratio (OH/Ti) of a hydroxyl group (OH) to titanium (Ti) is usually more than 0.09 and less than 4, preferably in the range of 0.1 to 3, more preferably in the range of 0.1 to 2, from the viewpoint of polymerization activity. The molar ratio of a hydroxyl group to titanium can be determined by the aforesaid method.

In the titanium-containing solid component (I-k), the hydroxyl group remains even at temperatures at which the polycondensation reaction is performed, e.g., about 280° C.

When the titanium-containing solid compound (I-k) contains another element, the molar ratio (E/Ti) of another element (E) to titanium (Ti) in this compound is in the range of 1/50 to 50/1, preferably 1/40 to 40/1, more preferably 1/30 to 30/1.

In the titanium-containing hydrolyzate (A-1) such as the hydrous hydroxide gel, the hydrous complex hydroxide gel or the titanium-containing solid compound (I-k), the chlorine content is in the range of usually 0 to 10000 ppm, preferably 0 to 100 ppm.

Basic Compound (B)

The basic compound (B) is a compound which exhibits basic property in its aqueous solution, and examples of such compounds include tetraethylammonium hydroxide, tetramethylammonium hydroxide, aqueous ammonia, sodium hydroxide, potassium hydroxide, N-ethylmorpholine and N-methylmorpholine. Of these, tetraethylammonium hydroxide is preferable.

Aliphatic Diol (C)

Examples of the aliphatic diols (C) include ethylene glycol, trimethylene glycol, propylene glycol, tetramtheylene glycol, neopentyl glycol, hexamethylene glycol and dodecamethylene glycol. Of these, ethylene glycol is preferably employed.

The catalyst for polyester production according to the invention is obtained as a slurry by heating a mixture of the titanium-containing hydrolyzate (A-1), the basic compound (B) and the aliphatic diol (C).

In the mixture liquid, the titanium-containing hydrolyzate (A-1) is contained in an amount of 0.05 to 30% by weight, preferably 0.1 to 20% by weight, more preferably 0.5 to 15% by weight, the basic compound (B) is contained in an amount of 0.5 to 50% by weight, preferably 1 to 40% by weight, more preferably 2 to 30% by weight, and the residue is the aliphatic diol.

When the amount of the titanium-containing hydrolyzate (A-1) is not less than 0.05% by weight, the amount of the aliphatic diol (C) can be decreased, whereby the polymerization rate becomes high. When the amount of the titanium-containing hydrolyzate is not more than 30% by weight, coloring of the mixture is little during the heating, and as a result, the tint of a polyester produced by the use of this catalyst becomes good.

When the amount of the basic compound (B) is not less than 0.5% by weight, the catalytic activity is enhanced. When the amount of the basic compound is not more than 50% by weight, coloring of the mixture is little during the heating.

The heating temperature of the mixture is in the range of usually 100 to 300° C., preferably 120 to 250° C., more preferably 140 to 200° C., and the heating time is in the range of 5 minutes to 10 hours, preferably 30 minutes to 8 hours.

The production of a polyester using the above catalyst for polyester production is carried out by the process described later, and the catalyst for polyester production is used in an amount of usually 0.0005 to 0.2% by weight, preferably 0.001 to 0.05% by weight, in terms of weight of a metal in the catalyst, based on the weight of the mixture of the aromatic dicarboxylic acid and the aliphatic diol.

The catalyst for polyester production can be fed to the polymerization reactor in the esterification reaction step, or can be fed to the reactor in the first stage of the polycondensation reaction step.

In addition to the catalyst for polyester production of the invention, the aforesaid co-catalyst compound can be used as a co-catalyst component. Preferred examples of the co-catalyst components include magnesium compounds such as magnesium carbonate and magnesium acetate; calcium compounds such as calcium carbonate and calcium acetate; and zinc compound such as zinc chloride and zinc acetate. The co-caltayt compounds can be used singly or in combination of two or more kinds.

The co-catalyst component is desirably used in such an amount that the molar ratio ((M)/(Ti)) of the metal atom (M) in the co-catalyst component to titanium (and another element if the catalyst contains another element) (Ti) in the catalyst for polyester production is in the range of 1/50 to 50/1, preferably 1/40 to 40/1, more preferably 1/30 to 30/1. When a phosphorus compound such as a phosphate or a phosphite is used, the amount thereof is an amount in terms of a metal atom contained in the phosphorus compound.

The co-catalyst component can be fed to the polymerization reactor in the esterification reaction step, or can be fed to the reactor in the first stage of the liquid phase polycondensation reaction step. When the co-catalyst component is fed in the esterification reaction step, the co-catalyst component can be added at the same time as the catalyst for polyester production or separately.

When the catalyst for polyester production is used, a polyester having a desired intrinsic viscosity is obtained for a short period of time.

A still further embodiment of the catalyst for polyester production according to the invention comprises:

(A-2) a hydrolyzate (I-m) obtained by hydrolyzing a titanium halide or a hydrolyzate (I-n) obtained by hydrolyzing a mixture of a titanium halide and a compound of at least one element selected from elements other than titanium or a precursor of the compound (each hydrolyzate sometimes being referred to as a "titanium-containing hydrolyzate (A-2)" hereinafter), and (D) a metallic phosphate containing at least one element selected from beryllium, magnesium, calcium, strontium, boron, aluminum, gallium, manganese, cobalt and zinc;

or comprises a slurry obtained by heating a mixture of:

(A-2) a hydrolyzate (I-m) obtained by hydrolyzing a titanium halide or a hydrolyzate (I-n) obtained by hydrolyzing a mixture of a titanium halide and a compound of at Least one element selected from elements other than titanium or a precursor of the compound, (E) a metallic compound containing at least one element selected from beryllium, magnesium, calcium, strontium, boron, aluminum, gallium, manganese, cobalt and zinc, (F) at least one phosphorus compound selected from phosphoric acid and phosphoric esters, and (G) an aliphatic diol.

Hydrolyzate (I-m). Hydrolyzate (I-n)

The hydrolyzate (I-m) is obtained by hydrolyzing a titanium halide, and the hydrolyzate (I-n) is obtained by hydrolyzing a mixture of a titanium halide and the aforesaid compound of another element.

Examples of the titanium halides employable for the preparation of the titanium-containing hydrolyzate (A-2) include the same titanium halides as previously described.

There is no specific limitation on the me:hod to hydrolyze the titanium halide, and for example, the aforesaid methods (1) to (5) used in the preparation of the solid titanium compound (I-a) are available.

In the present invention, the method of hydrolyses is not specifically limited as described above, but in each method, it is preferable to allow a large excess of water to act on the titanium halide and thereby completely carry out the hydrolysis. The temperature for the hydrolysis is usually not higher than 100° C., preferably in the range of 0 to 70° C.

The titanium-containing hydrolyzate (A-2) may be a hydrolyzate obtained by hydrolyzing a mixture of the titanium halide and the aforesaid compound of another element. That is, this hydrolyzate is obtained by hydrolyzing the titanium halide in the presence of the compound of another element. The compounds of another element can be used singly or in combination of two or more kinds.

There is no specific limitation on the method to hydrolyze the mixture of the titanium halide and the compound of another element, and for example, the aforesaid methods (1) to (9) used in the preparation of the titanium-containing solid compound (I-b) are available.

In the hydrolysis, the molar ratio (E/Ti) of the element (E) in the compound of another element o titanium (Ti) in the titanium halide is desirably in the range of 1/50 to 50/1. The temperature for the hydrolysis is usually not higher than 100° C., preferably in the range of 0 to 70° C.

When the titanium halide or the mixture of the titanium halide and the compound of another element is hydrolyzed, the resulting liquid exhibits acidic property by virtue of hydrogen halide produced by the hydrolysis of the titanium halide. Because of the acid property, the hydrolysis is not completed in some cases, so that the aforesaid neutralizing base may be added to perform neutralization. At the end point of the neutralization, the pH value is preferably not less than 4, and the neutralization is preferably carried out at a temperature of not higher than 70° C.

The hydrolyzate (hydrous hydroxide gel or hydrous complex hydroxide gel) obtained by the hydrolysis can be per se used as a polycondensation catalyst, but the hydrolyzate is preferably dehydro-dried to give a solid hydrolyzate (titanium-containing solid compound (A-2)).

Drying of the hydrolyzate can be carried out at ordinary pressure or under reduced pressure in a state of a solid phase or a state where the hydrolyzate is suspended in a liquid phase having higher boiling point than water. Although the drying temperature is not specifically limited, it is preferably not lower than 30° C. and lower than 350° C. The hydrous hydroxide gel or the hydrous complex hydroxide gel may be washed with water before drying, or the titanium-containing solid component (A-2) may be washed with water after drying, to remove water-soluble components. It is preferable to conduct the drying rapidly.

Although the composition of the titanium-containing solid compound (A-2) obtained above varies depending upon presence or absence of another element, amount thereof, washing or non-washing, method of drying and degree of drying, the molar ratio (OH/Ti) of a hydroxyl group (OH) to titanium (Ti) is usually more than 0.09 and less than 4, preferably in the range of 0.1 to 3, more preferably in the range of 0.1 to 2, from the viewpoint of polycondensation activity. The molar ratio of a hydroxyl group to titanium can be determined by the aforesaid method.

In the titanium-containing solid compound (A-2), the hydroxyl group remains even at temperatures at which the polycondensation reaction is performed, e.g., about 280° C.

When the titanium-containing solid compound (A-2) contains another element, the molar ratio (E/Ti) of another element (E) to titanium (Ti) in this compound is in the range of 1/50 to 50/1, preferably 1/40 to 40/1, more preferably 1/30 to 30/1.

In the titanium-containing hydrolyzate (A-2) such as the hydrous hydroxide gel, the hydrous complex hydroxide gel or the titanium-containing solid compound (A-2), the chlorine content is in the range of usually 0 to 10000 ppm, preferably 0 to 100 ppm.

Metallic Phosphate (D)

The metallic phosphate (D) is a compound containing at least one element selected from beryllium, magnesium, calcium, strontium, boron, aluminum, gallium, manganese, cobalt and zinc.

Examples of the metallic phosphates (D) include:

magnesium phosphate, such as magnesium hydrogenphosphate, trimagnesium diphosphate and magnesium phosphite;

calcium phosphates, such as calcium hydrogenphosphate, calcium dihydrogenphosphate and tricalcium phosphate;

strontium phosphates, such as strontium hydrogenphosphate;

aluminum phosphates, such as aluminum phosphate;

manganese phosphates, such as manganese dihydrogenphosphate and manganese phosphate;

cobalt phosphates, such as cobalt phosphate; and zinc phosphates, such as zinc phosphate.

Of these, magnesium phosphates are preferable, and magnesium hydrogenphosphate and trimagnesium diphosphate are particularly preferable.

The production of a polyester using the above catalyst for polyester production is carried out by the process described later, and in the polycondensation reaction, the titanium-containing hydrolyzate (A-2) is used in an amount of usually 0.0005 to 0.2% by mol, preferably 0.001 to 0.05% by mol, in terms of a metal atom in the titanium-containing hydrolyzate (A-2), based on the amount by mol of the aromatic dicarboxylic acid (in terms of the aromatic dicarboxylic acid) in the low condensate; and the metallic phosphate (D) is used in an amount of usually 0.001 to 0.200% by mol, preferably 0.002 to 0.050% by mol, in terms of phosphorus atom. When the amount of the titanium-containing hydrolyzate (A-2) and the metallic phosphate (D) are within the above ranges, the catalyst exhibits high polymerization activity and the resulting polyester has a low acetaldehyde content.

The acetaldehyde content referred to herein is determined in the following manner. A sample of 2 g is pulverized under cooling, and the temperature of the sample is returned to room temperature. Then, 1 g of the sample is charged in a container, and 2 cc of an internal standard liquid is added to the container, followed by closing the container. Then, extraction is performed in an oven at 120° C. for 1 hour. The extract is ice cooled, and the acetaldehyde content in 5 μl of the supernatant liquid is measured by GC-6A manufactured by Shimadzu Seisakusho K.K. to determine the acetaldehyde content in the sample.

The titanium-containing hydrolyzate (A-2) can be fed to the reactor in the esterification reaction step, or can be fed to the reactor in the first stage of the liquid phase polycondensation reaction step. The metallic phosphate (D) can be fed to the reactor in the esterification reaction step, or can be fed to the reactor in the first stage of the liquid phase polycondensation reaction step. The metallic phosphate (D) can be added at the same time as the titanium-containing hydrolyzate (A-2) or separately.

Metallic Compound (E)

The metallic compound (E) for use in the invention is a compound containing at least one element selected from beryllium, magnesium, calcium, strontium, boron, aluminum, gallium, manganese, cobalt and zinc.

Examples of the metallic compounds (E) include:

magnesium compound, such as magnesium acetate, magnesium carbonate and magnesium hydroxide;

calcium compounds, such as calcium hydroxide, calcium acetate and calcium carbonate;

strontium compounds, such as strontium acetate and strontium carbonate;

aluminum compounds, such as aluminum acetate, aluminum hydroxide and aluminum carbonate;

manganese compounds, such as manganese acetate;

cobalt compounds, such as cobalt acetate; and zinc compounds, such as zinc acetate.

Of these, magnesium compounds are preferable, and magnesium acetate and magnesium carbonate are particularly preferable.

Phosphorus Compound (F)

Examples of the phosphorus compounds (II) for use in the invention include phosphoric acid, and phosphoric esters, such as trimethyl phosphate, triethyl phosphate, tri-n-butyl phosphate, trioctyl phosphate, triphenyl phosphate and tricresyl phosphate. Of these, phosphoric acid and trimethyl phosphate are preferable.

Aliphatic Diol (G)

Examples of the aliphatic diols (G) for use in the invention include ethylene glycol, trimethylene glycol, propylene glycol, tetramethylene glycol, neopentyl glycol, hexamethylene glycol and dodecamethylene glycol. Of these, ethylene glycol is preferable.

The catalyst for polyester production according to the invention may be a catalyst obtained as a slurry by heating a mixture of the titanium-containing hydrolyzate (A-2), the metallic compound (E), the phosphorus compound (F) and the aliphatic diol (G).

In the mixture liquid, the titanium-containing hydrolyzate (A-2) is contained in an amount of 0.1 to 30% by weight, preferably 0.2 to 20% by weight, more preferably 0.3 to 10% by weight, in terms of titanium atom, the metallic compound (E) is contained in an amount of 0.1 to 30% by weight, preferably 0.2 co 20% by weight, more preferably 0.3 to 10% by weight, in terms of a metal, the phosphorus compound (a) is contained in an amount of 0.1 to 30% by weight, preferably 0.2 to 20% by weight, more preferably 0.3 to 10% by weight, in terms of phosphorus atom, and the residue is the aliphatic diol (G). The titanium-containing hydrolyzate (A-2) and the metallic compound (E) are preferably used in the same amounts from the viewpoint of polymerization activity.

Heating of the mixture is performed for the purpose of allowing at least a part of the metallic compound (E) dissolved in the aliphatic diol to react with at least a part of the phosphorus compound (F) dissolved in the aliphatic diol. Therefore, the amount of the metallic compound (E) and the phosphorus compound (F) is preferably no: more than 30% by weight from the viewpoint of solubility in the aliphatic diol.

The temperature for heating the mixture, though varies depending upon the boiling point of the aliphatic diol, is in the range of usually 50 to 200° C., preferably 80 to 190° C., more preferably 100 to 190° C., and the heating time is in the range of 3 minutes to 5 hours, preferably 30 minutes to 4 hours, more preferably 1 to 4 hours.

When the heating temperature is not lower than 50° C., the metallic compound (E) dissolved in the aliphatic diol and the phosphorus compound (F) dissolved in the aliphatic diol easily undergo reaction. When the heating temperature is not higher than 200° C., the aliphatic diol hardly undergoes side reaction such as dehydration reaction.

The production of a polyester using the above catalyst for polyester production is carried out by the process described later, and in the polycondensation reaction, the slurry catalyst for polyester production is used in an amount of usually 0.0005 to 0.2% by weight, preferably 0.001 to 0.05% by weight, in terms of weight, of a metal (derived from the titanium-containing hydrolyzate (A-2)) in the catalyst, based on the weight of a mixture of terephthalic acid and ethylene glycol.

The slurry catalyst for polyester production can be fed to the polymerization reactor in the esterification reaction step, or can be fed to the reactor in the first stage of the polycondensation reaction steps.

In the present invention, in addition to the catalyst for polyester production comprising the titanium-containing hydrolyzate (A-2) and the metallic phosphate (D) or the slurry catalyst for polyester production, the aforesaid co-catalyst compound can be used as a co-catalyst component. Preferred examples of the co-catalyst compounds include magnesium compound such as magnesium carbonate and magnesium acetate; calcium compounds such as calcium carbonate and calcium acetate; and zinc compounds such as zinc chloride and zinc acetate. The co-catalyst compounds can be used singly or in combination of two or more kinds.

The co-catalyst component is desirably used in such an amount that the molar ratio ((M)/(Ti)) of the metal atom (M) in the co-catalyst component to titanium (and another element if the catalyst contains another element) (Ti) in the catalyst for polyester production is in the range of 1/50 to 50/1, preferably 1/40 to 40/1, more preferably 1/30 to 30/1.

The co-catalyst component can be fed to the reactor in the esterification reaction step, or can be fed to the reactor in the first stage of the liquid phase polycondensation reaction step. When the co-catalyst component is fed in the esterification reaction step, the co-catalyst component can be added at the same time as the catalyst for polyester production or separately.

The catalyst for polyester production according to the invention can produce a polyester having a low acetaldehyde content with high polymerization activity.

Next, the process for producing a polyester using the catalyst for polyester production mentioned above is described.

Process for Producing Polyester

In the process for producing a polyester using the catalyst for polyester production mentioned above, an aromatic dicarboxylic acid or an ester-forming derivative thereof and an aliphatic diol or an ester-forming derivative thereof are polycondensed in the presence of any one of the above-mentioned catalysts for polyester production. One embodiment of the process is described below.

Starting Materials

In the process for producing a polyester according to the invention, an aromatic dicarboxylic acid or an ester-forming derivative thereof and an aliphatic diol or an ester-forming derivative thereof are used as starting materials.

Examples of the aromatic dicarboxylic acids include terephthalic aced, phthalic acid, isophthalic acid, naphthalenedicarboxylic acid, diphenyldicarboxylic acid and diphenoxyethanedicarboxylic acid.

Examples of the aliphatic diols include aliphatic glycols, such as ethylene glycol, trimethylene glycol, propylene glycol, tetramethylene glycol, neopentyl glycol, hexamethylene glycol and dodecamethylene glycol.

In the present invention, aliphatic dicarboxylic acids such as adipic acid, sebacic acid, azelaic acid and decanedicarboxylic acid, and alicyclic dicarboxylic acids such a cyclohexanedicarboxylic acid are employable as starting materials together with the aromatic dicarboxylic acid. Further, alicyclic glycols such as cyclohexanedimethanol, and aromatic diols such as bisphenol, hydroquinone, 2,2-bis(4-β-hydroxyethoxyphenyl)propanes, 1,3-bis(2-hydroxyethoxy)benzene and 1,4-bis(2-hydroxyethoxy)benzene are employable as starting materials together with the aliphatic diol.

In the present invention, moreover, polyfunctional compounds such as trimesic acid, trimethylolethane, trimethylolpropane, trimethylolmethane and pentaerythritol are employable as starting materials.

Esterification Step

In the production of a polyester, first, the aromatic dicarboxylic acid or an ester-forming derivative thereof and the aliphatic diol or an ester-forming derivative thereof are esterified.

More specifically, a slurry containing the aromatic dicarboxylic acid or an ester-forming derivative thereof and the aliphatic diol or an ester-forming derivative thereof is prepared.

In the slurry, the aliphatic diol or an ester-forming derivative thereof is contained in an amount of usually 1.005 to 1.4 mol, preferably 1.01 to 1.3 mol, more preferably 1.03 to 1.3 mol., based on 1 mol of the aromatic dicarboxylic acid or an ester-forming derivative thereof. The slurry is continuously fed to the esterification reaction step.

The esterification reaction is carried out under reflux of ethylene glycol using an apparatus consisting of two or more esterification reactors connected in series, while water which is produced by the reaction is removed from the system by means of a rectification tower.

The esterification reaction is generally carried out in plural stages, and the esterification reaction or the first stage is carried out at a reaction temperature of usually 240 to 270° C., preferably 245 to 265° C., under a pressure of 0.2 to 3 $kg/cm^2$-G, preferably 0.5 to 2 $kg/cm^2$-G, and the esterification reaction of the last stage is carried out at a reaction temperature of usually 250 to 280° C., preferably 255 to 275° C., under a pressure of 0 to 1.5 $kg/cm^2$-G, preferably 0 to 1.3 $kg/cm^2$-G.

When the esterification reaction is carried out in two stages, the esterification reaction conditions of the first and the second stages are as described above, and when the esterification reaction is carried out in three or more stages, the esterification reaction conditions of. the second stage to the stage of last but one are between the reaction conditions of the first stage and the reaction conditions of the last stage.

For example, when the esterification reaction is carried out in three stages, the esterification reaction temperature of the second stage is in the range of usually 245 to 275° C., preferably 250 to 270° C., and the pressure of this stage is in the range of usually 0 to 2 $kg/cm^2$-G, preferably 0.2 to 1.5 $kg/cm^2$-G.

There is no specific limitation on the degree of esterification in each stage, but it is preferable that the increase of the degree of esterification is smoothly distributed in each stage, and it is desirable that the degree of esterification of the esterifiaction reation product in the last stage reaches usually not less than 90%, prefearlby not less than 93%.

It is possible to carry out the esterification reaction without adding additives other than the aromatic dicarboxylic acid and the aliphatic diol, and it is also possible to carry out the esterification reaction in the presence of the catalyst for polyester production described above. It is preferable to add a small amount of a basic compound and to carry out the esterification reaction, because the proportion of dioxyethylene terephthalate constituent units in the main chain of polyethylene terephthalate can be held at a relatively low level. Examples of the basic compounds employable herein include tertiary amines, such as trimethylamine, tri-n-butylamine and benzyldimethylamine; quaternary ammonium hydroxides, such as tetraethylammonium hydroxide, tetra-n-butylammonium hydroxide and trimethylbenzylammonium hydroxide; and other basic compounds, such as lithium carbonate, sodium carbonate, potassium carbonate and sodium acetate.

Through the esterification reaction step, an esterification product (low condensate) is obtained, and the esterification product has a number-average molecular weight of usually 500 to 5000. The low condensate thus obtained is then fed to a polycondensation (liquid phase polycondensation) step.

Liquid Phase Polycondensation Step

In the liquid phase polycondensation step, the low-condensate obtained in the esterification step is heated under reduced pressure at a temperature of not lower than the melting point of a polyester (usually 250 to 280° C.) in the presence of the aforesaid polycondensation catalyst, to polycondensate the low condensate. The polycondensation reaction is desirably carried out with distilling off the unreacted aliphatic diol from the reaction system.

The polycondensation reaction may be carried out in one stage or plural stages. For example, when the polycondensation reaction is carried out in plural stages, the polycondensation reaction of the first stage is carried out at a reaction temperature of 250 to 290° C., preferably 260 to 280° C., under a pressure of 500 to 20 Torr, preferably 200 to 30 Torr, and the polycondensation reaction of the last stage is carried out at a reaction temperature of 265 to 300° C., preferably 270 to 295° C., under a pressure of 10 to 0.1 Torr, preferably 5 to 0.5 Torr.

When the polycondensation reaction is carried out in two stages, the polycondensation reaction conditions of the first and the second stages are as described above, and when the polycondensation reaction is carried out in three or more stages, the polycondensation reaction conditions of the second stage to the stage of last but one are between the reaction conditions of the first stage and the reaction conditions of the last stage. For example, when the polycondensation reaction is carried out in three stages, the polycondensation reaction of the second stage is carried out at a reaction temperature of usually 260 to 295° C., preferably 270 to 285° C., under a pressure of usually 50 to 2 Torr, preferably 40 to 5 Torr. There is no specific limitation on the intrinsic viscosity reached in each stage of the polycondensation reaction step, but it is preferable that the increase of the intrinsic viscosity is smoothly distributed in each stage.

The polycondensation reaction is desirably carried out in the presence of a stabilizer. The stabilizer is, for example, a phosphorus compound, and specific examples thereof include phosphoric esters, such as trimethyl phosphate, tiehtyl phosphate, tri-n-butyl phosphate, trioctyl phosphate and triphenyl phosphate; phosphorus esters, such as triphenyl phosphate, trisdodecyl phosphite and trisnonylphenyl phosphite; and other phosphoric esters, such as monomethyl phosphate, dimethyl phosphate, monoethyl phosphate, diethyl phosphate, monoisopropyl phosphate, diisopropyl phosphate, dibutyl phosphate, monobutyl phosphate and dioctyl phosphate; phosphoric acid; and polyphosphoric acid.

The phosphorus compound is desirably added in an amount of 0.005 to 0.2% by mol, preferably 0.01 to 0.1% by mol, in terms of phosphorus atom in the phosphorus compound, based on the aromatic dicarboxylic acid. The phosphorus compound may be fed in the esterification reaction step, or may be fed to the reactor in the first stage of the polycondensation reaction step.

The polyester obtained in the liquid phase polycondensation step desirably has an intrinsic viscosity of 0.40 to 1.0 dl/g, preferably 0.50 to 0.90 dl/g, more preferably 0.55 to 0.75 dl/g. There is no specific limitation on the intrinsic viscosity reached in each of the stages except the last stage of the polycondensation step, but it is preferable that the increase of the intrinsic viscosity is smoothly distributed in each stage.

The intrinsic viscosity referred to herein is calculated from a solution viscosity determined by heating 1.2 g of a polyester in 15 cc of o-chlorophenol to melt it, then cooling the solution and measuring its viscosity at 25° C.

The polyester desirably has a density of usually 1.33 to 1.35 gl/cm$^3$. The density of the polyester referred to herein is measured at a temperature of 23° C. by means of a density gradient tube using a mixed solvent of carbon tetrachloride and heptane.

The polyester obtained in the polycondensation step is generally melt extruded into particles (chips). The particulate polyester desirably has an average particle diameter of usually 2.0 to 5.0 mm, preferably 2.2 to 4.0 mm.

The polyester obtained in the liquid phase polycondensation step can be then subjected to solid phase polycondensation, if desired.

Solid Phase Polycondensation Step

Before the particulate polyester is fed to the solid phase polycondensation step, it may be heated at a temperature lower than the temperature for the solid phase polycondensation to perform precrystallization.

The precrystallization can be carried out by heating the particulate polyester at a temperature of usually 120 to 200° C., preferably 130 to 180° C., for 1 minute to 4 hours, in a dry state. The precrystallization may be carried out by heating the particulate polyester at a temperature of 120 to 200° C. for 1 minute or more in an atmosphere of water vapor, an atmosphere of an inert gas continuing water vapor or an atmosphere of air containing water vapor.

The polyester thus precrystallized desirably has a crystallinity of 20 to 50%.

In the precrystallization treatment, the "solid phase polycondensation reaction" of the polyester does not proceed, so that the intrinsic viscosity of the precrystallized polyester is almost equal to that of the polyester after the liquid phase polycondensation, and the difference between the intrinsic viscosity of the precrystallized polyester and the intrinsic viscosity of the polyester before precrystallization is usually not more than 0.06 dl/g.

The solid phase polycondensation step consists of at least one stage, and the solid phase polycondensation reaction is carried out at a temperature of 190 to 230° C., preferably 195 to 225° C., under a pressure of 1 kg/cm$^2$-G to 10 Torr, preferably atmospheric pressure to 100 Torr, in an atmosphere of an inert gas such as nitrogen, argon or carbonic acid gas. The inert gas used herein is desirably a nitrogen gas.

The particulate polyester obtained after the solid phase polycondensation may be subjected to water treatment by the method described in, for example, Japanese Patent Publication No. 64920/1995. This water treatment is carried out by contacting the particulate polyester with water, water vapor, an inert gas containing water vapor, air containing water vapor or the like.

The intrinsic viscosity of the particulate polyester obtained as above is desired to be usually not less than 0.50 dl/g, preferably 0.60 to 1.00 dl/g, more preferably 0.75 to 0.95 dl/g.

The production of the polyester comprising the esterification step and the polycondensation step may be carried out batchwise, semicontinuously or continuously. The density of the polyester is desired to be usually not less than 1.37 g/cm$^3$, preferably not less than 1.38 g/cm$^3$, more preferably not less than 1.39 g/cm$^3$.

The polyester produced as above may contain additives hitherto known, such as stabilizer, release agent, antistatic agent, dispersant and colorant (e.g., dye, pigment). These additives may be added in any step of the process for producing the polyester, or may be added by forming a masterbatch before molding.

The polyester obtained by the invention can be used as a material of various molded products. For example, the polyester is melt molded and used as blow molded articles (e.g., bottles), sheets, films, fibers, etc., but it is particularly preferably used as bottles.

In order to produce bottles, sheets, films, fibers, etc. from the polyester obtained by the invention, such as polyethylene terephthalate, hitherto known processes are available.

Another embodiment of the process for producing a polyester according to the invention is described below.

This embodiment is a process for producing a polyester, comprising an esterification step in which an aromatic dicarboxylic acid or an ester-forming derivative thereof and an aliphatic diol or an ester-forming derivative thereof are esterified to form a low condensate and a polycondensation step in which the low condensate is polycondensed in the presence of a polycondensation catalyst to increase the molecular weight, wherein:

the polycondensation catalyst used is a catalyst comprising:

(II) a catalyst component comprising a hydrolyzate (I-j) obtained by hydrolyzing a titanium compound or a hydrolyzate (I-k) obtained by hydrolyzing a mixture of a titanium compound and a compound of at least one element selected from elements other than titanium or a precursor of the compound, and (II) a co-catalyst component comprising a compound of at least one element selected from the group consisting of beryllium, magnesium, calcium, strontium, barium, boron, aluminum, gallium, manganese, cobalt, zinc, germanium, antimony and phosphorus; and the catalyst component (II) is added to the esterification reactor before the beginning of the esterification reaction or immediately after the beginning of the esterification reaction.

The hydrolyzate (I-j) obtained by hydrolyzing a titanium compound and the hydrolyzate (I-k) obtained by hydrolyzing a mixture of a titanium compound and a compound of at least one element selected from elements other than titanium or a precursor of the compound are the same as the hydrolyzate (I-j) and the hydrolyzate (I-K) previously described, respectively.

Examples of the co-catalyst components (II) include the same co-catalyst compounds as previously described. Of these, preferable are magnesium compounds such as magnesium carbonate and magnesium acetate; calcium compounds such as calcium carbonate and calcium acetate; and zinc compounds such as zinc chloride and zinc acetate. The co-catalyst compounds can be used singly or in combination of two or more kinds.

The production of a polyester comprising an esterification stem in which an aromatic dicarboxylic acid or an ester-forming derivative thereof and an aliphatic diol or an ester-forming derivative thereof are esterified to form a low condensate and a polycondensation step in which the low condensate is polycondensed in the presence of a polycondensation catalyst to increase the molecular weight is carried out through the esterification step, the liquid phase polycondensation step, and if necessary, the solid phase polycondensation step, as described above. However, the polycondensation of the esterification product fed to the liquid phase polycondensation step is conducted in the presence of a polycondensation catalyst comprising:

(II) a polycondensation catalyst compound comparing the hydrolyzate (I-j) or the hydrolyzate (I-k), and (II) a co-catalyst component.

Of the above components, the polycondensation catalyst compound (II) is added to the reactor before the beginning of the esterification reaction or immediately after the beginning of the esterification reaction. The expression "immediately after the beginning of the esterification reaction" used herein means a state where the degree of esterification is not more than 50%. The term "degree of esterification" means a degree of conversion of the aromatic dicarboxylic acid such as dicarboxylic acid, and the degree of esterification is expressed in a ratio between the acid value (AV) and the saponification value of the reaction product.

On the other hand, the co-catalyst component (II) can be added to the reactor in any stage of the esterification reaction step, or can be added to the reactor in the first stage of the liquid phase polycondensation reaction step. When the co-catalyst component (II) is fed in the esterification reaction step, the co-catalyst component (II) may be added at the same time as the catalyst component (II) or separately.

The catalyst compound (II) is used in an amount of usually 0.0005 to 0.2% by weight, preferably 0.001 to 0.05% by weight, in terms of weight of a metal in the catalyst compound (II), based on the weight or a mixture of the aromatic dicarboxylic acid and the aliphatic diol.

The co-catalyst component (II) s desirably used in such an amount that the molar ratio ((M)/)I-j)) of the metal atom (M) in the co-catalyst component (II) to titanium in the catalyst component (I-j) or the molar ratio ((M)/(I-k)) of the metal atom (M) in the co-catalyst component (II) to titanium and another element in the catalyst compound (I-k) is in the range of 1/50 to 50/1, preferably 1/40 to 40/1, more preferably 1/30 to 30/1. When a phosphorus compound such as a phosphate or a phosphite is used, the amount thereof is an amount in terms of a metal atom contained in the phosphorus compound.

According to the present invention, a polyester having a desired intrinsic viscosity can be obtained for a short period of time.

A further embodiment of the process for producing a polyester according to the invention is described below.

This embodiment is a process for producing a polyester, comprising polycondensing an aromatic dicarboxylic acid or an ester-forming derivative thereof and an aliphatic diol or an ester-forming derivative thereof in the presence of a polycondensation catalyst selected from the following catalysts (1) to (3) and a phosphoric ester to produce a polyester;

(1) a polycondensation catalyst comprising a hydrolyzate (I-m) obtained by hydrolyzing a titanium halide, (2) a polycondensation catalyst comprising a hydrolyzate (I-n) obtained by hydrolyzing a mixture of a titanium halide and a compound of at least one element selected from elements other than titanium or a precursor of the compound, and (3) a polycondensation catalyst comprising:
the hydrolyzate (I-m) or (I-n), and a compound of at least one element selected from beryllium, magnesium, calcium, strontium, barium, boron, aluminum, gallium, manganese, cobalt, zinc, germanium and antimony, a phosphate or a phosphite.

The hydrolyzate (I-m) obtained by hydrolyzing a titanium halide and the hydrolyzate (I-n) obtained by hydrolyzing a mixture of a titanium halide and a compound of at least one element selected from elements other than titanium or a precursor of the compound are the same as the hydrolyzate (I-m) and the hydrolyzate (I-n) previously described, respectively.

Examples of the compound of at least one element selected from the group comprising of beryllium, magnesium, calcium, strontium, barium, boron, aluminum, gallium, manganese, cobalt, zinc, germanium and antimony, the phosphate or the phosphite (sometimes referred to as a "co-catalyst compound (IIa)" hereinafter) include the same compounds as previously described with respect to the co-catalyst compounds. Such compounds can be used singly or in combination of two or more kinds. Preferred examples of the co-catalyst component (IIa) include magnesium compounds such as magnesium carbonate and magnesium acetate; calcium compounds such as calcium carbonate and calcium acetate; and zinc compounds such as zinc chloride and zinc acetate.

Examples of the phosphoric esters used in combination with the polycondensation catalyst in the polycondensation reaction include trimethyl phosphate, triethyl phosphate, tri-n-butyl phosphate, trioctyl phosphate, triphenyl phosphate and tricresyl phosphate.

The production of a polyester comprising polycondensing an aromatic dicarboxylic acid or an ester-forming derivative thereof and an aliphatic diol or an ester-forming derivative is carried out through the esterification step, the liquid phase polycondensation step, and if necessary, the solid phase polycondensation step, as described above.

The hydrolyzate (I-m) or (I-n) is used in an amount of usually 0.0005 to 0.2% by weight, preferably 0.001 to 0.05% by weight, in terms of weight of a metal in the polycondensation catalyst, based on the weight of a mixture of the aromatic dicarboxylic acid and the aliphatic diol.

The phosphoric ester is used in an amount of usually 0.001 to 0.1% by weight. Preferably 0.002 to 0.02% by weight, in terms of phosphorus atom. When the amounts of the hydrolyzate (I-m) or (I-n) and the phosphoric ester are within the above ranges, the effect of shortening the polycondensation time is high.

The co-catalyst component (IIa) is desirably used in such an amount that the molar ratio ((M)/(I-m)) of the metal atom (M) in the co-catalyst component (IIa) to titanium in the hydrolyzate (I-m) or the molar ratio ((M)/(I-n)) of the metal atom (M) in the co-catalyst component (IIa) to titanium and another element in the hydrolyzate (I-n) is in the range of 1/50 to 50/1, preferably 1/40 to 40/1, more preferably 1/30 to 30/1. When a phosphors compound such as a phosphate or a phosphite is used, the amount thereof is an amount in terms of a metal atom contained in the phosphorus compound.

The polycondensation catalyst and the phosphoric ester can be fed to any stage of the esterification reaction step, or can be fed in the reactor in the first stage of the polycondensation reaction step.

According to the present invention, a polyester having a desired intrinsic viscosity can be obtained for a short period of time.

A still further embodiment of the process for producing a polyester according to the invention is described below.

This embodiment is a process for producing a polyester, comprising polycondensing an aromatic dicarboxylic acid or an ester-forming derivative thereof and an aliphatic diol or an ester-forming derivative thereof in the presence of a polycondensation catalyst selected from the following catalysts (1) to (3) and at least one compound selected from cyclic lactone compounds and hindered phenol compounds to produce a polyester;

(1) a polycondensation catalyst comprising a hydrolyzate (I-m) obtained by hydrolyzing a titanium halide, (2) a polycondensation catalyst comprising a hydrolyzate (I-n) obtained by hydrolyzing a mixture of a titanium halide and a compound of at least one element selected from elements other than titanium or a precursor of the compound, and (3) a polycondensation catalyst comprising:
the hydrolyzate (I-m) or (I-n), and
a compound of at least one element selected from beryllium, magnesium, calcium, strontium, barium, boron, aluminum, gallium, manganese, cobalt, zinc, germanium and antimony, a phosphate or a phosphite.

The hydrolyzate (I-m) obtained by hydrolyzing a titanium halide and the hydrolyzate (I-n) obtained by hydrolyzing a mixture of a titanium halide and a compound of at least one element selected from elements other than titanium or a precursor of the compound are the same as the hydrolyzate (I-m) and the hydrolyzate (I-n) previously described, respectively.

The compound of at least one element selected from beryllium, magnesium, calcium, strontium, barium, boron, aluminum, gallium, manganese, cobalt, zinc, germanium and antimony, the phosphate or the phosphite is the same as the co-catalyst component (IIa) described above. Preferred examples of the co-catalyst components (IIa) include magnesium compounds such as magnesium carbonate and magnesium acetate; calcium compounds such as calcium carbonate and calcium acetate; and zinc compounds such as zinc chloride and zinc acetate.

At least one compound selected from cyclic lactone compounds and hindered phenol compounds used in the polycondensation reaction is, for example, 5,7-di-t-butyl-3-(3,4-dimethylphenyl)-3H-benzofuran-2-one, tetrakis(methylene-3(3,5-di-t-butyl-4-hydroxyphenyl) propionate)methane, tris(2,4-di-t-butylphenyl)phosphite, bis(2,6-di-t-butyl-4-phenylmethyl)pentaerythritol-diphosphite, 3,5-di-t-butyl-4-hydroxybenzylphosphoric acid distearyl ester, 2,6-di-t-butylphenol, 3,5-di-t-butyl-4-hydroxytoluene, n-octadecyl-3-(4'-hydroxy-3', 5'-di-t-butylphenyl) propionate, tris(3,5-di-t-butyl-4-hydroxyphenyl)phosphite, triphenyl phosphite, or tetrakis(2,4-di-t-butylphenly)-4,4'-biphenylene diphosphite.

These cyclic lactone compounds and hindered phenol compounds can be used singly or in combination.

At least one compound selected from cyclic lactone compounds and hindered phenol compounds is preferably a mixture of 5,7-di-t-butyl-3-(3,4-dimethylphenyl)-3H-benzofuran-2-one, tetrakis(methylene-3(3,5-di-t-butyl-4-hydroxyphenyl)propionate)methane and tris(2,4-di-t-butylphenyl)phosphite.

The production of a polyester comprising polycondensing an aromatic dicarboxylic acid or an ester-forming derivative thereof and an aliphatic diol or an ester-forming derivative is carried out through the esterification step, the liquid phase polycondensation step, and if necessary, the solid phase polycondensation step, as described above.

The hydrolyzate (I-m) or (I-n) is used in an amount of usually 0.0005 to 0.2% by weight, preferably 0.001 to 0.05% by weight, in terms of a metal atom in the polycondensation catalyst (1) or (2), based on the weight of a mixture of the aromatic dicarboxylic acid and the aliphatic dial. When the amount of the hydrolyzate (I-m) or (I-n) is within the above range, the effect of shortening the polycondensation time is high.

The hydrolyzate (I-m) or (I-n) can be fed to the reactor in the esterification reaction step, or can be fed to the reactor in the first stage of the liquid phase polycondensation reaction step.

When the co-catalyst component (IIa) is added, this component is desirably used in such an amount that the molar ratio ((M)/(I-m)) of the metal atom (M) in the co-catalyst component to titanium in the hydrolyzate (I-m) or the molar ratio ((M)/(I-n)) of the metal atom (M) in the co-catalyst component to titanium and another element in the hydrolyzate (I-n) is in the range of 1/50 to 50/1, preferably 1/40 to 40/1, more preferably 1/30 to 30/1. When a phosphorus compound such as a phosphate or a phosphite is used, the amount thereof is an amount in terms of a metal atom contained in the phosphoruos compound.

The co-catalyst component (IIa) can be fed to the reactor in the esterification reaction step, or can be fed to the reactor in the first stage of the liquid phase polycondensation reaction step. Further, the co-catalyst component can be added at the same time as the hydrolyzate (I-m) or (I-n) or separately.

The at least one compound selected from cyclic lactone compounds and hindered phenol compounds is used in an amount of usually 10 to 2000 ppm, preferably 30 to 1000 ppm, based on aromatic dicarboxylic acid units in the low condensate. When the amount of at least one compound selected from cyclic lactone compounds and hindered phenol compounds is in the above range, a polyester having a low content of acetaldehyde can be obtained.

The at least one compound selected from cyclic lactone compounds and hindered phenol compounds can be fed in the reactor in the esterification reaction step, or can be fed to the reactor in the first stage of the liquid phase polycondensation reaction step. Further, such compound can be added at the same time as the hydrolyzate (I-m) or (I-n) or separately.

In the present invention, at least one phosphorus compound selected from phosphoric acid and phosphoric esters may be used in combination in the polycondensation reaction. Examples of the phosphoric esters include trimethyl phosphate, triethyl phosphate, tri-n-butyl phosphate, trioctyl phosphate, triphenyl phosphate and tricresyl phosphate.

The phosphoric compound is used in an amount of usually 0.001 to 0.1% by weight, preferably 0.002 to 0.02% by weight, in terms of phosphorus atom, based on the weight of a mixture of the aromatic dicarboxylic acid and the aliphatic diol.

The phosphoric compound can be fed to the reactor in the esteriafion reaction step, or can be fed to the reactor in the first stage of the liquid phase polycondensation reaction step.

The polyester obtained by the above process has a low acetaldehyde content. From such polyester, molded products hardly generating bad odor or foreign odor or hardly changing flavor or scent of the contents can be obtained.

The acetaldehyde content in the polyester is measured by the aforesaid method.

According to the present invention, a polyester can be produced with high polymerization activity, and the resulting polyester has a low acetaldehyde content.

A still further embodiment of the process for producing a polyester according to the invention is described below.

This embodiment is a process for producing a polyester, comprising an esterification step in which an aromatic dicarboxylic acid or an ester-forming derivative thereof and an aliphatic diol or an ester-forming derivative thereof are esterified to form a low condensate and a polycondensation step in which the low condensate is polycondensed in the presence of a polycondensation catalyst to increase the molecular weight, wherein:

the polycondensation catalyst used is a catalyst comprising:

(II) a polycondensation catalyst component comprising a hydrolyzate (I-m) obtained by hydrolyzing a titanium halide or a hydrolyzate (I-n) obtained by hydrolyzing a mixture of a titanium halide and a compound of at least one element selected from elements other than titanium or a precursor of the compound, and (II) a co-catalyst component comprising a compound of at least one element selected from the group consisting of beryllium, magnesium, calcium, strontium, barium, boron, aluminum, gallium, manganese, cobalt, zinc, germanium, antimony and phosphorus; and a tint adjusting agent is added in the esterification step or the polycondensation step.

The hydrolyzate (I-m) obtained by hydrolyzing a titanium halide and the hydrolyzate (I-n) obtained by hydrolyzing a mixture of a titanium halide and a compound of at least one element selected from elements other than titanium or a precursor of the compound are the same as the hydrolyzate (I-m) and the hydrolyzate (I-n) previously described, respectively.

Examples of the co-catalyst components (II) comprising a compound of at least one element selected from the group consisting of beryllium, magnesium, calcium, strontium, barium, boron, aluminum, gallium, manganese, cobalt, zinc, germanium, antimony and phosphorus include the same co-catalyst compounds as previously described. Preferred examples of the co-catalyst components (II) include magnesium compounds such as magnesium carbonate and magnesium acetate; calcium compounds such as calcium carbonate and calcium acetate; and zinc compounds such as zinc chloride and zinc acetate. The co-catalyst compounds can be used singly or in combination of two or more kinds.

The production of a polyester comprising an esterification step in which an aromatic dicarboxylic acid or an ester-forming derivative thereof and an aliphatic diol or an ester-forming derivative thereof are esterified to form a low condensate and a polycondensation step in which the low condensate is polycondensed in the presence of a polycondensation catalyst to increase the molecular weight is carried out through the esterification step, the liquid phase polycondensation step, and if necessary, the solid phase polycondensation step, as described above.

The polycondensation catalyst component (I) is used in an amount of usually 0.0005 to 0.2% by weight, preferably 0.001 to 0.05% by weight, in terms of weight of a metal in the catalyst component (I), based on the weight of a mixture of the aromatic dicarboxylic acid and the aliphatic diol.

The co-catalyst component (II) is desirably used in such an amount that the molar ratio ((M)/(Ti)) of the metal atom (M) in the co-catalyst component to titanium (and another element if the component (I) contains another element) (TI) in the polycondensation catalyst component (I) is in the range of 1/50 to 50/1, preferably 1/40 to 40/1, more preferably 1/30 to 30/1. When a phosphorus compound such as a phosphate or a phosphite is used as the co-catalyst component, the amount thereof is an amount in terms of a metal atom contained in the phosphorus compound.

The co-catalyst component (II) can be fed to the polymerization reactor in the esterification reaction step, or can be fed to the reactor in the first stage of the liquid phase polycondensation reaction step. Further, the co-catalyst component can be added at the same time as the polycondensation catalyst component or separately.

The tint adjusting agent employable herein is, for example, an organic pigment, an inorganic pigment, an organic dye or an inorganic dye, and is particularly preferably one having a tint of blue or red. Specific examples thereof include Solvent Blue 104, Pigment Red 263, Solvent Red 135, Pigment Blue 29, Pigment Blue 15:1, Pigment Blue 15:3, Pigment Red 187 and Pigment Violet 19 (Color Index Name).

The tint adjusting agents can be used singly or in combination.

The tint adjusting agent is used in an amount of usually 0.05 to 100 ppm, preferably 0.1 to 50 ppm, based on the weight of the polyester.

The tint adjusting agent can be fed to the reactor in the esterification reaction step, or can be fed to the reactor in the first stage of the liquid phase polycondensation reaction step. Further, the tint adjusting agent can be added at the same time as the polycondensation catalyst component or separately.

According to the present invention, a polyester having a good tint can be produced with high polymerization activity.

Next, the method for treating a polyester according to the present invention is described.

One embodiment of the method for treating a polyester according to the invention comprises bringing a polyester, which is obtained by the use of titanium compound catalyst and in which the reaction has been completed, into contact with a phosphorous acid aqueous solution, a hypophosphorous acid aqueous solution, a phosphoric ester aqueous solution, a phosphorous ester aqueous solution or a hypophosphorous ester aqueous solution, each of said solutions having a concentration of not less than 10 ppm in terms of phosphorus atom.

Another embodiment of the method for treating a polyester according to the invention comprises bringing a polyester, which is obtained by the use of a titanium compound catalyst and in which the reaction has been completed, into contact with an organic solvent A further embodiment of the method for treating a polyester according to the invention comprises bringing a polyester, which is obtained by the use of a titanium compound catalyst and in which the reaction has been completed, into contact with an organic solvent solution of phosphoric acid, an organic solvent solution of a phosphoric ester, and organic solvent solution of phosphorous acid, an organic solvent solution of hypophosphorous acid, an organic solvent solution of a phosphorous ester or an organic solvent solution of a hypophosphorous ester, each of said solutions having a concentration of not less than 10 ppm in terms of phosphorus atom.

The polyester used in the treating method of the invention is a polyester produced by using as starting materials an aromatic dicarboxylic acid or an ester-forming derivative thereof, an aliphatic diol or an ester-forming derivative thereof, and if necessary, a polyfunctional compound or the like, and is preferably polyethylene terephthalate produced by using as starting materials terephthalic acid or an ester-forming derivative thereof and ethylene glycol or an ester-forming derivative thereof. In the polyethylene terephthalate, other dicarboxylic acids and/or other glycols may be copolycondensed in amounts of not more than 20% by mol.

Examples of dicarboxylic acids other than terephthalic acid include aromatic dicarboxylic acids, such as phthalic acids, isophthalic acid, naphthalenedicarboxylic acid, diphenyldicarboxylic acid and diphenoxyethanedicarboxylic acid; aliphatic dicarboxylic acids, such as adipic acid, sebacic acid, azelaic acid and decanedicarboxylic acid; alicyclic dicarboxylic acids, such as cyclohexanedicarboxylic acid; and ester-forming derivatives thereof.

Examples of glycols other than ethylene glycol include aliphatic glycols, such as trimethylene glycol, propylene glycol, tetramethylene glycol, neopentyl glycol, hexamethylene glycol and dodecamethylene glycol; alicyclic glycols, such as cyclohexanedimethanol; aromatic diols, such as bisphenols, hydroquinone, 2,2-bis(4-β-hydroxyethoxyphenyl)propane, 1,3-bis(2-hydroxyethoxy)benzene and 1,4-bis(2-hydroyethoxy)benzene; and ester-forming derivatives thereof The polyester used in the treating method of the invention can be produced by using, as starting materials, the aromatic dicarboxylic acid or an ester-forming derivative thereof and the aliphatic diol or an ester-forming derivative thereof, preferably terephthalic acid or an ester-forming derivative thereof and ethylene glycol or an ester-forming derivative thereof, and performing the esterification, the liquid phase polycondensation, and if necessary, the solid phase polycondensation, as previously described.

The polycondensation reaction is preferably carried out in the presence of the below-described polycondensation catalyst and the aforesaid stabilizer.

The polycondensation catalyst employable herein is, for example, the aforesaid hydrolyzate (I-m) obtained by hydrolyzing a titanium halide or the aforesaid hydrolyzate (I-n) obtained by hydrolyzing a mixture of a titanium halide and a compound of at least one element selected from elements other than titanium or a precursor of the compound.

Also employable as the polycondensation catalyst are titanium alkoxide, such as titanium butoxide and titanium tetraisopropoxide; organic titanium compounds, such as an acetylacetonato salt of titanium; and titanium compounds, such as a hydrolyzate obtained by hydrolyzing titanium alkoxide. The hydrolyzate of titanium alkoxide can be prepared in a manner similar to that for preparing the hydrolyzate of titanium halide previously described.

The hydrolyzate (I-m) or the hydrolyzate (I-n) (titanium-containing hydrolyzate (A-2)) isused in combination with a co-catalyst component (II), if desired.

Examples of the co-catalyst components (II) include the same co-catalyst compounds previously described. Of these, preferable are magnesium compounds, such as magnesium carbonate and magnesium acetate; calcium compounds, such as calcium carbonate and calcium acetate; and zinc compounds such as zinc chloride and zinc acetate. The co-catalyst compounds can be used singly or in combination of two or more kinds.

When the magnesium compound is used as the co-catalyst component, a polyester (particularly, polyethylene terephthalate) having excellent transparency can be obtained.

The co-catalyst component (II) is desirably used in such an amount that the molar ratio ((II)/(A-2)) of the metal atom in the co-catalyst component (II) to titanium (and another element if the titanium-containing hydrolyzate (A-2) contains another element) in the titanium-containing hydrolyzate (A-2) is in the range of 1/50 to 50/1, preferably 1/40 to 40/1, more preferably 1/30 to 30/1. When a phosphorus compound such as a phosphate or a phosphite is used, the amount thereof is an amount in terms of a metal atom contained in the phosphorus compound.

The polycondensation catalyst (II) is used in an amount of usually 0.0005 to 0.2% by weight, preferably 0.001 to 0.05% by weight, in terms of weight of a metal in the polycondensation catalyst, based on the weight of a mixture of the aromatic dicarboxylic acid and the aliphatic diol. The stabilizer is used in an amount of usually 0.001 to 0.1% by weight, preferably 0.002 to 0.02% by weight, in terms of phosphorus atom in the stabilizer. The polycondensation catalyst and the stabilizer can be fed to the reactor in the liquid phase esterification reaction step, or can be fed to the reactor in the first stage of the polycondensation reaction step.

When the polyester of the invention is polyethylene terephthalate, the polyethylene terephthalate obtained from the last polycondensation reactor in the polycondensation reaction step desirably comprises:

95.0 to 99.0% by mol of ethylene terephthalate component units represented by the following formula:

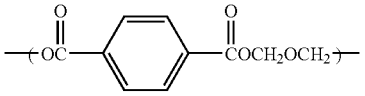

and 1.0 to 5.0%by mol of dioxyethylene terephthalate component units represented by the following formula:

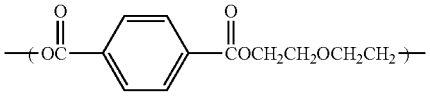

The intrinsic viscosity of the polyester obtained as above is desired to be usually not less than 0.50 dl/g, preferably 0.50 to 1.50 dl/g, more preferably 0.72 to 1.0 dl/g. The density of the polyester is desired to be usually not less than 1.37 g/cm$^3$, preferably 1.37 to 1.44 g/cm$^3$, more preferably 1.38 to 1.43 g/cm$^3$, still more preferably 1.39 to 1.42 g/cm$^3$.

The acetaldehyde content in the polyester is desired to be not more than 5 ppm, preferably 0 to 3 ppm, particularly preferably 0 to 2 ppm. The acetaldehyde content is measured by the aforesaid method.

In the method for treating a polyester according to the invention, a polyester in which the reaction of the polyester production has been completed is used. The "polyester in which the reaction has been completed" means a polyester which does not exhibit a further increase of its viscosity after the reaction, and is for example a polyester given after the liquid phase polycondensation step or a polyester given after the solid phase polycondensation step. The polyester is usually particulate, but it may be in the form of powder or strand.

In the present invention, the polyester, preferably polyethylene terephthalate, is subjected to:

a phosphorous-containing aqueous solution treatment in which the polyester, preferably polyethylene terephthalate, is brought into contact with a phosphorous acid aqueous solution, a hypophosphorous acid aqueous solution, a phosphoric ester aqueous solution, a phosphorous ester aqueous solution or a hypophosphorous ester aqueous solution (each solution sometimes being referred to as a "phosphorus-containing aqueous solution" hereinafter);

an organic solvent treatment in which the polyester, preferably polyethylene terephthalate, is brought into contact with an organic solvent; or a phosphorous-containing organic solvent solution treatment in which the polyester, preferably polyethylene terephthalate, is brought into contact with an organic solvent solution of phosphoric acid, an organic solvent solution of phosphoric acid, an organic solvent solution of hypophosphorous acid, an organic solvent solution of a phosphoric ester, an organic solvent solution of a phosphorous ester or an organic solvent solution of a hypophosphorous ester (each solution sometimes being referred to as a "phosphorus-containing organic: so,vent solution" hereinafter).

Examples of the phosphoric esters used in the phosphorus-containing aqueous solution treatment include monomethyl phosphate, dimethyl phosphate, trimethyl phosphate, monomethyl phosphate, diethyl phosphate, triethyl phosphate, tributyl phosphate, tri-n-butyl phosphate, trioctyl phosphate, triphenyl phosphate and tricresyl phosphate. Examples of the phosphorous eaters include methyl phosphite, dimethyl phosphite, trimethyl phosphite, ethyl phosphite, diethyl phosphite, triethyl phosphite, tributyl phosphite, triphenyl phosphite, trisdodecyl phosphite and trisnonylphenyl phosphite. Examples of the hypophosphorous esters include methyl hypophosphite and trimethyl hyophosphite.

The phosphorus-containing aqueous solution to be contacted with the polyester desirably has a concentration (in terms of phosphorus atom) of not less than 10 ppm, preferably 10 to 100000 ppm, more preferably 100 to 70000 ppm, particularly preferably 1000 to 50000 ppm.

When the concentration of the phosphorus-containing aqueous solution is in the above range, the effect of inhibiting increase of the acetaldehyde content is high in the molding of the resulting polyester, and the molding can be made economically.

The contact of the polyester with the phosphorus-containing aqueous solution car be carried out continuously or batchwise.

In the batchwise contact of the polyester with the phosphorus-containing aqueous solution, for example, a silo type treating apparatus is employable. In detail, the polyester and the phosphorus-containing aqueous solution are introduced into a silo to immerse the polyester in the phosphorus-containing aqueous solution. It is also possible that the polyester and the phosphorus-containing aqueous solution are introduced into a rotary cylindrical container to immerse the polyester in the phosphorus-containing aqueous solution and contacted while rotating the cylindrical container to perform the contact more efficiently.

In the continuous contact of the polyester with the phosphorus-containing aqueous solution, for example, a tower type treating apparatus is employable. The polyester is continuously fed to the tower type treating apparatus at its top, and the phosphorus-containing aqueous solution is continuously fed to the apparatus as a counter flow or a parallel flow, whereby the polyester is immersed in the phosphorus-containing aqueous solution to contact them with each other.

The temperature for the contact of the polyester with the phosphorus-containing aqueous solution is in the range of usually 0 to 100° C., preferably 10 to 95° C., and the contact time is in the range of usually 5 minutes to 10 hours, preferably 30 minutes to 6 hours.

After the contact of the polyester with the phosphorous-containing aqueous solution, the polyester is separated from the phosphorus-containing aqueous solution, hydro-extracted by a hydro-extracting device such as a particle vibrating screen or a Simon Carter (Gel dryer), and dried. Drying of the polyester having been contacted with the phosphorus-containing aqueous solution can be carried out by a conventional drying method.

In order to continuously dry the polyester, a hopper type through-flow dryer in which the polyester is fed at the top and a drying gas is fed from the bottom and passed through is generally used. For decreasing the drying gas and thereby efficiently drying the polyester, a method of using a continuous dryer of rotary disc heating type is available. In this method, while passing a small amount of a drying gas, a heating steam or a heating medium is fed to a rotary disc or an external jacket to indirectly heat and dry the polyester.

In order to batchwise dry the polyester, a method of using a double-cone type rotary dryer is available. In this method, the polyester is dried under reduced pressure, or under reduced pressure with passing a small amount of a drying gas, or at atmospheric pressure with passing a drying gas. The drying gas may be the atmosphere, but dry nitrogen or dehumidified air is preferable from the viewpoint of inhibition of decrease of the molecular weight due to the hydrolysis of the polyester.

When the polyester is brought into contact with the phosphorus-containing aqueous solution as described above, the resulting polyester has small increase of the acetaldehyde content and small decrease of the intrinsic viscosity in the molding process. The reason is presumably that the polycondensation catalyst in the polyester is deactivated by the contact of the polyester with the phosphorous-containing aqueous solution.

From such polyester, molded products hardly generating bad odor or foreign odor or hardly changing flavor or scene of the contents can be obtained.

This can be confirmed by, for example, measuring increase of the acetaldehyde content after the polyester is heated to a temperature of 275° C. to melt it and then molded into a stepped square plate molded product. The steeped square plate molded product can be produced in the following manner.

In the first place, 2 kg of a particulate polyester (i.e., polyester pellets, starting material) whose acetaldehyde content (x % by weight) has been beforehand measured is dried for 16 hours or more under the conditions of a temperature of 140° C. and a pressure of 10 Torr using a tray dryer, to allow the particulate polyester to have a water content of not more than 50 ppm.

The particulate polyester thus dried is then injection molded by an injection molding machine of M-70A manufactured by Meiki Seisakusho K.K. to obtain a stepped square plate molded product. In the molding, nitrogen having a dew point of −70° C. is fed to the upper part of the hopper and the screw feeder shooting part at a rate of 5 $Nm^3$/hr. The molding is carried out under the conditions of a barrel preset temperature of 275° C., C1/C2/C3/ nozzle tip temperatures of the molding machine of 260° C./290° C./290° C./300° C., and a mold cooling temperature of 15° C.

In the injection molding, the dried particulate polyester is fed through the hopper to the injection molding machine having been adjusted to have molding conditions of metering of 12 seconds and injection of 60 seconds. The residence time of the molten resin in the molding machine is about 72 seconds. The weight of a stepped square plate molded product is 75 g, and any one of the eleventh to fifteenth stepped square plate molded products from the beginning of the injection molding is used as a specimen for measuring the acetaldehyde content.

The stepped square plate molded product has a shape shown in FIG. 1, and the thicknesses of the parts A, B and C are about 6.5 mm, about 5 mm and about 4 mm, respectively. The acetaldehyde content in the molded product is measured using the part C.

The part C of the stepped square plate molded product produced as above is cut into chips, and using the chips as acetaldehyde content measuring samples, the acetaldehyde content is measured.

When the polyester, preferably polyethylene terephthalate, is subjected to the phosphorus-containing aqueous solution treatment as described above, the resulting polyester has small increase of the acetaldehyde content and small decrease of the intrinsic viscosity in the molding process.

The organic solvent treatment is described below.

Examples of organic solvent used in the organic solvent treatment include alcohols having 1 to 18 carbon atoms, preferably 1 to 10 carbon atoms, such as methanol, ethanol, propanol, isopropanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol; ketones having 3 to 15 carbon atoms, preferably 3 to 9 carbon atoms, such as acetone, methyl ethyl ketone, methyl isobutyl ketone, acetophenone, benzophenone and benzoquinone; and saturated hydrocarbons having 5 to 16 carbon atoms, preferably 5 to 10 carbon atoms, such as butane, pentane, hexane, heptane, octane, nonane, decane, undecane, dedocena, tridecane, tetradecane, pentadecane and hexadecane. Of theses, isopropanol or acetone is preferable.

The contact of the polyester with the organic solvent can be carried out continuously or batchwise. Specifically, the contact can be carried out in the same manner as in the phosphorus-containing aqueous solution treatment except for using the organic solvent instead of the phosphorus-containing aqueous solution.

The temperature for the contact of the polyester with the organic solvent is in the range of usually 0 to 100° C., preferably 10 to 95° C., although it varies depending upon the boiling point of the organic solvent. The contact time is in the range of usually 3 minutes to 5 hours, preferably 30 minutes to 4 hours.

After the contact of the polyester with the organic solvent, the polyester is separated from the organic solvent, hydro-extracted by a hydro-extracting device such as a particle vibrating screen or a Simon Carter (Gel dryer), and dried. Drying of the polyester having been contacted with the organic solvent can be carried out by a conventional drying method. Specifically, the continuous drying method or the batchwise drying method described above is available.

When the polyester is brought into contact with the organic solvent as described above, the resulting polyester has small increase of the acetaldehyde content during the molding process. The reason is presumably that the polycondensation catalyst in the polyester is deactivated by the contact of the polyester with the organic solvent.

Form such polyester, molded products hardly generating bad odor or foreign odor or hardly changing flavor or scent of the contents can be obtained. This can be confirmed by measuring the acetaldehyde content in the sample, which is obtained by heating the polyester to a temperature of 270° C. to melt it and then cooling it to room temperature, in accordance with the aforesaid method.

When the polyester, preferably polyethylene terephthalate, is subjected to the organic solvent treatment as described above, the resulting polyester has small increase of the acetaldehyde content during the molding process.

The phosphorous-containing organic solvent solution treatment is described below.

Examples of phosphoric esters used in the phosphorus-containing organic solvent solution treatment include the same phosphoric esters as used in the phosphorus-containing aqueous solution treatment.

Examples of organic solvents used in the phosphorus-containing organic solvent solution treatment include the same organic solvent as used in the organic solvent treatment. Of these, isopropanol or acetone is preferable.

The phosphorus-containing organic solvent solution to be contacted with the polyester has a concentration (in terms of phosphorus atom) of not less than 10 ppm, preferably 10 to 100000 ppm, more preferably 100 to 70000 ppm, particularly preferably 1000 to 50000 ppm.

When the concentration of the phosphorus-containing organic solvent solution is in the above range, the effect of inhibiting increase of the acetaldehyde content is high in the molding of the resulting polyester, and the molding can be made economically.

The contact of the polyester with the phosphorus-containing organic solvent solution can be carried out continuously or batchwise. Specifically, the contact can be carried out in the same manner as in the phosphorous-containing aqueous solution treatment except for using the phosphorous-containing organic solvent solution instead of the phosphorus-containing aqueous solution.

The temperature for the contact of the polyester with the phosphorus-containing organic solvent solution is in the range of usually 0 to 100° C., preferably 0 to 95° C., although it varies depending upon the boiling point of the organic solvent. The contact time is in the range of usually 5 minutes to 10 hours, preferably 30 minutes to 6 hours.

After the contact of the polyester with the phosphorus-containing organic solvent solution, the polyester is separated from the phosphorus-containing organic solvent solution, hydro-extracted by a particle hydro-extracting device such as a vibrating screen or a Simon Carter and dried. Drying of the polyester having been contacted with the phosphorus-containing organic solvent solution can be carried out by a conventional drying method. Specifically, the continuous drying method or the batchwise drying method described above is available.

When the polyester is brought into contact with the phosphorus-containing organic solvent solution as described above, the resulting polyester has small increase of the acetaldehyde content during the molding process. The reason is presumably that the polycondensation catalyst in the polyester is deactivated by the contact of the polyester with the phosphorus-containing organic solvent solution.

From such polyester, molded products hardly generating bad odor or foreign odor or hardly changing flavor or scent of the contents can be obtained.

This can be confirmed by measuring the acetaldehyde content in the sample, which is obtained by heating the polyester to a temperature of 285° C. to melt it and then cooling it to room temperature, in accordance with the aforesaid method.

When the polyester, preferably polyethylene terephthalate, is subjected to the phosphorus-containing organic solvent solution treatment as described above, the resulting polyester has small increase of the acetaldehyde content during the molding process.

Next, the polyester according to the invention is described.

The polyester (P-1) can be produced by the aforesaid process using the catalyst for polyester production comprising the solid titanium compound (I-c) and the co-catalyst component (II) or the catalyst for polyester production comprising the titanium-containing solid compound (I-d) and if necessary the co-catalyst component (II).

The intrinsic viscosity of the polyester (P-1) is desired to be usually not less than 0.50 dl/g, preferably 0.50 to 1.50 dl/g, more preferably 0.72 to 1.0 dl/g. The density thereof is desired to be usually not less than 1.37 g/cm$^3$, preferably 1.37 to 1.44 g/cm$^3$, more preferably 1.38 to 1.43 g/cm$^2$, still more preferably 1.39 to 1.42 g/cm$^3$.

The haze of the polyester (P-1) such as polyethylene terephthalate, i.e., haze of a molded product in the form of a plate having a thickness of 4 mm obtained by molding the polyester at a molding temperature of 275° C., is usually not more than 20%, preferably 0 to 10%.

The plate molded product for the measurement of a haze is the part C of the aforesaid stepped square plate molded product, and the stepped square plate molded product can be produced in the same manner as for the stepped square plate molded product for the measurement of increase of the acetaldehyde content. As a specimen for measuring the haze, any one of the eleventh to fifteenth stepped square plate molded products from the beginning of the injection molding is used. In the measurement of a haze, a haze meter (Suga tester) HGM-2DP is used.

The polyester (P-1) is excellent in tint, partially in transparency, and has a low acetaldehyde content. The polyester (P-1) can be used as a material of various molded products. For example, the polyester is melt molded and used as blow molded articles (e.g., bottles), sheets, films, fibers, etc., but it is partially preferably used as bottles.

In order to produce bottles, sheets, films, fibers, etc. from the polyester (P-1) such as polyethylene terephthalate, hitherto known processes are available.

Examples of the processes for producing bottles include a process comprising extruding the polyester (P-1) (preferably polyethylene terephthalate) in a molten state from a die to form a tubular parison, holding the parison in a mold of desired shape, and blowing air into the parison to fit it to the mold thereby to produce a blow molded article, and a process comprising injection molding the polyester (P-1) (preferably polyethylene terephthalate) to form a preform, heating the preform up to a temperature appropriate to stretching, holding the preform in a mold of desired shape, and blowing air into the preform to fit it to the mold thereby to produce a blow molded article.

One example of the process for producing films or sheets is a process comprising extruding molten polyethylene terephthalate from a T-die using an extruder and molding conditions hitherto known. The thus obtained films and sheets may be stretched by a known stretching method.

One example of the process for producing fibers is a process comprising extruding a molten polyester (P-1), preferably molten polyethylene terephthalate, through a spinneret. The thus obtained fibers may be stretched.

The polyester (P-1), preferably polyethylene terephthalate, and the molded products obtained therefrom are excellent in transparency and tint and have a low acetaldehyde content.

Another embodiment of the polyester according to the invention is described below.

The polyester (P-2) is obtained by the aforesaid process for producing a polyester, wherein:

The polycondensation catalyst which comprises the polycondensation catalyst compound (II) comprising the hydrolyzate (I-m) or the hydrolyzate (I-n) and the co-catalyst component (II) is used, and a tint adjusting gent is added in the esterification step or the polycondensation step.

The intrinsic viscosity of the polyester (P-2) is desired to be usually not less than 0.50 dl/g, preferably 0.50 to 1.50 dl/g, more preferably 0.72 to 1.0 dl/g. The density thereof is desired to be usually not less than 1.37 g/cm$^3$, preferably 1.37 to 1.44 g/cm$^3$, more preferably 1.38 to 1.43 g/cm$^3$, still more preferably 1.39 to 1.42 g/cm$^3$.

In the polyester (P-2), a titanium atom is contained in an amount of 0.1 to 200 ppm, preferably 0.5 to 100 ppm, more preferably 1 to 50 ppm, based on the weight of the polyester, and a metal atom M selected from beryllium, magnesium, calcium, strontium, barium, boron, aluminum, gallium, manganese, cobalt, zinc and antimony is contained in an amount of 0.1 to 500 ppm, preferably 0.5 to 300 ppm, more preferably 1 to 250 ppm, based on the weight of the polyester.

The metal atom M is preferably magnesium, calcium or zinc, particularly preferably magnesium. Two or ore kinds of metal atoms M may be contained, and in this case, the total of two or more kinds of the metal atoms is within the above range.

The titanium atom contained in the polyester (P-2) is preferably a titanium atom derived from the polycondensation catalyst obtained by hydrolyzing a titanium halide, and the metal atom M is preferably a metal atom derived from the co-catalyst component.

The molar ratio (titanium atom/metal atom M) of the titanium atom to the metal atom M is in the range of 1/50 to 50/1, preferably 1/40 to 40/1, more preferably 1/30 to 30/1.

The titanium atom content and the metal atom content in the polyester of the invention is measured by a fluorescent X-ray method.

In the polyester (P-2), the tint adjusting agent is desirably contained in an amount of 0.01 to 100 ppm, preferably 0.1 to 50 ppm.

The content of a germanium atom in the polyester (P-2) is desirably not more than 5 ppm.

The polyester (P-2), preferably polyethylene terephthalate, has an excellent tint.

A further embodiment of the polyester according to the invention is described below.

The intrinsic viscosity of the polyester (P-3) is desired to be usually not less than 0.50 dl/g, preferably 0.50 to 1.50 dl/g, more preferably 0.72 to 1.0 dl/g. The density thereof is desired to be usually not less than 1.37 g/cm$^3$, preferably 1.37 to 1.44 g/cm$^3$, more preferably 1.38 to 1.43 g/cm$^3$, still more preferably 1.39 to 1.42 g/cm$^3$.

In the polyester (P-3), a titanium atom is contained in an amount of 0.1 to 200 ppm, preferably 0.5 to 100 ppm, more preferably 1 to 50 ppm, based on the weight of the polyester, and a metal atom M selected from beryllium, magnesium, calcium, strontium, barium, boron, aluminum, gallium, manganese, cobalt, zinc and antimony is contained in an amount of 0.1 to 500 ppm, preferably 0.5 to 300 ppm, more preferably 1 to 250 ppm, based on the weight of the polyester.

The metal atom M is preferably magnesium, calcium or zinc, particularly preferably magnesium. Two or more kinds of metal atoms M may be contained, and in this case, the total of two or more kinds of the metal toms is within the above range.

The content of a germanium atom in the polyester (P-3) is desirably not more than 5 ppm.

The titanium atom contained in the polyester (P-3) is preferably a titanium atom derived from the polycondensation catalyst obtained by hydrolyzing a titanium halide, and the metal atom M is preferably a metal atom derived from the co-catalyst component.

The molar ratio (titanium atom/metal atom M) of the titanium atom to the metal atom M is in the range of usually 0.05 to 50, preferably 0.1 to 30, more preferably 0.2 to 25.

In the polyester (P-3), the content ($W_0$ ppm) of acetaldehyde is not more than 4 ppm, preferably 0.1 to 3.5 ppm, more preferably 0.5 to 3.0 ppm.

When a content of acetaldehyde in a stepped square plate molded product obtained by heating the polyester (P-3) (acetaldehyde content: $W_0$ ppm) to a temperature of 275° C. to melt it and molding the molten polyester is taken as $W_1$ ppm, the value of $W_1-W_0$ is not more than 10 ppm, preferably not more than 9 ppm.

The polyester (P-3), preferably polyethylene terephthalate, has a low acetaldehyde content and is remarkably inhibited in increase of the acetaldehyde content when the polyester is molded into a molded product. For example, when the polyester (P-3) is molded into a bottle, flavor or scent of the contends filled in the bottle is hardly deteriorated.

In the present invention, the increase of the acetaldehyde content during the molding is determined by measuring an acetaldehyde content in a stepped square plate molded product of the polyester by the aforesaid method.

In the present invention, the term "acetaldehyde content" means an acetaldehyde content ($W_0$ ppm) measured with respect to the polyester before molding and an acetaldehyde content ($W_1$ ppm) measured with respect to the molded product obtained by injection molding of the polyester at a molding temperature of 275° C. From the values of $W_0$ ppm and $W_1$ ppm, a value of $W_1-W_0$ is calculated.

When a polyester having a low acetaldehyde content ($W_0$ ppm) and a $W_1-W_0$ value (i.e., increase of acetaldehyde) of not more than 10 ppm is used, a molded product hardly generating bad odor or foreign odor and hardly changing flavor or scent of the contents can be obtained because the acetaldehyde content in the molded product is low.

The polyester (P-3) is preferably polyethylene terephthalate.

The polyester (P-3) having the above properties is obtained by preparing a polyester in a manner similar to that for preparing a polyester used in the aforesaid polyester treating method and then subjecting the polyester in which the reaction has been completed to the phosphorus-containing aqueous solution treatment, the organic solvent treatment or the phosphorus-containing organic solvent solution treatment.

The acetaldehyde content in the polyester to be subjected to the phosphorus-containing aqueous solution treatment, the organic solvent treatment or the phosphorus-containing organic solvent solution treatment is usually not more than 4 ppm, preferably 0.1 to 3.5 ppm, more preferably 0.5 to 3.0 ppm.

Of the above treatments, the phosphorus-containing aqueous solution treatment and the phosphorus-containing organic solvent solution treatment are preferable, and the phosphorus-containing aqueous solution treatment is more preferable.

By subjecting the polyester in which the reaction as been completed to the phosphorus-containing aqueous solution treatment, the organic solvent treatment or the phosphorus-containing organic solvent solution treatment, increase of the acetaldehyde content in the molding process can be inhibited. The reason why the increase of the acetaldehyde content in the polyester during the molding can be inhibited by subjecting the polyester to any of the above treatments is presumably that the polycondensation catalyst in the polyester is deactivated, and therefore even when the polyester is heated, the decomposition reaction or the ester interchange reaction hardly proceeds and the amount of the acetaldehyde produced becomes small.

The polyester having been treated as above is remarkably inhibited in the increase of the acetaldehyde content during the molding process. This can be confirmed by measuring the acetaldehyde content after the polyester having been subjected to the above treatment is heated to a temperature of 275° C. to melt it and molded into a stepped square plate molded product.

The polyester (P-3) has a low acetaldehyde content and small increase of acetaldehyde content in the molding process. Therefore, molded products, e.g., bottles, films and sheets, having a low acetaldehyde content can be obtained from the polyester. If molded products having a high acetaldehyde content are used as containers of foods and drinks, bad odor or foreign odor is generated, or flavor or scent of the contents is changed. Further, photographic films produced from a polyester having a high acetaldehyde content are liable to have fog.

The polyester (P-3), preferably polyethylene terephthalate, has a low acetaldehyde content, and the amount of acetaldehyde produced in the molding process is small. Therefore, the amount of acetaldehyde contained in the resulting molded product is small. Accordingly, when the polyester (P-3) is used as a material of bottles, films and sheets and molded into containers of foods and drinks, flavor or scent of the contents filled therein is not marred.

A still further embodiment of the polyester according to the invention is described below.

The intrinsic viscosity of the polyester (P-4) is desired to be usually not less than 0.50 dl/g, preferably 0.50 to 1.50 dl/g, more preferably 0.72 to 0.1 dl/g. The density thereof is desired to be usually not less than 1.37 g/cm$^3$, preferably 1.37 to 1.44 g/cm$^3$, more preferably 1.38 to 1.43 g/cm$^3$, still more preferably 1.39 to 1.42 g/cm$^3$.

In the polyester (P-4), a titanium atom is contained in an amount of 0.1 to 200 ppm, preferably 0.5 to 100 ppm, more preferably 1 to 50 ppm, based on the weight of the polyester, and a metal atom M selected from beryllium, magnesium, calcium, strontium, barium, boron, aluminum, gallium, manganese, cobalt, zinc and antimony is contained in an amount of 0.1 to 500 ppm, preferably 0.5 to 300 ppm, more preferably 1 to 250 ppm, based on the weight of the polyester.

The metal atom M is preferably magnesium, calcium or zinc, particularly preferably magnesium. Two or more kinds of metal atoms M may be contained, and in this case, the total to two or more kinds of the metal atoms is within the above range.

The content of a germanium atom in the polyester (P-4) is desirably not more than 5 ppm.

The titanium atom contained in the polyester (P-4) is preferably a titanium atom derived from the polycondensation catalyst obtained by hydrolyzing a titanium halide, and the metal atom M is preferably a metal atom derived from the co-catalyst component.

The molar ratio (titanium atom/metal atom M) of the titanium atom to the metal atom M is in the range of usually 0.05 to 50, preferably 0.1 to 30, more preferably 0.2 to 25.

In the polyester (P-4), the content (x % by weight) of a cyclic trimer (cyclic trimer of ethylene terephthalate represented by the following formula) is not more than 5% by weight, preferably not more than 0.45% by weight.

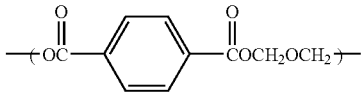

When a content of a cyclic trimer is a stepped square plate molded product obtained by heating the polyester (P-4) (content of cyclic trimer: x % by weight) to a temperature of 290° C. to melt it and molding the molten polyester is taken as y % by weight, x and y desirably satisfy the following relation $y \leqq -0.20x+0.20$, preferably $y \leqq -0.20x+0.18$, more preferably $y \leqq -0.20x+0.16$.

The polyester (P-4) has a low cyclic trimer content. Further, increase of the cyclic trimer content is remarkably inhibited when the polyester is molded into a molded product, and the amount of a cyclic trimer contained in the polyester is small in the molding process, so that stain of a mold hardly takes place. For example, in the production of a blow molded article comprising feeding the polyester (P-4) to a molding machine such as an injection molding machine to prepare a preform for a blow molded article, inserting the preform into a mold of given shape and conducting stretch blow molding and heat setting, the amount of the cyclic trimer hardly increases, and the amount of the cyclic trimer contained in the polyester in the molding is small, so that stain of the mold hardly takes place.

The increase of the cyclic trimer content during the molding of the polyester (P-4) is determined by measuring the amount of the cyclic trimer contained in a stepped square plate molded product produced from the polyester (P-4). The stepped square plate molded product is produced using, as a starting material, a particulate polyester (P-4) (polyester pellets) whose cyclic trimer content (x % by weight) has been previously measured, in the same manner as for a stepped square plate molded product used for measuring increase of the acetaldehyde content.

As a specimen for measuring the cyclic trimer content, any one of the eleventh to fifteenth stepped square plate molded products from the beginning of the injection molding is used. The part C of the stepped square plate molded product is cut into chips, and using the chips as cyclic trimer content measuring samples, the cyclic trimer content (z % by weight) is measured.

The cyclic trimer content in the particulate polyester before production of the stepped square plated molded product and that in the stepped square plate molded product are measured in the following manner.

A given amount of a polyester is dissolved in o-chlorophenol, then reprecipitated with tetrahydrofuran and filtered to remove a linear polyester. Then, the filtrate is fed to a liquid chromatography (LC7A, manufactured by Shimadzu Seisakusho K.K.) to determine the amount of the cyclic trimer obtained in the polyester. The obtained value is divided by the amount of the polyester to obtained the cyclic trimer content in the polyester.

The increase (y % by weight) of the cyclic trimer content given after the stepped square plate molded product is produced by melting the polyester under heating at 290° C. is a value of z (% by weight)−x (% by weight).

The polyester (P-4) is preferably polyethylene terephthalate.

The polyester (P-4) having the above properties is obtained by subjecting a polyester, which has been produced in a manner similar to that for preparing a polyester used in the aforesaid polyester treating method and has been obtained through the esterification step, the liquid phase polycondensation step and the solid phase polycondensation step, to the phosphorus-containing aqueous solution treatment, the organic solvent treatment of the phosphorus-containing organic solvent solution treatment. The polyester to be subjected to any of the above treatments is usually particulate, but it may be in the form of powder or strand.

The cyclic trimer content in the polyester to be subjected to the phosphorus-containing aqueous solution treatment, the organic solvent treatment or the phosphorus-containing organic solvent solution treatment is usually not more than 0.5% by weight, preferably not more than 0.45% by weight.

The polyester (P-4) having been treated as above is remarkably inhibited in the increase of the cyclic trimer content when it is molded into a blow molded article or the like. This can be confirmed by measuring the cyclic trimer content after the polyester (P-4) having been subjected to the above treatment is heated to a temperature of 290° C. to melt it and molded into a stepped square plate molded product.

By subjecting the polyester to the phosphorus-containing aqueous solution treatment, the organic solvent treatment or the phosphorus-containing organic solvent solution treatment, increase of the cyclic trimer content in the polyester during molding of the polyester into a stepped square plate molded product under heating to a temperature of 290° C. can be inhibited.

The reason why the increase of the cyclic trimer content in the polyester during the molding can be inhibited by subjecting the polyester to the phosphorus-containing aqueous solution treatment, the organic solvent treatment or the phosphorus-containing organic solvent solution treatment is presumably that the polycondensation catalyst, e.g., titanium compound polycondensation catalyst, in the polyester is deactivated by any of the above treatments, and therefore even when the polyester is heated, the decomposition reaction or the ester interchange reaction hardly proceeds and the amount of the cyclic trimer produced becomes small.

When a molded product is produced from the thus treated polyester (P-4) having a low cyclic trimer content by for example injection molding, the amount of the cyclic trimer contained in the polyester is small in the molding process. Therefore, stain of a mold caused by adhesion of the cyclic trimer to an inner surface of a mold or to a gas exhaust vent or a gas exhaust pipe of a mold hardly takes place, and the cyclic trimer does not adhere to a vent zone of an injection molding machine.

The blow molded article according to the invention is produced from the polyester (P-4) (preferably polyethylene terephthalate) having an intrinsic viscosity of not less than 0.50 dl/g, a titanium atom content in a specific range, a content of metal atom M in a specific range, a titanium atom/metal atom ratio in a specific range, a cyclic trimer content of not more than 0.5% by weight and a specific relation between the cyclic trimer content and increase of the cyclic trimer content after molding of the polyester into a stepped square plate molded product. This blow molded article has a cyclic trimer content of not more than 0.6% by weight, preferably 0.10 to 0.55% by weight, more preferably 0.15 to 0.50% by weight.

Measurement of the cyclic trimer content in the blow molded article is carried out by the aforesaid method using a sample picked from the blow molded article.

The blow molded article can be produced by a process hitherto known. Specifically, a preform is first prepared from the polyester (P-4), preferably polyethylene terephthalate. The preform can be prepared by a method hitherto known, for example, injection molding or extrusion molding. In the preparation of a preform, the heating temperature of polyethylene terephthalate is preferably in the range of 90° C. to 110° C. Then, the preform is heated to a temperature appropriate to stretching and subjected to stretch blow molding to produce a blow molded article.

If a blow molded article is produced from the polyester (P-4) having a low cyclic trimer content and having been subjected to the specific treatment, the amount of the cyclic trimer produced in the molding process is small. Therefore, in the production of a low molded article comprising feeding the polyester (P-4) to a molding machine such as an injection molding machine to prepare a blow molded article preform, inserting the preform into a mold of given shape and conducting stretch blow molding and heat setting, stain of a mold caused by adhesion of the cyclic trimer to the mold hardly takes place.

Since the blow molded article according to the invention is obtained from the polyester (P-4) having a low cyclic trimer content and having been subjected to the specific treatment, the amount of a cyclic trimer produced in the molding process is small, and therefore the blow molded article has a low cyclic trimer content and hardly suffers surface roughening or whitening (staining).

In the polyester (P-4), preferably polyethylene terephthalate, the cyclic trimer content is low, and the amount of a cyclic trimer produced in the molding process is small. Therefore, the amount of a cyclic trimer contained in the polyester during the molding is small, and satin of a mold hardly takes place. Accordingly, it is unnecessary to carry out frequent washing in a production of molded products, and hence the productivity of blow molded articles such as bottles or molded products such as films and sheets can be increased. In addition, whitening (staining) of the blow molded articles, films and sheets can be prevented.

The blow molded article according to the invention is obtained from the above-mentioned polyester, preferably polyethylene terephthalate, so that the cyclic trimer content in the blow molded article is low, and the blow molded article hardly suffers surface roughening or whitening (staining).

A still further embodiment of the polyester according to the invention is described.

The polyester (P-5) is prepared by the use of an aromatic dicarboxylic acid or an ester-forming derivative thereof and an aliphatic diol or an ester-forming derivative thereof, if necessary, polyfunctional compound as starting materials, and is preferably polyethylene terephthalate comprising recurring units dried from terephthalic acid or an ester-forming derivative thereof and recurring units derived from ethylene glycol or an ester-forming derivative thereof. The polyethylene terephthalate may further contain recurring units derived from other dicarboxylic acids and/or other diols in amounts of not more than 20% by mol.

Examples of dicarboxylic acids other than terephthalic acid and diols other than ethylene glycol include the same compounds previously described.

The polyethylene terephthalate may further contain recurring units derived from polyfunctional compounds such as trimesic acid, trimethylolethane, trimethylolpropane, trimethylolmethane and pentaerythritol. The recurring units derived from such polyfunctional compounds are preferably contained in amounts of 0 to 2% by mol based on the recurring units derived from diol.

The polyester containing the recurring units derived from the polyfunctional compounds in the above amount tends to have high melt flowability.

The intrinsic viscosity of the polyester (P-5) is desired to be usually not less than 0.50 dl/g, preferably 0.50 to 1.50 dl/g, more preferably 0.72 to 1.0 dl/g. The density thereof is desired to be usually not less than 1.37 g/cm$^3$, preferably 1.37 to 1.44 g/cm$^3$, more preferably 1.38 to 1.43 g/cm$^3$, still more preferably 1.39 to 1.42 g/cm$^3$.

When the ratio (L/T) of a flow length (L) to a flow thickness (T) in the injection molding of the polyester (P-5) at 290° C. is taken as Y and the intrinsic viscosity of a molded product obtained by the injection molding is taken as X (dl/g), X and Y satisfy the following relation $$Y \geqq 547-500X,$$

$$\text{preferably } Y \geqq 547.5-500X,$$

$$\text{more preferably } Y \geqq 648-500X.$$

The polyester (P-S), which has the above relation between X and Y with the proviso that Y is a ratio (L/T) of a flow length (L) to a flow thickness (T) in the injection molding of the polyester at 290° C. and X is an intrinsic viscosity of a molded product obtained by the injection molding, exhibits high melt flowability and excellent moldability even if the polyester has a high intrinsic viscosity.

In the present invention, the ratio (L/T) of a flow length (L) to a flow thickness (T) in the injection molding of the polyester (P-5) at 290° C. is measured in the following manner.

In the first place, 2 kg of a particularly polyester (P-5) (polyester pellets) is dried for 16 hours or more under the conditions of a temperature of 140° C. and a pressure of 10 Torr using a tray dryer, to allow the particulate polyester (P-5) to have a water content of not more than 50 ppm.

Then, the thus dried sample is molded by an injection molding machine of M70B model manufactured by Meiki Seisakusho K.K. at a cylinder temperature of 290° C. using a L/T mold manufactured by Mitsui Chemicals, Inc. and setting the mold temperature at 15° C. the molding conditions are as follows.

Injection pressure: 120 kg/cm$^2$ (gauge pressure)

Injection rate: 90%

Metering position: 40 mm (constant)

Injection time: 10 seconds (constant)

Cooling time: 20 seconds (constant)

The L/T mold has a cavity in a shape of 125 cm (length)×10 mm (width)×2 mm (thickness) and is provided with a gate at the lengthwise end.

The injected resin flows spirally and radially from the gate portion in the cavity to melt and the molten resin moves in the cavity with keeping its shape of 10 mm in width and 2 mm in thickness (T).

Samples for the L/T measurement are those of the eleventh shot to the twentieth shot from the beginning of molding. The flow lengths (L) of the samples are measured, an average of the lengths is calculated, and L/T is then calculated.

The intrinsic viscosity (X) of the molded product obtained by the injection molding is determined as follows. A solution of a sample in a mixed solvent of phenol/1,1,2,2-tetrachloroethane (50/50 by weight) having a concentration of 0.5 g/dl is prepared, then the solution viscosity of the sample solution is measured at 25° C., and from the solution viscosity, the intrinsic viscosity is calculated. The sample for the intrinsic viscosity measurement is selected from the samples for the L/T measurement.

The polyester (P-5) has the above relation between the ratio (Y) of a flow length to a flow thickness in the injection molding of the polyester at 290° C. and the intrinsic viscosity (X) of a molded product obtained by the injection molding, and the polyester (P-5) having such relation exhibits high melt flowability and excellent moldability.

In the polyester (P-5), the titanium atom content is in the range of preferably 1 to 100 ppm, particularly preferably 1 to 80 ppm, and the magnesium atom content is in the range of preferably 1 to 200 ppm, particularly preferably 1 to 100 ppm. The weight ratio (Mg/Ti) of the magnesium atom to the titanium atom contained in the polyester (P-5) is desired to be not less than 0.01, preferably 0.06 to 10, particularly preferably 0.06 to 5. The polyester (P-5) having a weight ratio (Mg/Ti) of the magnesium atom to the titanium atom in the above range tends to have excellent transparency. The chlorine content in the polyester (P-5) is preferably in the range of 0 to 1000 ppm, particularly preferably 0 to 100 ppm.

The polyester (P-5) having the above properties can be produced by, for example, the following process.

An aromatic dicarboxylic acid or an eater-forming derivative thereof and an aliphatic diol or an ester-forming derivative thereof, preferably, terephthalic acid or an ester-forming derivative thereof and ethylene glycol or ester-forming derivative thereof, and if necessary, the aforesaid dicarboxylic acids, diols and polyfunctional compounds are used as starting materials, and they are subjected to the esterification step, the liquid phase polycondensation step, and if necessary, the solid phase polycondensation step using the below-described polycondensation catalyst, whereby the polyester (D-5) can be obtained.

As the polycondensation catalyst, a titanium compound catalyst is employable, and examples thereof include titanium alkoxides, such as titanium butoxide and titanium tetrasiopropoxide; organic titanium compound, such as acetylacetonato salt of titanium; and hydrolyzates obtained by hydrolysis of titanium alkoxides or hydrolysis of titanium halides. Hydrolysis of the titanium akaloides or the titanium halides may be carried out in the presence of the compound of another element.

In the production of the polyester (P-5), it is preferable to use the aforesaid hydrolyzate (I-m) or (I-n) (titanium-containing hydrolyzate (A-2)) as the polycondensation catalyst.

The titanium-containing hydrolyzate (A-2) is used in combination with a co-catalyst component (II), if necessary.

Examples of the co-catalyst components (II) include the same co-catalysts compounds as provisory described. Of these, preferable are magnesium compounds such as magnesium carbonate and magnesium acetate; calcium compounds such as calcium carbonate and calcium acetate; and zinc compounds such as zinc chloride and zinc acetate. The co-catalyst compounds can be used singly or in combination of two or more kinds.

When the magnesium compound is used as the co-catalyst component (II), polyethylene terephthalate having excellent transparency is obtained.

The co-catalyst compound (II) is desirably used in such an amount that the molar ratio ((II)/(II)) of the metal atom (II) in the co-catalyst component to titanium (and another element if the titanium-containing hydrolyzate (A-2) contains another element) (I) in the polycondensation catalyst is in the range of 1/50 to 50/1, preferably 1/40 to 40/1, more preferably 1/30 to 30/1. When a phosphorus compound such as a phosphate or a phosphite is used, the amount thereof is an amount in terms of a metal atom contained in the phosphorus compound.

The polycondensation catalyst is used in an amount of usually 0.0005 to 0.2% by weight, preferably 0.001 to 0.05% by weight, in terms of weight of a metal in the polycondensation catalyst, based on the weight of the mixture of the aromatic dicarboxylic acid and the aliphatic diol. When the aforesaid stabilizer is used, the amount thereof is in the range of usually 0.001 to 0.1% by weight, preferably 0.002 to 0.02% by weight, in terms of a phosphorus atom in the stabilizer. The polycondensation catalyst and the stabilizer can be fed in the esterification reaction step, or can be fed to the reactor of the first stage of the polycondensation reaction step.

The intrinsic viscosity of the polyester (P-5) obtained as above is desired to be usually not less than 0.50 dl/g, preferably 0.50 to 1.50 dl/g, more preferably 0.72 to 1.0 dl/g. The density of the polyester (P-5) is desired to be usually not less than 1.37 g/cm$^3$, preferably 1.37 to 1.44 g/cm$^3$, more preferably 1.38 to 1.43 g/cm$^3$, still more preferably 1.39 to 1.42 g/cm$^3$.

When the ratio (L/T) of a flow length (L) to a flow thickness (T) in the injection molding of the polyester (P-5) at 290° C. is taken as Y and the intrinsic viscosity of a molded product obtained by the injection molding is taken as X (dl/g), X and Y satisfy the relation $Y \geqq 2\,647-500X$. Further, the polyester (P-5) desirably has a titanium atom content of 1 to 100 ppm, particularly 1 to 80 ppm, and a magnesium atom content of 1 to 200 ppm, particularly 1 to 100 ppm. The weight ratio (Mg/Ti) of the magnesium atom to the titanium atom contained in the polyester (P-5) is desired to be not less than 0.01, preferably 0.06 to 10, particularly preferably 0.06 to 5. When the polycondensation catalysts (I) is used as a polycondensation catalyst and the co-catalyst component (II) is optionally used in combination, the resulting polyester (P-5) exhibits excellent tint and transparency and has a low acetaldehyde content and a low content of an oligomer such as a cyclic trimer.

The polyester (P-5) produced as above may contain additives hitherto known, such as stabilizer, release agent, antistatic agent, dispersent and colorant (e.g., dye, pigment). These additives may be added in any step of the process for producing the polyester (P-5), and may be added by forming a masterbatch before molding.

The polyester (P-5) can be used as a material of various molded products. For example, the polyester (P-5) is melt molded and used as blow molded articles (e.g., bottles), sheets, films, fibers, etc., but it is particularly preferably used as bottles.

In order to produce bottles, sheets, films, fibers, etc. from the polyester (P-5), hitherto known processes are available.

The polyester (P-5) has high melt flowability and exhibits excellent moldability when molded into blow molded articles, films, sheets, fibers and the like.

The preform for a blow molded article and the blow molded article according to the invention are obtained from the polyester (P-5) and have excellent transparency.

EFFECT OF THE INVENTION

The catalyst for polyester production according to the invention can produce a polyester with higher catalytic activity as compared with a germanium compound or an antimony compound which has been heretofore used as a polycondensation catalyst. According to the invention, a polyester having more excellent transparency and tint and lower acetaldehyde content can be obtained as compared with the case of using an antimony compound as a polycondensation catalyst.

The catalyst for polyester production according to the invention, which comprises the solid titanium compound (I-a) and/or the titanium-containing solid compound (I-b), and if necessary, the co-catalyst component (II), can produce a polyester with higher catalytic activity as compared with a germanium compound or an antimony compound which has been heretofore used as a polycondensation catalyst. Further, when this catalyst is used, a polyester having more excellent transparency and tint and lower acetaldehyde content can be obtained as compared with the case of using an antimony compound as a polycondensation catalyst. Furthermore, a polyester, e.g., polyethylene terephthalate, obtained by the use of the catalyst of the invention and a molded product formed therefrom have excellent transparency and tint and have a low acetaldehyde content.

The catalyst for polyester production according to the invention, which comprises the solid titanium compound (I-c) and the co-catalyst component (II) or comprises the titanium-containing solid compound (I-d) and if necessary the co-catalyst component (II), can produce a polyester with higher catalytic activity as compared with a germanium compound or an antimony compound which has been heretofore used as a polycondensation catalyst. Further, when this catalyst is used, a polyester having more excellent transparency and tint and lower acetaldehyde content can be obtained as compared with the case of using an antimony compound as a polycondensation catalyst.

The catalyst for polyester production according to the invention, which comprises the solid titanium compound (I-e), the solid titanium compound (I-f), the titanium-containing solid compound (I-g) or the titanium-containing solid compound (I-h), and if necessary, the co-catalyst component (II), can produce a polyester with higher catalyst activity as compared with a germanium compound or an antimony compound which has been heretofore used as a polycondensation catalyst. Further, when this catalyst is used, a polyester having more excellent transparency and tint and lower acetaldehyde constant can be obtained as compared with the case of using an antimony compound as a polycondensation catalyst.

The catalyst for polyester production according to the invention, which comprises the solid titanium compound (I-i) and if necessary the co-catalyst component (II), can produce a polyester with higher catalytic activity as compared with a germanium compound or an antimony compound which has been heretofore used as a polycondensation catalyst. Further, when this catalyst is used, a polyester having more excellent transparency and tint and lower acetaldehyde content can be obtained as compared with the case of using an antimony compound as a polycondensation catalyst.

The catalyst for polyester production according to the invention, which comprises a slurry obtained by heating a mixture of (A-1) the hydrolyzate (I-j) or the hydrolyzate (I-k), (B) the basic compound and (C) the aliphatic diol, can produce a polyester having a desired intrinsic viscosity for a short period of time.

The catalyst for polyester production according to the invention, which comprises (A-2) the hydrolyzate (I-m) or the hydrolyzate (I-n) and (D) the metallic phosphate, or the catalyst for polyester production according to the invention, which comprises a slurry obtained by heating a mixture of (A-2) the hydrolyzate (I-m) or the hydrolyzate (I-n), (E) the metallic compound, (F) the phosphorus compound and (G) the aliphatic diol, can produce a polyester having a low acetaldehyde content with high polymerization activity.

By the process for producing a polyester according to the invention wherein a catalyst comprising the catalyst component (I) which comprises the hydrolyzate (I-j) or the hydrolyzate (I-k) and the co-catalyst component (II) is used as a polycondensation catalyst and the catalyst component (I) is added to the esterification reactor before the beginning of the esterification reaction or immediately after the beginning of the esterification reaction, a polyester having a desired intrinsic viscosity can be obtained for a short period of time.

By the process for producing a polyester according to the invention wherein an aromatic dicarboxylic acid or an ester-forming derivative thereof and an aliphatic diol or an ester-forming derivative thereof are polycondensed in the presence of a polycondensation catalyst selected from (1) a polycondensation catalyst comprising the hydrolyzate (I-m), (2) a polycondensation catalyst comprising the hydrolyzate (I-n) and (3) a polycondensation catalyst comprising the hydrolyzate (I-m) or the hydrolyzate (I-n) and a metallic compound, a phosphate or a phosphite, and in the presence of at least one compound selected from cyclic lactone compounds and hindered phenol compounds, a polyester can be produced with high polymerization activity, and the resulting polyester has a low acetaldehyde content.

By the process for producing a polyester according to the invention wherein a catalyst comprising the polycondensation catalyst component (I) which comprises the hydrolyzate (I-m) or the hydrolyzate (I-n) and the co-catalyst component (II) is used and a tint adjusting agent is added in the esterification step or the polycondensation step, a polyester having an excellent tint can be produced with high polymerization activity.

By the method for treating a polyester according to the invention, a polyester having small increase of the acetaldehyde content and small decrease of the intrinsic viscosity in the molding process can be obtained.

The polyester (P-1) according to the invention has excellent transparency and tint and has a low acetaldehyde content.

The polyester (P-2) according to the invention has excellent tint.

The polyester (P-3) according to the invention a low acetaldehyde content and is remarkably inhibited in increase of the acetaldehyde content when molded into a molded product. For example, when a bottle or the like is produced from the polyester (P-3), flavor or scent of the contents filled in the bottle is hardly deteriorated.

The polyester (P-4) according to the invention has a low cyclic trimer content, and the amount of the cyclic trimer produced in the molding of the polyester is small.

The polyester (P-5) according to the invention has high melt flowability and exhibits excellent moldability when molded into a blow molded article, a film, a sheet, a fiber or the like.

EXAMPLE

The present invention is further described with reference to the following examples, but it should be construed that the invention is in no way limited to those examples.

Example 495-1

Preparation of Solid Titanium Compound

Deionized water of 500 ml was weighed out and introduced into a 1000 ml glass beaker. The deionized water in the beaker was cooled in an ice bath, and thereto was dropwise added 5 g of titanium tetrachloride with stirring. When production of hydrogen chloride stopped, the beaker containing the reaction solution was taken out of the ice bath, and 25% aqueous ammonia was dropwise added with stirring, to adjust pH of the solution to 8. The precipitate of titanium hydroxide produced was separated from the supernatant liquid by centrifugation of 2500 revolutions for 15 minutes. Then, the resulting titanium hydroxide precipitate was washed five times with deionized water. After the washing, solid-liquid separation was carried out by centrifugation of 2500 revolutions for 15 minutes. The washed titanium hydroxide was vacuum dried at 70° C. under a pressure of 10 Torr for 18 hours to remove water content, whereby a solid titanium compound was obtained.

Prior to use as a polycondensation catalyst, the solid titanium compound was pulverized into particles of about 10μ.

The absorbed water content in the solid titanium compound thus obtained was measured by a Karl Fischer's water content meter. As a result, the absorbed water content was 6.73% by weight. Further, the weight loss on heating was measured by thermogravimetry. As a result, the weight of the compound was reduced by 7.50% by weight on heating up to 280° C. and was further reduced by 2.17% by weight on heating from 280° C. to 600° C., based on the initial weight, and this weight loss proved to be due to desoprtion of water content and a nitrogen compound. In the catalyst, nitrogen was contained in an amount of 1.3% by weight and chlorine was contained in an amount of only 14 ppm. Therefore, it is presumed that nitrogen is derived from not ammonium chloride but ammonia. The titanium content in the solid titanium compound, as measured by a high-frequency plasma emission analyzer, was 46% by weight.

From the above, the molar ratio between titanium and hydroxyl group in the solid titanium compound was found to be 1:0.157. Nitrogen and chlorine was analyzed by an all nitrogen microanalyzer (chemiluminescence method) and a chromatography, respectively, and for the calculation of the contents, they were considered to be desorbed as ammonia and hydrogen chloride, respectively.

Example 495-2

Preparation of Titanium-containing Solid Compound

Deionized water of 500 ml was weighed out and introduced into a 1000 ml glass beaker. To the deionized water, 0.15 g of anhydrous magnesium hydroxide was added to give a dispersion. The dispersion in the beaker was cooled in an ice bath, and thereto was dropwise added 5 g of titanium tetrachloride with stirring. The liquid became acidic, and the magnesium hydroxide was dissolved. When production of hydrogen chloride stopped, the beaker containing the reaction solution was taken out of the ice bath, and 25% aqueous ammonia was dropwise added with stirring, to adjust pH of the solution to 8. The precipitate of titanium-containing complex hydroxide produced was separated from the supernatant liquid by centrifugation of 2500 revolutions for 15 minutes. Then, the precipitate of titanium-containing complex hydroxide was washed five times with deionized water. After the washing, solid-liquid separation was carried out by centrifugation of 2500 revolutions for 15 minutes. The washed titanium-containing complex hydroxide was vacuum dried at 70° C. under a pressure of 10 Torr for 18 hours to remove water content, whereby a titanium-containing solid compound was obtained.

In the titanium-containing solid compound, the ratio between titanium atom and magnesium atom was 91:9 by mol. By thermogravimetry, the molar ratio between titanium and hydroxyl group in the titanium-containing solid compound proved to be 1:0.31. Prior to use as a polycondensation catalyst, the titanium-containing solid compound was pulverized in particles of about 10μ.

Example 495-3

Preparation of Titanium-containing Solid Compound

Deionized water of 500 ml was weighed out and introduced into a 1000 ml glass beaker. To the deionized water, 0.16 g of colloidal silica (trade name: Snowtex OXS) was added to give a dispersion. The dispersion in the beaker was cooled in an ice bath, and thereto was dropwise added 5 g of titanium tetrachloride with stirring. The liquid became acidic, and the colloidal silica was dissolved. When production of hydrogen chloride stopped, the beaker containing the reaction solution was taken out of the ice bath, and 25% aqueous ammonia was dropwise added with stirring, to adjust pH of the solution to 8. The precipitate of titanium-containing complex hydroxide produced was separated from the supernatant liquid by centrifugation of 2500 revolutions for 15 minutes. Then, the precipitate of titanium-containing complex hydroxide was washed five times with deionized water. After the washing, solid-liquid separation was carried out by centrifugation of 2500 revolutions for 15 minutes. The washed titanium-containing complex hydroxide was vacuum dried at 70° C. under a pressure of 10 Torr for 18 hours to remove water content, whereby a titanium-containing solid compound was obtained.

In the titanium-containing solid compound, the ratio between titanium atom and silicon atom was 94:6 by mol. By thermogravimetry, the molar ratio between titanium and hydroxyl group in the titanium-containing solid compound proved to be 1:0.60. Prior to use as a polycondensation catalyst, the titanium-containing solid compound was pulverized into particles of about 10μ.

Example 495-4

Production of Polyester

To a reactor in which 33500 parts by weight of a reaction solution was resident during the steady operation, a slurry prepared by mixing high-purity terephthalic acid (6458 parts by weight/hr) and ethylene glycol (2615 parts by weight/hr) was continuously fed with stirring under the conditions of a temperature of 260° C. and a pressure of 0.9 kg/cm$^2$-G in a nitrogen atmosphere, to perform esterification reaction. In the esterification reaction, a mixture of water and ethylene glycol was distilled off.

The esterification reaction product (low condensate) was continuously drawn out of the system so that the average residence time was controlled to 3.5 hours.

The number-average molecular weight of the low condensate of ethylene glycol and terephthalic acid was 600 to 1300 (trimer to pentamer).

Using the solid titanium compound prepared in Example 495-1 as a polycondensation catalyst, liquid phase polycondensation reaction of the low condensate was conducted.

The amount of the solid titanium compound added as the catalyst was 0.005% by mol in terms of titanium atom, based on the terephthalic acid unit in the low condensate. The polycondensation reaction was carried out under the conditions of a temperature of 285° C. and a pressure of 1 Torr.

The time (liquid phase polycondensation time) required to attain an intrinsic viscosity (IV) of 0.58 dl/g of polyethylene terephthalate was 95 minutes.

Example 495-5

Polycondensation reaction was carried out in the same manner as in Example 495-4, except that the titanium-containing solid compound prepared in Example 495-2 was used as the polycondensation catalyst.

The time (liquid phase polycondensation time) required to attain an intrinsic viscosity (IV) of 0.58 dl/g of polyethylene terephthalate was 76 minutes.

Example 495-6

Polycondensation reaction was carried out in the same manner as in Example 495-4, except that the titanium-containing solid compound prepared in Example 495-3 was used as the polycondensation catalyst.

The time (liquid phase polycondensation time) required to attain an intrinsic viscosity (IV) of 0.58 dl/g of polyethylene terephthalate was 85 minutes.

Example 495-7

Polycondensation reaction was carried out in the same manner as in Example 495-4, except that magnesium carbonate was used as the polycondensation catalyst in addition to the solid titanium compound prepared in Example 495-1. The amount of magnesium carbonate added was 0.005% by mol in terms of magnesium atom, based on the terephthalic acid unit in the low condensate.

The time (liquid phase polycondensation time) required to attain an intrinsic viscosity (IV) of 0.58 dl/g of polyethylene terephthalate was 75 minutes.

Example 495-8

Polycondensation reaction was carried out in the same manner as in Example 495-4, except that magnesium acetate was used as the polycondensation catalyst in addition to the solid titanium compound prepared in Example 495-1. The amount of magnesium acetate added was 0.005% by mol in terms of magnesium atom, based on the terephthalic acid unit in the low condensate.

The time (liquid phase polycondensation time) required to attain an intrinsic viscosity (IV) of 0.58 dl/g of polyethylene terephthalate was 70 minutes.

Example 495-9

Polycondensation reaction was carried out in the same manner as in Example 495-4, except that the solid titanium compound prepared in Example 495-1 was stored in a closed container at room temperature for 2 months prior to use as the polycondensation catalyst.

The time (liquid phase polycondensation time) required to attain an intrinsic viscosity (IV) of 0.58 dl/g of polyethylene terephthalate was 101 minutes.

It can be seen from this example that the solid titanium compound according to the invention is free from deterioration with time and had good storage properties. For reference, it is shown in a comparative example of Japanese Patent Publication No. 26597/1972 that orthotitanic acid is deteriorated with time and lowered in the polycondensation activity.

Comparative Example 495-1

Polycondensation reaction was carried out in the same manner as in Example 495-4, except that antimony acetate that was industrially used was used as the polycondensation catalyst. The amount of antimony acetate added was 0.025% by mol in terms of antimony, abased on the terephthalic acid unit in the low condensate.

The time (liquid phase polycondensation time) required to attain an intrinsic viscosity (IV) of 0.58 dl/g of polyethylene terephthalate was 120 minutes.

Comparative Example 495-2

Preparation of Titanium Compound

The titanium hydroxide obtained after washing with deionized water in Example 495-1 was boiled at 100° C. for 2 hours and then dried, to obtain a titanium compound.

Production of Polyester

Polycondensation reaction was carried out in the same manner as in Example 495-4, except that the titanium compound obtained above was used as the polycondensation catalyst.

The time (liquid phase polycondensation time) required to attain an intrinsic viscosity (IV) of 0.58 dl/g of polyethylene terephthalate was 185 minutes.

It is known that titanium hydroxide is converted into metatitanic aced when heated in water, and the titanium compound obtained by way of metatitanic acid has beer found to have low polycondensation activity.

Example 496-7

To an esteriafion reactor, 76.81 mol of high-purity terephthalic acid and 86.03 mol of ethylene glycol were fed at 100° C. at atmospheric pressure. Then, 0.0045 mol of the titanium-containing solid compound prepared in Example 495-2 was further added as a catalyst. Thereafter, the temperature of the reactor was raised to 260° C., and the reaction was conducted for 340 minutes under a pressure of 1.7 $kg/cm^2$-G in a nitrogen atmosphere. Water produced by the reaction was continually distilled off from the system.

The total amount of the reaction solution in the esterification reactor was transferred into a polycondensation reactor beforehand set at 260° C. Then, a solution of 0.0073 mol of tributyl phosphate in 6.44 mol of ethylene glycol was further added to the reactor at atmospheric pressure, and the temperature of the reactor was raised to 280° C. from 260° C., while the pressure was reduced down to 2 Torr from atmospheric pressure.

The reaction in the polycondensation reactor was further conducted for 108 minutes. Then, the reaction product was drawn out of the polycondensation reactor in the form of strands. The strands were immersed in water, cooled and cut into particles by a strand cutter to obtain polyethylene terephthalate. The intrinsic viscosity of the polyethylene terephthalate was 0.65 dl/g, the titanium content and the magnesium content as measured by atomic absorption analysis were 25 ppm and 2 ppm, respectively, and the Mg/Ti weight ratio was 0.08.

The polyethylene terephthalate obtained by the liquid phase polymerization was then transferred into a solid phase polymerization tower, crystallized at 170° C. for 2 hours in a nitrogen atmosphere, and then subjected to solid phase polymerization at 210° C. for 13 hours to obtain particulate polyethylene terephthalate. The intrinsic viscosity of the polyethylene terephthalate was 0.825 dl/g. Using the polyethylene terephthalate, a stepped square plate molded product was produced in the same method as described above. The haze of part C of the stepped square plate molded product was 17.8%.

Examples 496-8 to 495-13 Example 491-2C

Polyethylene terephthalate was produced in the same manner as in Example 496-7, except that the catalyst and the polymerization conditions were changed as shown in Table 496-1. The results are set forth in Table 496-1.

Comparative Example 496-1

Preparation of Titanium Compound

The titanium hydroxide obtained after washing with deionized water in Example 495-1 was boiled at 100° C. for 2 hours and then dried, to obtained a titanium compound.

Production of Polyester

Polycondensation reaction was carried out in the same manner as in Example 496-7, except that the titanium compound obtained above was used as the polycondensation catalyst.

The time (liquid chase polycondensation time) required to attain an intrinsic viscosity (IV) of 0.65 dl/g of polyethylene terephthalate was 263 minutes.

It is known that titanium hydroxide is converted into metatitanic acid when heated in water, and the titanium compound obtained by way of metatitanic acid has been found to have low polycondensation activity.

The titanium content and the magnesium content in the polyethylene terephthalate were 25 ppm and 16 ppm, respectively, the Mg/Ti ratio (by weight) was 0.64, and the chlorine content in the polyethylene terephthalate was not more than 1 ppm.

TABLE 496-1

| | Polycondensation catalyst (I) | | | Co-catalyst component (II) | | | Liquid phase polymerization | | Solid phase polymerization | | |
|---|---|---|---|---|---|---|---|---|---|---|---|
| | Type | Amount added *3 (% by mol) | Residue *4 (ppm) | Type | Amount added *3 (% by mol) | Residue *4 (ppm) | Time (hr) | IV (dl/g) | Time (hr) | IV (dl/g) | Haze (%) |
| Ex.496-8 | *1 | 0.013 | 31 | — | — | — | 2.62 | 0.643 | 23.0 | 0.816 | 16.5 |
| Ex.496-9 | *2 | 0.013 | 27 | $Mg(OAc)_2$ | 0.020 | 22 | 0.93 | 0.657 | 10.0 | 0.803 | 1.5 |
| Ex.496-10 | *2 | 0.013 | 13 | $Mg(OAc)_2$ | 0.020 | 25 | 1.03 | 0.660 | 17.0 | 0.843 | 0.4 |
| Ex.496-11 | *2 | 0.013 | 25 | $Mg(OAc)_2$ | 0.020 | 16 | 1.70 | 0.651 | 12.5 | 0.820 | 13.7 |
| Ex.496-12 | *2 | 0.013 | 30 | $Ca(OAc)_2$ | 0.020 | 36 | 2.53 | 0.644 | 21.0 | 0.814 | 22.4 |
| Ex.496-13 | *2 | 0.013 | 29 | $Zn(OAc)_2$ | 0.020 | 59 | 1.12 | 0.665 | 10.5 | 0.807 | 13.7 |
| Ex.496-2C | *2 | 0.013 | 29 | — | — | — | 3.63 | 0.653 | 26.0 | 0.834 | 19.4 |

*1: titanium-containing solid compound prepared in Example 495-3

*2: solid titanium compound prepared in Example 495-1

*3: in terms of metal atom based on terephthalic acid unit

*4: contents of metal atom based on particulate polyethylene terephthalate $Mg(OAc)_2$: magnesium acetate $Ca(OAc)_2$: calcium acetate $Zn(OAc)_2$: zinc acetate Example 473-1

Preparation of solid Titanium Compound

Deionized water of 500 ml was weighed out and introduced into a 1000 ml glass beaker. The deionized water in the beaker was cooled in an ice bath, and thereto was dropwise added 5 g of titanium tetrachloride with stirring. When production of hydrogen chloride stopped, the beaker containing the reaction solution was taken out of the ice bath, and 25% aqueous ammonia was dropwise added at room temperature with stirring, to adjust pH of the solution to 9. To the solution, a 15% acetic acid aqueous solution was dropwise added at room temperature with stirring, to adjust pH of the solution to 5. The resulting precipitate was separated by flirtation and washed 5 times with deionized water. After the washing, solid-liquid separation was carried out by filtration similarly to the above. The washed titanium compound was vacuum dried at 70° C. udner a pressure of 10 Torr for 18 hours to remove water content, whereby a solid titanium compound was obtained.

Prior to use as a polycondensation catalyst, the solid titanium compound was pulverized into particles of about 10μ.

The absorbed water content in the solid titanium compound thus obtained was measured by a Karl Fischer's water content meter. As a result, the absorbed water content was 11.29% by weight. Further, the weight loss on heating was measured by thermogravimetry. As a result, the weight loss on heating up to 600° C. was 13.65% by weight. Measurements of titanium content, nitrogen content and chlorine content in the solid titanium compound resulted in 43% by weight, 510 ppm and 76 ppm, respectively. From these results, the molar ratio between titanium and hydroxyl group in the solid titanium compound was found to be 1:0.28. The titanium content was measured by atomic absorption analysis. Nitrogen and chlorine were analyzed by an all nitrogen microanlayzer (chemiluminescence method) and chromatography, respectively, and for the calculation of the contents, they were considered to be desorbed as ammonia and hydrogen chloride, respectively.

Example 473-2

Preparation of Solid Titanium Compound

Deionized water of 500 ml was weighed out and introduced into a 1000 ml glass beaker. The deionized water in the beaker was cooled in an ice bath, and thereto was dropwise added 5 g of titanium tetrachloride with stirring. When production of hydrogen chloride stopped, the beaker containing the reaction solution was taken out of the ice bath, and 25% aqueous ammonia was dropwise added at room temperature with stirring, to adjust pH of the solution to 5. The resulting precipitate was separated by filtration and washed 5 times with deionized water. After the washing, solid-liquid separation was carried out by filtration similarly to the above. The washed titanium compound was vacuum dried at 70° C. under a pressure of 10 Torr for 18 hours to remove water content, whereby a solid titanium compound was obtained.

Prior to use as a polycondensation catalyst, the solid titanium compound was pulverized into particles of about 10μ.

With respect to the solid titanium compound obtained above, absorbed water content, weight loss on heating up to 600° C., titanium content, nitrogen content and chlorine content were measured in the same manner as in Example 473-1. As a result, the water content measured by a Karl Fischer's water content meter was 14.35% by weight, the weight loss on heating up to 600° C. was 16.82% by weight, the titanium content was 40% by weight, the nitrogen content was 950 ppm, and the chlorine content was 54 ppm. From these results, the molar ratio between titanium and hydroxyl group in the solid titanium compound was found to be 1:0.31.

Example 473-3

Preparation of Solid Titanium Compound

Deionized water of 500 ml was weighed out and introduced into a 1000 ml glass beaker. The deionized water in the beaker was cooled in an ice bath, and thereto was dropwise added 5 g of titanium tetrachloride with stirring. When production of hydrogen chloride stopped, the beaker containing the reaction solution was taken out of the ice bath, and 25% aqueous ammonia was dropwise added at room temperature with stirring, to adjust pH o0 to solution to 3.5. The resulting precipitate was separated by filtration and washed 5 times with deionized water. After the washing, solid-liquid separation was carried out by filtration similarly to the above. The washed titanium compound was vacuum dried at 70° C. under a pressure of 10 Torr for 18 hours to remove water content, whereby a solid titanium compound was obtained.

Prior to use as a polycondensation catalyze, the solid titanium compound was pulverized into particles of about 10μ.

With respect to the solid titanium compound obtained above, absorbed water content, weight loss on heating up to 600° C., titanium content, nitrogen content and chlorine content were measured in the same manner as in Example 473-1. As a result, the water content measured by a Karl Fischer's water content meter was 12.24% by weight, the weight loss on heating up to 600° C. was 14.36% by weight, the titanium content was 41% by weight, the nitrogen content was 150 ppm, and the chloride content was 26 ppm. From these results, the molar ratio between titanium and hydroxyl gruop in the solid titanium compound was found to be 1:0.27.

Example 473-4

Preparation of Solid Titanium Compound

Deionized water of 500 ml was weighed out and introduced into a 1000 ml glass beaker. The deionized water in the beaker was cooled in an ice bath, and thereto was dropwise added 5 g of titanium tetrachloride with stirring. When production of hydrogen chloride stopped, the beaker containing the reaction solution was taken out of the ice bath, and a 5% sodium hydroxide aqueous solution was dropwise added at room temperature with stirring, to adjust pH of the solution to 5. The resulting precipitate was separated by filtration and washed 5 times with deionized water. After the washing, solid-liquid separation was carried out by filtration similarly to the above. The washed titanium compound was vacuum dried at 70° C. under a pressure of 10 Torr for 18 hours to remove water content, whereby a solid titanium compound was obtained.

Prior to use as a polycondensation catalyst, the solid titanium compound was pulverized into particles of about 10μ.

With respect to the solid titanium compound obtained above, absorbed water content, weight loss on heating up to 600° C., metallic titanium content, metallic sodium content and chlorine content were measured in the same manner as in Example 473-1. As a result, the water content measured by a Karl Fischer's water content meter was 12.37% by weight, the weight loss on heating up to 600° C. was 10.12% by weight, the titanium content was 40% by weight, and the chlorine content was 54 ppm. Sodium was not detected. From these results, the molar ratio between titanium and hydroxyl group in the solid titanium compound was found to be 1:0.30.

Example 473-5

Production of Polyester

To a reactor in which 33500 parts by weight of a reaction solution was resident during the steady operation, a slurry prepared by mixing high-purity terephthalic acid (6458 parts by weight/hr) and ethylene glycol (2615 part by weight/hr) was continuously fed with stirring under the conditions of a temperature of 260° C. and a pressure of 0.9 kg/cm$^2$-G in a nitrogen atmosphere, to perform esterification reaction. In the esterification reaction, a mixture of water and ethylene glycol was distilled off.

The esterification reaction product (low condensate) was continuously drawn out of the system so that the average residence time was controlled to 3.5 hours.

The number-average molecular weight of the low condensate of ethylene glycol and terephthalic acid was 600 to 1300 (trimer to pentamer).

Using the solid titanium compound prepared in Example 473-1 and magnesium acetate as polycondensation catalysts, liquid phase polycondensation reaction of the low condensate was conducted.

The amount of the solid titanium compound added as the catalyst was 0.01% by mol in terms of titanium atom and the around of magnesium acetate added as the catalyst was 0.02% by mol in terms of magnesium atom, each amount being based on the terephthalic acid unit in the low condensate.

The polycondensation reaction was conducted under the conditions of a temperature of 280° C. and a pressure of 1 Torr. As a result, the time (liquid phase polycondensation time) required to attain an intrinsic viscosity (IV) of 0.65 dl/g of polyethylene terephthalate was 58 minutes.

Example 473-6

Polycondensation reaction was carried out in the same manner as in Example 473-5, except that the solid titanium compound prepared in Example 473-2 was used as the polycondensation catalyst.

The time (liquid phase polycondensation time) required to attain an intrinsic viscosity (IV) of 0.65 dl/g of polyethylene terephthalate was 60 minutes.

Example 473-7

Polycondensation reaction was carried out in the same manner as in Example 473-5, except that the solid titanium compound prepared in Example 473-3 was used as the polycondensation catalyst.

The time (liquid phase polycondensation time) required to attain an intrinsic viscosity (IV) of 0.65 dl/g of polyethylene terephthalate was 67 minutes.

Example 473-8

Polycondensation reaction was carried out in the same manner as in Example 473-5, except that the solid titanium compound prepared in Example 473-4 was used as the polycondensation catalyst.

The time (liquid phase polycondensation time) required to attain an intrinsic viscosity (IV) of 0.65 dl/g of polyethylene terephthalate was 65 minutes.

Comparative Example 473-1

Polycondensation reaction was carried out in the same manner as in Example 473-5, except that antimony acetate that was industrially used was used as the polycondensation catalyst. The amount of antimony acetate added was 0.025% by mol in terms of antimony, based on the terephthalic acid unit in the low condensate.

The time (liquid phase polycondensation time) required to attain an intrinsic viscosity (IV) of 0.65 dl/g of polyethylene terephthalate was 120 minutes.

Example 510-1

Preparation of Solid Titanium Compound

Deionized water of 500 ml was weighed out and introduced into a 1000 ml glass beaker. The deionized water in the beaker was cooled in an ice bath, and thereto was dropwise added 5 g of titanium tetrachloride with stirring. At this time, the temperature or the solution was 0 to 5° C. When production of hydrogen chloride stopped, the beaker containing the reaction solution was taken out of the ice bath, and 25% aqueous ammonia was dropwise added with stirring, to adjust pH of the solution to 8. At this time, the temperature of the solution was 0 to 10° C. The precipitate of titanium hydroxide produced was filtered under a pressure of 4 kg/cm$^2$-G through a pressure filter and separated. Thereafter, the precipitate of titanium hydroxide was washed 5 times with deionized water. After the washing, solid-liquid separation was carried out by pressure filtration under a pressure of 4 kg/cm$^2$-G similarly to the above. The washed titanium hydroxide was vacuum dried at 70° C. under a pressure of 10 Torr for 18 hours to remove water content, whereby a solid titanium compound was obtained.

Prior to use as a polycondensation catalyst, the solid titanium compound was pulverized into particles of about 50μ.

As a result of analysis of the sol-d titanium compound, the titanium content was 40% by weight, the nitrogen content was 950 ppm, the chlorine content was 54 ppm, the weigh: loss on heating up to 600° C. was 16.8% by weight, and the absorbed water content was 15.25% by weight. The OH/Ti ratio calculated from these results was 0.193. Measurement of crystallinity resulted in 0%, and this solid titanium compound was completely amorphous.

In Examples 510-1 and 510-2 and Comparative Examples 510-1 and 510-2, X-ray diffraction intensity was measured under the following conditions.

X-ray: Cu K-ALPHA1/50 kV/300 mA

Goniometer: RINT2000 wide angle goniometer

Attachment: standard sample holder

Filter: none

Counter monochrometer: fully automatic monochrometer

Divergence slit: ½ deg.

Scattering slit: ½ deg.

Light receiving slit: 0.15 mm

Counter: scintillation counter

Scanning mode: continuous

Scanning speed: 4°/min

Scanning step: 0.02°

Scanning axis: 2θ/θ

Scanning range: 1.5–70°

θ Offset: 0°

Fixed angle: 0°

Production of Polyester

To a reactor in which 33500 parts of weight of a reaction solution was resident during the steady operation, a slurry prepared by mixing high-purity terephthalic acid (6458 parts by weight/hr) and ethylene glycol (2615 parts by weight/hr) was continuously fed with stirring under the conditions of a temperature of 260° C. and a pressure of 0.9 kg/cm$^2$-G in a nitrogen atmosphere, to perform esterification reaction. In the esterification reaction, a mixture of water and ethylene glycol was distilled off.

The esterification reaction product (low condensate) was continuously drawn out of the system so that the average residence time was controlled to 3.5 hours.

The number-average molecular weight of the low condensate of ethylene glycol and terephthalic acid was 600 to 1300 (trimer to pentamer).

Using the solid titanium compound prepared above and magnesium acetate as polycondensation catalysts, polycondensation reaction of the low condensate was conducted.

The amount of the solid titanium compound added as the catalyst was 0.0105% by mol in terms of titanium atom, based on the terephthalic-c acid unit in the low condensate, and the amount of magnesium acetate added as the catalyst was 0.021% by mol in terms of magnesium atom, based on the terephthalic acid unit in the low condensate. In the polycondensation, tributyl phosphate was further added in an amount of 0.0105% by mol in terms of phosphorus atom. The polycondensation reaction was conducted under the conditions of a temperature of 285° C. and a pressure of 1 Torr, to obtain polyethylene terephthalate (liquid phase polycondensation product) having an intrinsic viscosity of 0.65 dl/g. The polycondensation time was 65 minutes.

Example 510-2

Preparation of Solid Titanium Compound

A solid titanium compound was obtained in the same manner as in Example 510-1, except that the drying temperature is changed to 100° C. from 70° C.

Prior to use as a polycondensation catalyst, the solid titanium compound was pulverized into particles of about 50μ.

As a result of analysis of the solid titanium compound, the titanium content was 43% by weight, the nitrogen content was 510 ppm, the chlorine content was 71 ppm, the weight loss on heating up to 600° C. was 13.65% by weight, and the absorbed water contend was 12.11% by weight. The OH/Ti ratio calculated from these results was 0.182. Measurement of crystallinity resulted in 7%, and this solid titanium compound was slightly crystallized.

Production of Polyester

Polycondensation reaction was carried out in the same manner as in Example 510-1, except that the solid titanium compound prepared above was used. As a result, polyethylene terephthalate (liquid phase polycondensation product) having an intrinsic viscosity of 0.65 dl/g was obtained. The polycondensation time was 68 minutes.

Comparative Example 510-1

Preparation of Solid Titanium Compound

Deionized water of 500 ml was weighed out and introduced into a 1000 ml glass beaker, and thereto was dropwise added 5 g of titanium tetrachloride with stirring. At this time, the temperature of the solution was about 25° C. After production of hydrogen chloride stopped, the temperature of the solution was kept at 80° C., and 25% aqueous ammonia was dropwise added with stirring, to adjust pH of the solution to 8. The precipitate of titanium hydroxide produced was filtered under a pressure of 4 kg/cm$^2$-G through a pressure filter and separated. Thereafter, the precipitate of titanium hydroxide was washed 5 times with deionized water. After the washing, solid-liquid separation was carried out by pressure filtration under a pressure of 4 kg/cm$^2$-G similarly to the above. The washed titanium hydroxide was vacuum dried at 70° C. under a pressure of 10 Torr for 18 hours to remove water content, whereby a solid titanium compound was obtained.

Prior to use as a polycondensation catalyst, the solid titanium compound was pulverized into particles of about 50μ.

As a result of analysis of the solid titanium compound, the titanium content was 50% by weight, the nitrogen content was 530 ppm, the chlorine content was 41 ppm, the weight loss on heating up to 600° C. was 16.63% by weight, and the absorbed water content was 14.68% by weight. The OH/Ti ratio calculated from these results was 0.200. Measurement of crystallinity resulted in 64%, and this solid titanium compound was considerably crystallized.

Production of Polyester

Polycondensation reaction was carried out in the same manner as in Example 510-1, except that the solid titanium compound prepared above was used. However, an intrinsic viscosity of 0.65 dl/g could not be obtained by the polycondensation for a period up to 240 minutes.

Comparative Example 510-2

Preparation of Solid Titanium Compound

Deionized water of 500 ml was weighed out and introduced into a 1000 ml glass beaker. The temperature of the deionized water was kept at 60° C., and 5 g of titanium tetrachloride was dropwise added with stirring. After production of hydrogen chloride stopped, the temperature of the solution was kept at 80° C., and 25% aqueous ammonia was dropwise added with stirring, to adjust pH of the solution to 8. The precipitate of titanium hydroxide produced was filtered under a pressure of 4 kg/cm$^2$-G through a pressure filter and separated. Thereafter, the precipitate of titanium hydroxide was washed 5 times wish deionized water. After the washing, solid-liquid separation was carried out by pressure filtration under a pressure of 4 kg/cm$^2$-G similarly to the above. The washed titanium hydroxide was vacuum dried at 100° C. under a pressure of 10 Torr for 18 hours to remove water content, whereby a solid titanium compound was obtained.

Prior to use as a polycondensation catalyst, the solid titanium compound was pulverized into particles of about 50μ.

As a result of analysis of the solid titanium compound, the titanium content was 47% by weight, the nitrogen content was 840 ppm, the chlorine content was 1050 ppm, the weight loss on heating up to 600° C. was 15.95% by weight, and the absorbed water content was 13.62% by weight. The OH/Ti ratio calculated from these results was 0.240. Measurement of crystallinity resulted in 71%, and this solid titanium compound was considerably crystallized.

Production of Polyester

Polycondensation reaction was carried out in the same manner as in Example 510-1, except that the solid titanium compound prepared above was used. However, an intrinsic viscosity of 0.65 dl/g could not be obtained by the polycondensation for a period us to 240 minutes.

Example [198-1]*498-1*

Preparation of Titanium-containing Hydrolyzate

Deionized water of 500 ml was weighed out and introduced into a 1000 ml glass beaker. The deionized water in the beaker was cooled in an ice bath, and thereto was dropwise added 5 g of titanium tetrachloride with stirring. When production of hydrogen chloride stopped, the beaker containing the reaction solution was taken out of the ice bath, and 25% aqueous ammonia was dropwise added with stirring, to adjust pH of the solution to 8. The precipitate of titanium hydroxide produced was filtered under a pressure of 3 kg/cm$^2$ through a pressure filter and separated. Thereafter, the precipitate of titanium hydroxide was washed 5 times with deionized water. After the washing, solid-liquid separation was carried out by pressure filtration under a pressure of 3 kg/cm$^2$ similarly to the above. The washed titanium hydroxide was vacuum dried at 70° C. under a pressure of 10 Torr for 18 hours to remove water contend, whereby a titanium-containing solid compound was obtained.

Prior to use as a polycondensation catalyst, the titanium-containing solid compound was pulverized into particles of about 10 μm.

Preparation of Catalyst For Polyester Production

A mixture of 10 g of the titanium-containing hydrolyzate, 65 g of ethylene glycol and 25 g of tetraethylammonium hydroxide was heated at 190° C. for 3 hours to obtain a catalyst for polyester production.

Production of Polyester

To a reactor in which 33500 parts by weight of a reaction solution was resident during the steady operation, a slurry prepared by mixing high-purity terephthalic acid and ethylene glycol was continuously fed, and esterification reaction was conducted under the conditions of a temperature of 260° C. and a pressure of 0.9 kg/cm$^2$-G in a nitrogen atmosphere with stirring. The slurry of high-purity terephthalic acid and ethylene glycol was prepared by mixing high-purity terephthalic acid and ethylene glycol at rate of 6458 parts by weight/hr and 2615 parts by eeight/hr, respectively.

In the esterification reaction, a mixture of water and ethylene glycol was distilled off. The esterification reaction product (low condensate) wad continuously drawn out of the system so that the average residence time was controlled to 3.5 hours.

The number-average molecular weight of the low condensate of ethylene glycol and terephthalic acid was 600 to 1300 (trimer to pentamer).

To the low condensate, the catalyst for polyester production was added in an amount of 0.021% by mol in terms of titanium atom, based on 1 mol of the terephthalic acid unit in the low condensate, and liquid phase polycondensation reaction was conducted under the conditions of a temperature of 285° C. and a pressure of 1 Torr. The time required to attain an intrinsic viscosity of 0.65 dl/g of polyethylene terephthalate was 57 minutes.

Example 498-1C

Polycondensation reaction was carried out in he same manner as in Example 498-1, except that the titanium-containing hydrolyzate was used in an amount of 0.021% by mol in terms of titanium atom, based on 1 mol of the terephthalic acid unit in low condensate, instead of the catalyst for polyester production. The time required to attain an intrinsic viscosity of 0.65 dl/g of polyethylene terephthalate was 3 hours and 55 minutes. The acetaldehyde content in the polyethylene terephthalate was 52 ppm.

Comparative Example 498-2

Preparation of Polycondensation Catalyst (1)

A mixture of 10 g of the titanium-containing hydrolyzate, 65 g of ethylene glycol and 25 g of acetic acid was heated at 190° C. for 3 hours to obtain a polycondensation catalyst (1).

Production of Polyester

Polycondensation reaction was carried out in the same manner as in Example 498-1, except that the polycondensation catalyst (1) was used in an amount of 0.021% by mol in terms of titanium atom, based on 1 mol of the terephthalic acid unit in low condensate, instead of the catalyst for polyester production. The time required to attain an intrinsic viscosity of 0.65 dl/g of polyethylene terephthalate was 146 minutes. The acetaldehyde content in the polyethylene terephthalate was 58 ppm.

Comparative Example 498-3

Preparation of Polycondensation Catalyst (2)

A mixture of 10 g of the titanium-containing hydrolyzate and 90 g of ethylene glycol was heated at 190° C. for 3 hours to obtain a polycondensation catalyst (2).

Production of Polyester

Polycondensation reaction was carried out in the same manner as in Example 498-1, except that the polycondensation catalyst (2) was used in an amount of 0.021% by mol in terms of titanium atom, based on 1 mol of the terephthalic acid unit in low condensate, instead of the catalyst for polyester production. The time required to attain an intrinsic viscosity of 0.65 dl/g of polyethylene terephthalate was 1 hour and 50 minutes.

Example 501-1

Preparation of Titanium-containing Solid Compound

Deionized water of 500 ml was weighed out and introduced into a 1000 ml glass beaker. The deionized water in the beaker was cooled in an ice bath, and thereto was dropwise added 5 g of titanium tetrachloride with stirring. When production of hydrogen chloride stopped, the beaker containing the reaction solution was taken out of the ice bath, and 25% aqueous ammonia was dropwise added with stirring, to adjust pH of the solution to 8. The precipitate of titanium hydroxide produced was filtered under a pressure of 3 kg/cm$^2$ through a pressure filter and separated. Thereafter, the precipitate of titanium hydroxide was washed 5 times with deionized water. After the washing, solid-liquid separation was carried out by pressure filtration under a pressure of 3 kg/cm$^2$ similarly to the above. The washed titanium hydroxide was vacuum dried at 70° C. under a pressure of 10 Torr for 18 hours to remove water content, whereby a titanium-containing solid compound was obtained.

Prior to use as a polycondensation catalyst, the titanium-containing solid compound was pulverized into particles of about 10 μm.

Production of Polyester

To a reactor in which 33500 parts by weight of a reaction solution was resident during the steady operation, a slurry prepared by mixing high-purity terephthalic acid and ethylene glycol was continuously fed, and esterification reaction was conducted under the conditions of a temperature of 260° C. and a pressure of 0.9 kg/cm$^2$-G in a nitrogen atmosphere with stirring. The slurry of high-purity terephthalic acid and ethylene glycol was prepared by mixing high-purity terephthalic acid and ethylene glycol at races of 6458 parts by weight/hr and 2615 parts by weight/hr, respectively.

In the esterification reaction, a mixture of water and ethylene glycol was distilled off. The esterification reaction product (low condensate) was continuously drawn out of the system so that the average residence time was controlled to 3.5 hours.

The number-average molecular weight of the low condensate of ethylene glycol and terephthalic acid was 600 to 1300 (trimer to pentamer)

To the low condensate, the titanium-containing solid compound was added in an amount of 0.021% by mol in terms of titanium atom, based on the terephthalic acid unit in the low condensate, magnesium hydrogenphosphate was added in an amount of 0.021% by mol in terms of magnesium atom, based on the terephthalic acid unit in the low condensate, and phosphoric acid was added in an amount of 0.0105% by mol in terms of phosphorus atom, and liquid phase polycondensation reaction was conducted under the conditions of a temperature of 285° C. and a pressure of 1 Torr. The time required to attain an intrinsic viscosity of 0.65 dl/g of polyethylene terephthalate was 57 minutes. The acetaldehyde content in the resulting polyethylene terephthalate was 60 ppm.

Example 501-2

Polycondensation reaction was carried out in the same manner as in Example 501-1, except that trimagnesium diphosphate was used instead of magnesium hydrogenphosphate. The time required to attain an intrinsic viscosity of 0.65 dl/g of polyethylene terephthalate was 67 minutes. The acetaldehyde content in the resulting polyethylene terephthalate was 57 ppm.

Example 501-1C

Polycondensation reaction was carried out in the same manner as in Example 501-1, except that magnesium acetate was used instead of magnesium hydrogenphosphate. The time required to attain an intrinsic viscosity of 0.65 dl/g of polyethylene terephthalate was 100 minutes. The acetaldehyde content in the resulting polyethylene terephthalate was 70 ppm.

Example 497-1

Preparation of Titanium-containing Solid Compound

Deionized water of 500 ml was weighed out and introduced into a 1000 ml glass beaker. The deionized water in the beaker was cooled in an ice bath, and thereto was dropwise added 5 g of titanium tetrachloride with stirring. When production of hydrogen chloride stopped, the beaker containing the reaction solution was taken out of the ice bath, and 25% aqueous ammonia was dropwise added with stirring, to adjust pH of the solution to 8. The precipitate of titanium hydroxide produced was filtered under a pressure of 3 kg/cm$^2$ through a pressure filter and separated. Thereafter, the precipitate of titanium hydroxide was washed 5 times with deionized water. After the washing, solid-liquid separation was carried out by pressure filtration under a pressure of 3 kg/cm$^2$ similarly to the above. The washed titanium hydroxide was vacuum dried at 70° C. under a pressure of 10 Torr for 18 hours to remove water content, whereby a titanium-containing solid compound was obtained.

Prior to use as a polycondensation catalyst, the titanium-containing solid compound was pulverized into particles of about 10 μm.

Production of Polyester

To a reactor in which 33500 parts by weight of a reaction solution was resident during the steady operation, a slurry prepared by mixing high-purity terephthalic acid and ethylene glycol was continuously fed, and esterification reaction was conducted under the conditions of a temperature of 260° C. and a pressure of 0.9 kg/cm$^2$-G in a nitrogen atmosphere with stirring. The slurry of high-purity terephthalic acid and ethylene glycol was prepared by mixing high-purity terephthalic acid and ethylene glycol at rates of 6458 parts by weight/hr and 2615 parts by weight/hr, respectively.

Before the beginning of the esterification reaction, the titanium-containing solid compound, magnesium acetate and tributyl phosphate were added. The amount of the titanium-containing solid compound added was 0.021% by mol in terms of titanium atom, based on terephthalic acid (unit), the amount of magnesium acetate added was 0.021% by mol in terms of magnesium atom, based on the terephthalic acid (unit), and the amount of tributyl phosphate added was 0.0105% by mol in terms of phosphate atom, based on the terephthalic aced (unit).

In the esterification reaction, a mixture of water and ethylene glycol was distilled off. The esterification reaction product (low condensate) was continuously drawn out of the system so that the average residence time was controlled to 3.5 hours.

The number-average molecular weight of the low condensate of ethylene glycol and terephthalic acid was 600 to 1300 (trimer to pentamer)

The low condensate thus obtained was subjected to liquid phase polycondensation reaction under the conditions of a temperature of 285° C. and a pressure of 1 Torr. The time required to attain an intrinsic viscosity of 0.65 dl/g of polyethylene terephthalate was 56 minutes.

Example 497-1C

Polyethylene terephthalate was produced in the same manner as in Example 497-1, except that the titanium-containing solid compound was not added in the esterification reaction step but added to the reactor of the first step in the liquid phase polycondensation step. The time required to attain an intrinsic viscosity of 0.65 dl/g of polyethylene terephthalate was 4 hours.

Example 499-1

Preparation of Titanium-containing Solid Compound

Deionized water of 500 ml was weighed out and introduced into a 1000 ml glass beaker. The deionized water in the beaker was cooled in an ice bath, and thereto was dropwise added 5 g of titanium tetrachloride with stirring. When production of hydrogen chloride stopped, the beaker containing the reaction solution was taken out of the ice bath, and 25% aqueous ammonia was dropwise added with stirring, to adjust pH of the solution to 8. The precipitate of titanium hydroxide produced was filtered under a pressure of 3 kg/cm$^2$ through a pressure filter and separated. Thereafter, the precipitate of titanium hydroxide was washed 5 times with deionized water. After the washing, solid-liquid separation was carried out by pressure filtration under a pressure of 3 kg/cm$^2$ similarly to the above. The washed titanium hydroxide was vacuum dried at 70° C. under a pressure of 10 Torr for 18 hours to remove water content, whereby a titanium-containing solid compound was obtained.

Prior to use as a polycondensation catalyst, the titanium-containing solid compound was pulverized into particles of about 10 μm.

Production of Polyester

To a reactor in which 33500 parts by weight of a reaction solution was resident during the steady operation, a slurry prepared by mixing high-purity terephthalic acid and ethylene glycol was continuously fed, and esterification reaction was conducted under the conditions of a temperature of 260° C. and a pressure of 0.9 kg/cm$^2$-G in a nitrogen atmosphere with stirring. The slurry of high-purity terephthalic acid and ethylene glycol was prepared by mixing high-purity terephthalic acid and ethylene glycol at rates of 6458 parts by weight/hr and 2615 parts by weight/hr, respectively.

In the esterification reaction, a mixture of water and ethylene glycol was distilled off. The esterification reaction product (low condensate) was continuously drawn out of the system so that the average resident time was controlled to 3.5 hours.

The number-average molecular weight of the low condensate of ethylene glycol and terephthalic acid was 600 to 1300 (trimer to pentamer)

To the low condensate, the titanium-containing solid compound and tributyl phosphate were added, and liquid phase polycondensation reaction was conducted under the conditions of a temperature of 285° C. and a pressure of 1 Torr. The amount of the titanium-containing solid compound added was 0.021% by mol in terms of titanium atom, based on 1 mol of the terephthalic acid unit in the low condensate, and the amount of tributyl phosphate added was 0.0105% by mol in terms of phosphorus atom, based on 1 mol of the terephthalic acid unit. The time required to attain an intrinsic viscosity of 0.65 dl/g of polyethylene terephthalic was 60 minutes.

Example 499-2

Polycondensation reaction was carried out in the same manner as in Example 499-1, except that trioctyl phosphate was used instead of tributyl phosphate. The time required to attain an intrinsic viscosity of 0.65 dl/g of polyethylene terephthalate was 60 minutes.

Example 499-3

Polycondensation reaction was carried out in the same manner as in Example 499-1, except that triphenyl phosphate was used instead of tributyl phosphate. The time required to attain an intrinsic viscosity of 0.65 dl/g of polyethylene terephthalate was 60 minutes.

Example 499-4

Polycondensation reaction was carried out in the same manner as in Example 499-1, except that trimethyl phosphate was used instead of tributyl phosphate. The time required to attain an intrinsic viscosity of 0.65 dl/g of polyethylene terephthalate was 75 minutes.

Example 500-1

Preparation of Titanium-containing Solid Compound

Deionized water of 500 ml was weighed out and introduced into a 1000 ml glass beaker. The deionized water in the beaker was cooled in an ice bath, and thereto was dropwise added 5 g of titanium tetrachloride with stirring. When production of hydrogen chloride stopped, the beaker containing the reaction solution was taken out of the ice bath, and 25% aqueous ammonia was dropwise added with stirring, to adjust pH of the solution to 8. The precipitate of titanium hydroxide produced was filtered under a pressure of 3 kg/cm$^2$ through a pressure filter and separated. Thereafter, the precipitate of titanium hydroxide was washed 5 times with deionized water. After the washing, solid-liquid separation was carried out by pressure filtration under a pressure of 3 kg/cm$^2$ similarly to the above. The washed titanium hydroxide was vacuum dried at 70° C. under a pressure of 10 Torr for 18 hours to remove water content, whereby a titanium-containing solid compound was obtained.

Prior to use as a polycondensation catalyst, the titanium-containing solid compound was pulverized into particles of about 10 μm.

Production of Polyester

To a reactor in which 33500 parts by weight of a reaction solution was resident during the steady operation, a slurry prepared by mixing high-purity terephthalic acid and ethylene glycol was continuously fed, and esterification reaction was conducted under the conditions of a temperature of 260° C. and a pressure of 0.9 kg/cm$^2$-G in a nitrogen atmosphere with stirring. The slurry of high-purity terephthalic acid and ethylene glycol was prepared by mixing high-purity terephthalic acid and ethylene glycol at rates of 6458 parts by weight/hr and 2615 parts by weight/hr, respectively.

In the esterification reaction, a mixture of water and ethylene glycol was distilled off. The esterification reaction product (low condensate) was continuously drawn out of the system so that the average residence time was controlled to 3.5 hours.

The number-average molecular weight of the low condensate of ethylene glycol and terephthalic acid was 600 to 1300 (trimer to pentamer).

To the low condensate, the titanium-containing solid compound, magnesium acetate and tetrakis(methylene-3(3,5-di-t-butyl-4-hydroxyphenyl)propionate)methane were added, and liquid phase polycondensation reaction was conducted under the conditions of a temperature of 285° C. and a pressure of 1 Torr. The amount of the titanium-containing solid compound added was 0.021% by mol in terms of titanium atom, based on the terephthalic acid unit in the low condensate, the amount of magnesium acetate added was 0.021% by mol in terms of magnesium atom, based on the terephthalic acid unit in the low condensate, and the amount of tetrakis(methylene-3(3,5-di-t-butyl-4-hydroxyphenyl) propionate)methane added was 600 ppm based on the low condensate.

The time required to attain an intrinsic viscosity of 0.65 dl/g of polyethylene terephthalate was 50 minutes. The acetaldehyde content in the resulting polyethylene terephthalate was 60 ppm.

Example 500-2

Polycondensation reaction was carried out in the same manner as in Example 500-1, except that bis(2,6-di-t-butyl- 4-phenylmethyl)pentaerythritol diphosphite was used in an amount of 300 ppm based on the low condensate instead of tetrakis(methylene-3(3,5-di-t-butyl-4-hydroxyphenyl) propionate)methane.

The time required to attain an intrinsic viscosity of 0.65 dl/g of polyethylene terephthalate was 48 minutes. The acetaldehyde content in the resulting polyethylene terephthalate was 52 ppm.

Example 500-3

Polycondensation reaction was carried out in the same manner as in Example 500-1, except that 3,5-di-t-butyl-4-hydroxybenzylphosphoric acid distearyl easter was used in an amount of 400 ppm based on the low condensate instead of tetrakis(methylene-3(3,5-di-t-butyl-4-hydroxyphenyl) propionate)methane.

The time required to attain an intrinsic viscosity of 0.65 dl/g of Polyethylene terephthalate was 46 minutes. The acetaldehyde content in the resulting polyethylene terephthalate was 58 ppm.

Example 500-4

Polycondensation reaction was carried out in the same manner as in Example 500-1, except that a mixture of tetrakis(methylene-3(3,5-di-t-butyl-4-hydroxyphenyl) propionate)methane, 5,7-di-t-butyl-3-(3,4-dimethylphenyl)-3H-benzofuran-2-one and tris(2,4-di-t-butylphenly) phosphite (mixing ratio=42.5:15:42.5) was used in an amount of 500 ppm based on the low condensate instead of tetrakis(methylene-3(3,5-di-t-butyl-4-hydroxyphenyl) propionate)methane.

The time required to attain an intrinsic viscosity of 0.65 dl/g of polyethylene terephthalate was 49 minutes. The acetaldehyde content in the resulting polyethylene terephthalate was 55 ppm.

Example 500-5

Polycondensation reaction was carried out in the same manner as in example 500-1, except that tributyl phosphate was used in an amount of 0.0105% by mol in terms or phosphorus atom, based on the terephthalic acid in the low condensate, in addition to tetrakis(methylene-3(3,5-di-t-butyl-4-hydroxyphenyl)propionate)methane.

The time required to attain an intrinsic viscosity of 0.65 dl/g of polyethylene terephthalate was 50 minutes. The acetaldehyde content in the resulting polyethylene terephthalate was 50 ppm.

Example 500-1C

Polycondensation reaction was carried out in the same manner as in Example 500-1, except that phosphoric acid was used in an amount of 0.0105% by mol in terms of phosphorus atom, based on the terephthalic acid unit in the low condensate, instead of tetrakis(methylene-3(3,5-di-t-butyl-4-hydroxyphenyl)propionate)methane.

The time required to attain an intrinsic viscosity of 0.65 gl/g of polyethylene terephthalate was 70 minutes. The acetaldehyde content in the resulting polyethylene terephthalate was 70 ppm.

Example 502-1

Preparation of Titanium-containing Solid Compound

Deionized water of 500 ml was weighed out and introduced into a 1000 ml glass beaker. The deionized water in the beaker was cooled in an ice bath, and thereto was dropwise added 5 g of titanium tetrachloride with stirring. When production of hydrogen chloride stopped, the beaker containing the reaction solution was taken out of the ice bath, and 25% aqueous ammonia was dropwise added with stirring, to adjust pH of the solution to 8. The precipitate of titanium hydroxide produced was filtered under a pressure of 3 kg/cm$^2$ through a pressure filter and separated. Thereafter, the precipitate of titanium hydroxide was washed 5 times with deionized water. After the washing, solid-liquid separation was carried out by pressure filtration under a pressure of 3 kg/cm$^2$ similarly to the above. The washed titanium hydroxide was vacuum dried at 70° C. under a pressure of 10 Torr for 18 hours to remove water content, whereby a titanium-containing solid compound was obtained.

Prior to use as a polycondensation catalyst, the titanium-containing solid compound was pulverized into particles of about 10 μm.

Production of Polyester

To a reactor in which 33500 parts by weight of a reaction solution was resident during the steady operation, a slurry prepared by mixing high-purity terephthalic acid and ethylene glycol was continuously fed, and esterification reaction wad conducted under the conditions of a temperature of 260° C. and a pressure of 0.9 kg/cm$^2$-G in a nitrogen atmosphere with stirring. The slurry of high-purity terephthalic acid and ethylene glycol was prepared by mixing high-purity terephthalic acid and ethylene glycol at rates of 6458 parts by weight/hr and 2615 parts by weight/hr, respectively.

Before the beginning of the esterification reaction, the titanium-containing solid compound, magnesium acetate, tributyl phosphate and a tint adjusting agent were added to the reactor. The amount of the titanium-containing solid compound added was 12 ppm in terms of titanium atom, based on the polyethylene terephthalate, the amount of magnesium acetate added was 25 ppm in terms of magnesium atom, based on the polyethylene terephthalate, the amount of tributyl phosphate added was 15 ppm in berms of phosphorus atom, based on the polyethylene terephthalate, and the amount of the tint adjusting agent (Solvent Blue 104) added was 5.0 ppm based on the polyethylene terephthalate.

In the esterification reaction, a mixture of water and ethylene glycol was distilled off. The esterification reaction product (low condensate) was continuously drawn out of the system so that the average residence time was controlled to 3.5 hours.

The number-average molecular weight of the low condensate of ethylene glycol and terephthalic acid was 600 to 1300 (trimer to pentamer).

The low condensate thus obtained was subjected to liquid phase polycondensation reaction under the conditions of a temperature of 285° C. and a pressure of 1 Torr.

The tint of the polyester chips obtained above was measured by a 45° diffusion type color difference meter (Nippon Denshoku SQ 300H Model). The result is set forth in Table 502-1.

Examples 502-2 to 502-5. Examples 502-1C

A polyester was produced in the same manner as in Example 502-1, except that the type and the amount of the tint adjusting agent were changed as shown in Table 502-1. The tint of the polyester chips was measured. The result is set forth in Table 502-1.

Examples 502-6 to 502-11. Examples 502-2C to 502-4C

A polyester was produced in the same manner as in Example 502-1, except that the amounts of the titanium-containing solid compound, magnesium acetate and the phosphorus compound were changed as shown in Table 502-1 and the type and the amount of the tint adjusting agent were changed as shown in Table 502-1. The tint of the polyester chips was measured. The result is set froth in Table 502-1.

TABLE 502-1

| | Titanium-containing solid compound (ppm) | Magnesium acetate (ppm) | Phosphorus compound (ppm) | Tint adjusting agent (ppm) Solvent Blue 104 | Pigment Red 263 | Solvent Red 135 | Tint L value | a value | b value |
|---|---|---|---|---|---|---|---|---|---|
| Ex. 502-1 | 12 | 25 | 15 | 5.0 | — | — | 51.2 | −7.4 | −5.0 |
| Ex. 502-2 | " | " | " | 5.0 | 3.0 | — | 45.4 | 0.0 | −7.0 |
| Ex. 502-3 | " | " | " | 3.0 | 1.8 | — | 51.4 | −0.7 | −2.4 |
| Ex. 502-4 | " | " | " | 1.0 | 0.6 | — | 58.8 | −2.1 | 4.0 |
| Ex. 502-5 | " | " | " | — | 5.0 | — | 55.7 | 14.0 | 5.1 |
| Ex. 502-1C | " | " | " | — | — | — | 65.9 | −2.8 | 10.5 |
| Ex. 502-6 | 18 | 18 | 30 | 2.0 | 1.5 | — | 71.5 | −0.2 | −1.1 |
| Ex. 502-7 | " | " | " | 2.5 | — | 2.5 | 53.4 | −1.6 | −0.4 |
| Ex. 502-2C | " | " | " | — | — | — | 65.4 | −2.5 | 8.8 |
| Ex. 502-8 | 25 | 25 | 15 | — | — | 5.0 | 56.7 | 10.2 | 10.7 |
| Ex. 502-9 | " | " | " | — | — | 2.0 | 61.0 | 3.6 | 10.1 |
| Ex. 502-3C | " | " | " | — | — | — | 64.8 | −3.0 | 11.9 |
| Ex. 502-10 | 18 | 18 | 15 | 1.5 | — | 1.0 | 55.9 | −2.8 | 1.5 |
| Ex. 502-11 | " | " | " | 2.5 | — | 2.0 | 52.4 | −2.0 | −0.5 |
| Ex. 502-4C | " | " | " | — | — | — | 65.8 | −2.4 | 9.1 |

Example 46a-1

In a stainless steel container, 2.5 kg of particulate polyethylene terephthalate having an intrinsic viscosity of 0.85 dl/g, a density of 1.40 g/cm$^3$ and an acetaldehyde content of 1.5 ppm was immersed in 4 kg of a trimethyl phosphate aqueous solution of 0.0695% by weight (161 ppm in terms of phosphorus atom), and they were kept at room temperature for 4 hours. Thereafter, the particulate polyethylene terephthalate was separated from the trimethyl phosphate aqueous solution, hydro-extracted and then dried at 160° C. for 5 hours in a stream of nitrogen. Using the resulting polyethylene terephthalate, a stepped square plate molded product was produced by the aforesaid method. The stepped square plate molded product has an acetaldehyde content of 7.7 ppm and an intrinsic viscosity of 0.821 dl/g.

Example 464-2

In a stainless steel container, 2.5 kg of the same particulate polyethylene terephthalate as used in Example 464-1 was immersed in 4 kg of a trimethyl phosphate aqueous solution of 0.0595% by weight (161 ppm in terms of phosphorus atom). Then, the stainless steel container containing the polyethylene terephthalate and the trimethyl phosphate aqueous solution was externally heated to control the internal temperature to 95° C. and kept for 4 hours to perform heat treatment. Thereafter, the particulate polyethylene terephthalate was separated from the trimethyl phosphate aqueous solution, hydro-extracted and then dried at 160° C. for 5 hours in a stream of nitrogen. Using the resulting polyethylene terephthalate, a stepped square plate molded product was produced by the aforesaid method. The stepped square plate molded product had an acetaldehyde content of 8.5 ppm and an intrinsic viscosity of 0.802 dl/g.

Example 46d-1C

The same particulate polyethylene terephthalate as used in Example 464-1 was molded into a stepped square plate molded product by the aforesaid method, without performing a contact treatment with a phosphorus-containing aqueous solution. The stepped square plate molded product had an acetaldehyde content of 11 ppm and an intrinsic viscosity of 0.833 dl/g.

Example a64-2C

Treatment of particulate polyethylene terephthalate was carried out in the same manner as in Example 464-1, except that a phosphoric acid aqueous solution having the same concentration (0.0508% by weight, 161 ppm in terms of phosphorus atom) was used instead of the trimethyl phosphate aqueous solution. Using the resulting polyethylene terephthalate, a stepped square plate molded product was produced by the aforesaid method. The stepped square plate molded product had an acetaldehyde content of 8.3 ppm and an intrinsic viscosity of 0.814 dl/g.

Comparative Example 464-3

Treatment of particulate polyethylene terephthalate was carried out in the same manner as in Example 464-2, except that a phosphoric acid aqueous solution was used instead of the trimethyl phosphate aqueous solution. Using the resulting polyethylene terephthalate, a stepped square plate molded product was produced by the aforesaid method. The stepped square plate molded product had an acetaldehyde content of 10.0 ppm and an intrinsic viscosity of 0.788 dl/g.

Example 465-1

Preparation of Titanium-containing Solid Compound

Deionized water of 500 ml was weighed out and introduced into a 1000 ml glass beaker. The deionized water in the beaker was cooled in an ice bath, and thereto was dropwise added 5 g of titanium tetrachloride with stirring. When production of hydrogen chloride stopped, the beaker containing the reaction solution was taken out of the ice bath, and 25% aqueous ammonia was dropwise added with stirring, to adjust pH of the solution to 8. The precipitate of titanium hydroxide produced was filtered under a pressure of 3 kg/cm$^2$ through a pressure filter and separated. Thereafter, the precipitate of titanium hydroxide was washed 5 times with deionized water. After the washing, solid-liquid separation was carried out by pressure filtration under a pressure of 3 kg/cm$^2$ similarly to the above. The washed titanium hydroxide was vacuum dried at 70° C. under a pressure of 10 Torr for 18 hours to remove water content, whereby a titanium-containing solid compound was obtained.

Prior to use, the titanium-containing solid compound was pulverized into particles of about 10 μm.

Production of Polyethylene Terephthalate

To a reactor in which 33500 parts by weight of a reaction solution was resident during the steady operation, a slurry prepared by mixing high-purity terephthalic acid and ethylene glycol was continuously fed, and esterification reaction was conducted under the conditions of a temperature of 260° C. and a pressure of 0.9 kg/cm$^2$-G in a nitrogen atmosphere with stirring. The slurry of high-purity terephthalic acid and ethylene glycol was prepared by mixing high-purity terephthalic acid and ethylene glycol at rates of 6458 parts by weight/hr and 2615 parts by weight/hr, respectively.

In the esterification reaction, a mixture of water and ethylene glycol was distilled off. The esterification reaction product (low condensate) was continuously drawn out of the system so that the average residence time was controlled to 3.5 hours. The number-average molecular weight of the low condensate of ethylene glycol and terephthalic acid was 600 to 1300 (trimer to pentamer).

To the low condensate, the titanium-containing solid compound, magnesium acetate and tributyl phosphate were added, and liquid phase polycondensation reaction was conducted under the conditions of a temperature of 285° C. and a pressure of 1 Torr to obtain polyethylene terephthalate having an intrinsic viscosity of 0.65 dl/g. The amount of the titanium-containing solid compound added was 0.021% by mol in terms of titanium atom, based on the terephthalic acid unit in the low condensate, the amount of magnesium acetate added was 0.021% by mol in terms of magnesium atom, based on the terephthalic acid unit in the low condensate, and the amount of tributyl phosphate added was 0.0105% by mol in terms of phosphorus atom, based on the terephthalic acid unit in the low condensate.

The polyethylene terephthalate in which the liquid phase polycondensation had been completed was subjected to solid phase polycondensation, to obtain particulate polyethylene terephthalate having an intrinsic viscosity of 0.81 dl/g, a density of 1.40 g/cm$^3$ and an acetaldehyde content of 1.0 ppm.

Treatment of Polyethylene Terephthalate

Into a 100 ml flask, 10 g of the particulate polyethylene terephthalate and 40 g of isopropanol were introduced, and they were heated for 4 hours under reflux. The mixture was dried at 70° C. for 16 hours, melted by heating at 270° C. for 6 minutes and then cooled to room temperature to give a sample. Measurement of acetaldehyde content in the sample resulted in 5.2 ppm.

Example 465-2

Contact of particulate polyethylene terephthalate with an organic solvent was carried out in the same manner as in Example 465-1, except that methanol was used instead of isopropanol. Then, the acetaldehyde content was measured in the same manner as in Example 465-1. As a result, the acetaldehyde content was 6.4 ppm.

Example 465-3

Contact of particulate polyethylene terephthalate with an organic solvent was carried out in the same manner as in Example 465-1, except that acetone was used instead of isopropanol. Then, the acetaldehyde content was measured in the same manner as in Example 465-1. As a result, the acetaldehyde content was 6.7 ppm.

Example 465-4

Contact of particulate polyethylene terephthalate with an organic solvent was carried out in the same manner as in Example 465-1, except that hexane was used instead of isopropanol. Then, the acetaldehyde content was measured in the same manner as in Example 465-1. As a result, the acetaldehyde content was 6.8 ppm.

Example 465-1C

The same particulate polyethylene terephthalate as used in Example 465-1 was dried at 70° C. for 16 hours, melted by heating at 270° C. for 6 minutes and cooled to room temperature, without performing a contact treatment with an organic solvent, to give a sample. Measurement of acetaldehyde content in the sample resulted in 7.3 ppm.

Example 466-1

Preparation of Titanium-containing Solid Compound

Deionized water of 500 ml was weighed out and introduced into a 1000 ml glass beaker. The deionized water in the beaker was cooled in an ice bath, and thereto was dropwise added 5 g of titanium tetrachloride with stirring. When production of hydrogen chloride stopped, the beaker containing the reaction solution was taken out of the ice bath, and 25% aqueous ammonia was dropwise added with stirring, to adjust pH of the solution to 8. The precipitate of titanium hydroxide produced was filtered under a pressure of 3 kg/cm$^2$ through a pressure filter and separated. Thereafter, the precipitate of titanium hydroxide was washed 5 times with deionized water. After the washing, solid-liquid separation was carried out by pressure filtration under a pressure of 3 kg/cm$^2$ similarly to the above. The washed titanium hydroxide was vacuum dried at 70° C. under a pressure of 10 Torr for 18 hours to remove water content, whereby a titanium-containing solid compound was obtained.

Prior to use, the titanium-containing solid compound was pulverized into particles of about 10 μm.

Production of Polyethylene Terephthalate

To a reactor in which 33500 parts by weight of a reaction solution was resident during the steady operation, a slurry prepared by mixing high-purity terephthalic acid and ethylene glycol was continuously fed, and esterification reaction was conducted under the conditions of a temperature of 260° C. and a pressure of 0.9 kg/cm$^2$-G in a nitrogen atmosphere with stirring. The slurry of high-purity terephthalic acid and ethylene glycol was prepared by mixing high-purity terephthalic acid and ethylene glycol at rates of 6458 parts by weight/hr and 2615 parts by weight/hr, respectively.

In the esterification reaction, a mixture of water and ethylene glycol was distilled off. The esterification reaction product (low condensate) was continuously drawn out of the system so that the average residence time was controlled to 3.5 hours.

The number-average molecular weight of the low condensate of ethylene glycol and terephthalic acid was 600 to 1300 (trimer to pentamer).

To the low condensate, the titanium-containing solid compound, magnesium acetate and tributyl phosphate were added, and liquid phase polycondensation reaction was conducted under the conditions of a temperature 285° C. and a pressure of 1 Torr to obtain polyethylene terephthalate having an intrinsic viscosity of 0.65 dl/g. The amount of the titanium-containing solid compound added was 0.021% by mol in terms of titanium atom, based on the terephthalic acid unit in the low condensate, the amount of magnesium acetate added was 0.021% by mol in terms of magnesium atom, based on the terephthalic acid unit in the low condensate, and the amount of tributyl phosphate added was 0.0105% by mol in terms of phosphorus atom, based on the terephthalic acid unit in the low condensate.

The polyethylene terephthalate in which the liquid phase polycondensation had been completed was subjected to solid phase polycondensation, to obtain particulate polyethylene terephthalate having an intrinsic viscosity of 0.81 dl/g, a density of 1.40 g/cm$^3$ and an acetaldehyde content of 1.0 ppm.

Treatment of Polyethylene Terephthalate

Into a 200 ml flask, 30 g of the particulate polyethylene terephthalate, 60 g of isopropanol and 10.3 of tributyl phosphate (2% by weight in terms of phosphorus atom based on isopropanol) were introduced, and they were heated for 4 hours under reflux. Thereafter, he mixture was washed three times with 60 g of isopropanol, dried at 70° C. for 16 hours, melted by heating at 285° C. for 10 minutes an then cooled to room temperature to give a sample. Measurement of an acetaldehyde content in the sample resulted in 30 ppm.

Example 466-2

Contact of particulate polyethylene terephthalate with a phosphorus-containing organic solvent solution was carried out in the same manner as in Example 466-1, except that methanol was used instead of isopropanol and 5.4 g (2% by weight in terms of phosphorus atom based on methanol) of trimethyl phosphate was used instead of 10.3 g of tributyl phosphate. Then, the acetaldehyde content was measured in the same manner as in Example 466-1. As a result, the acetaldehyde content was 28 ppm.

Example 466-3

Contact of particulate polyethylene terephthalate with a phosphorus-containing organic solvent solution was carried out in the same manner as in Example 466-1, except that acetone was used instead of isopropanol. Then, the acetaldehyde content was measured in the same manner as in Example 466-1. As a result, the acetaldehyde content was 40 ppm.

Example 466-4

Contact of particulate polyethylene terephthalate with a phosphorus-containing organic solvent solution was carried out in the same manner as in Example 466-1, except that hexane was used instead of isopropanol. Then, the acetaldehyde content was measured in the same manner as in Example 466-1. As a result, the acetaldehyde content was 35 ppm.

Example 466-5

Contact of particulate polyethylene terephthalate with a phosphorus-containing organic solvent solution was carried out in the same manner as in Example 466-1, except that 3.8 g (2% by weight in terms of phosphorus atom based on isopropanol) of phosphoric acid was used instead of 10.3 g of tributyl phosphate. Then, the acetaldehyde content was measured in the same manner as in Example 466-1. As a result, the acetaldehyde content was 36 ppm.

Example 466-1C

The same particulate polyethylene terephthalate as used in Example 466-1 was dried at 70° C. for 16 hours, melted by heating at 285° C. for 10 minutes and cooled to room temperature, without performing a contact treatment with a phosphorus-containing organic solvent solution, to give a sample. Measurement of an acetaldehyde content in the sample resulted in 50 ppm.

Comparative Example 466-2

Contact of particulate polyethylene terephthalate with a phosphoric acid aqueous solution was carried out in the same manner as in Example 466-1, except that water was used instead of isopropanol and 3.8 g (2% by weight in terms of phosphorus atom based on water) of phosphoric acid was used instead of 10.3 g of tributyl phosphate. Then, the acetaldehyde content was measured in the same manner as in Example 466-1. As a result, the acetaldehyde content was 45 ppm.

Example 462-1

Production of Polyester

To a reactor in which 33500 parts by weight of a reaction solution was resident during the steady operation, a slurry prepared by mixing high-purity terephthalic acid (6458 parts by weight/hr) and ethylene glycol (261 parts by weigh/hr) was continuously fed, and esterification reaction was conducted under the condition of a temperature or 260° C. and a pressure of 0.9 kg/cm$^2$-G in a nitrogen atmosphere with stirring. In the esterification reaction, the solid titanium compound prepared in Example 495-1 was fed at a rate of 0.187 part by weight/hr in terms of titanium atom, and magnesium acetate was fed at a rate of 0.187 part by weight/hr in terms of magnesium atom. In the esterification reaction, a mixture of water and ethylene glycol was distilled off.

The esterification reaction product (low condensate) was continuously drawn out of the system so that the average residence time was controlled to 3.5 hours.

The number-average molecular weight of the low condensate of ethylene glycol and terephthalic acid was 600 to 1300 (trimer to pentamer).

Then, liquid phase polycondensation reaction of the low condensate was conducted under the conditions of a temperature of 280° C. and a pressure of 1 Torr, with feeding tributyl phosphate at a race of 0.831 part by weight/hr.

The residence time (liquid phase polymerization time) required to attain an intrinsic viscosity (IV) of 0.65 dl/g of polyethylene terephthalate was 95 minutes.

The polyethylene terephthalate obtained by the liquid phase polymerization was crystallized at about 170° C. for 2 hours in a nitrogen atmosphere and then filled in a tower type solid phase polymerization reactor to perform solid phase polymerization at 210° C. for 14 hours in a nitrogen atmosphere.

In the resulting polyethylene terephthalate, the titanium atom content was 25 ppm, the magnesium atom content was 25 ppm, the titanium atom/magnesium atom molar ratio was 0.5, the intrinsic viscosity was 0.85 dl/g, the density was 1.40 g/cm$^3$, and the acetaldehyde content was 1.0 ppm.

In a stainless steel container, 2.5 kg of the polyethylene terephthalate was immersed in 4 kg of a trimethyl phosphate aqueous solution of 0.0695% by weight, and they were kept at room temperature for 4 hours. Thereafter, the particulate polyethylene terephthalate was separated from the trimethyl phosphate aqueous solution, hydro-extracted and then dried at 160° C. for 5 hours in a stream of nitrogen. The acetaldehyde content in the resulting polyethylene terephthalate was 1.0 ppm. Using the polyethylene terephthalate, a stepped square plate molded product was produced by the aforesaid method. The acetaldehyde content in the stepped square plate molded product was 9.0 ppm, and a difference in the acetaldehyde content between before and after the molding was 8.0 ppm. The intrinsic viscosity of the stepped square plate molded product was 0.821 dl/g.

Example 462-2

In a stainless steel container, 2.5 kg of the same particulate polyethylene terephthalate as used in Example 462-1 was immersed in 4 kg of a trimethyl phosphate aqueous solution of 0.0695% by weight. Then, the stainless steel container containing the polyethylene terephthalate and the trimethyl phosphate aqueous solution was externally heated to control the internal temperature to 95° C. and kept for 4 hours to perform heat treatment. Thereafter, the particulate polyethylene terephthalate was separated from the trimethyl phosphate aqueous solution, hydro-extracted and then dried at 160° C. for 5 hours in a stream of nitrogen. Using the resulting polyethylene terephthalate, a stepped square plate molded product was produced by the aforesaid method. The acetaldehyde content in the stepped square plate molded product was 9.5 ppm, and a difference in the acetaldehyde content between before and after the molding was 8.5 ppm. The intrinsic viscosity of the stepped square plate molded product was 0.802 dl/g.

Example 462-1C

The same particulate polyethylene terephthalate as used in Example 462-1 was molded into a stepped square plate molded product by the aforesaid method, without performing a contact treatment with a phosphorus-containing aqueous solution. The acetaldehyde content in the stepped square plate molded product was 20 ppm, and a difference in the acetaldehyde content between before and after the molding was 19 ppm. The intrinsic viscosity of the stepped square plate molded product was 0.833 dl/g.

Comparative Example 462-2

Treatment of particulate polyethylene terephthalate was carried out in the same manner as in Example 402-1, except that a phosphoric acid aqueous solution having the same concentration was used instead of the trimethyl phosphate aqueous solution. Using the resulting polyethylene terephthalate, a stepped square plate molded product was produced by the aforesaid method. The acetaldehyde content in the stepped square plate molded product was 13 ppm, and a difference in the acetaldehyde content between before and after the molding was 12 ppm. The intrinsic viscosity of the stepped square plate molded product was 0.814 dl/g.

Example 462-3

To a reactor in which 33500 parts by weight of a reaction solution was resident during the steady operation, a slurry prepared by mixing high-purity terephthalic acid (6329 parts by weight/hr), isophthalic acid (129 parts by weight) and ethylene glycol (2615 parts by weight/hr) was continuously fed, and esterification reaction was conducted under the conditions of a temperature of 260° C. and a pressure of 0.9 kg/cm$^2$-G in a nitrogen atmosphere with stirring.

In the esterification reaction, a solid titanium compound prepared in the same manner as in Example 462-1 was fed at a rate of 0.112 part by weight/hr in terms of titanium atom, and magnesium acetate was fed at a rate of 0.187 part by weight/hr in terms of magnesium atom. In the esterification reaction, a mixture of water and ethylene glycol was distilled off.

The esterification reaction product (low condensate) was continuously drawn out of the system so that the average residence time was controlled co 3.5 hours.

The number-average molecular weight of the low condensate of ethylene glycol and terephthalic acid was 600 to 1300 (trimer to pentamer).

Then, liquid phase polycondensation reaction of the low condensate was conducted under the conditions of a temperature of 280° C. and a pressure of 1 Torr, with feeding tributyl phosphate at a rate of 0.831 part by weight/hr.

The residence time (liquid phase polymerization time) required to attain an intrinsic viscosity (IV) of 0.65 dl/g of polyethylene terephthalate was 115 minutes.

The polyethylene terephthalate obtained by the liquid phase polymerization was crystallized at about 170° C. for 2 hours in a nitrogen atmosphere and then filled in a tower type solid phase polymerization reactor to perform solid phase polymerization at 210° C. for 17 hours in a nitrogen atmosphere.

In the resulting polyethylene terephthalate, the titanium atom content was 15 ppm, the magnesium atom content was 25 ppm, the titanium atom/magnesium atom molar ratio was 0.3, the intrinsic viscosity was 0.83 dl/g, the density was 1.40 g/cm$^3$, and the acetaldehyde content was 0.9 ppm.

In a stainless steel container, 2.5 kg of the polyethylene terephthalate was immersed in 4 kg of a trimethyl phosphate aqueous solution of 0.0695% by weight, and they were kept at room temperature for 4 hours. Thereafter, the particulate polyethylene terephthalate was separated from the trimethyl phosphate aqueous solution, hydro-extracted and then dried at 160° C. for 5 hours in a stream of nitrogen. The acetaldehyde content in the resulting polyethylene terephthalate was 0.8 ppm. Using the polyethylene terephthalate, a stepped square plate molded product as produced by the aforesaid method. The acetaldehyde content in the stepped square plate molded product was 8.2 ppm, and a difference in the acetaldehyde content between before and after the molding was 7.4 ppm. The intrinsic viscosity of the stepped square plate molded product was 0.819 dl/g.

Example 462-4

In a stainless steel container, the polyethylene terephthalate obtained after the solid phase polymerization in Example 462-3 was immersed in isopropanol at 95° C. and kept for 4 hours under heating.

Then, the polyethylene terephthalate was separated from isopropanol and dried at 160° C. for 5 hours in a stream of nitrogen. The acetaldehyde content in the resulting polyethylene terephthalate was 0.9 ppm. Using the polyethylene terephthalate, a stepped square plate molded product was produced by the aforesaid method. The acetaldehyde content in the stepped square plate molded product was 9.5 ppm, and a difference in the acetaldehyde content between before and after the molding was 8.6 ppm. The intrinsic viscosity of the stepped square plate molded product was 0.810 dl/g.

Example 462-5

In a stainless steel container, the polyethylene terephthalate obtained after the solid phase polymerization in Example 462-3 was immersed in an isopropanol solution of tributyl phosphate (tributyl phosphate: 0.0695% by weight) and kept for 2 hours under heating.

Then, the polyethylene terephthalate was separated from the isopropanol solution and dried at 160° C. for 5 hours in a stream of nitrogen. The acetaldehyde content in the resulting polyethylene terephthalate was 0.7 ppm. Using the polyethylene terephthalate, a stepped square plate molded product was produced by the aforesaid method. The acetaldehyde content in the stepped square plate molded product was 8.2 ppm, and a difference in the acetaldehyde content between before and after the molding was 7.5 ppm. The intrinsic viscosity of the stepped square plate molded product was 0.808 dl/g.

Example 463-1

Production of Polyester

To a reactor in which 33500 parts by weigh of a reaction solution was resident during the steady operation, a slurry prepared by mixing high-purity terephthalic acid (6458 parts by weight/hr) and ethylene glycol (2909 parts by weight/hr) was continuously fed, and esterification reaction was conducted under the conditions of a temperature of 260° C. and a pressure of 0.9 kg/cm$^2$-G in a nitrogen atmosphere with stirring. In the esterification reaction, the solid titanium compound prepared in Example 495-1 was fed at a rate of 0.187 part by weight/hr in terms of titanium atom, and magnesium acetate was fed at a rate of 0.187 part by weight/hr in terms of magnesium atom. In the esterification reaction, a mixture of water and ethylene glycol was distilled off.

The esterification reaction product (low condensate) was continuously drawn out of the system so that the average residence time was controlled to 3.5 hours.

The number-average molecular weight of he low condensate of ethylene glycol and terephthalic acid was 600 to 1300 (trimer to pentamer).

Then, liquid phase polycondensation reaction or the low condensate was conducted under the conditions of a temperature of 280° C. and a pressure of 1 Torr, with Feeding tributyl phosphate at a rate of 0.831 part by weight/hr.

The residence time (liquid chase polymerization time) required to attain an intrinsic viscosity (IV) of 0.55 dl/g of polyethylene terephthalate was 87 minutes.

The polyethylene terephthalate obtained by the liquid phase polymerization was crystallized at about 170° C. for 2 hours in a nitrogen atmosphere and then filled in a tower type solid phase polymerization reactor to perform solid phase polymerization at 210° C. for 25 hours in a nitrogen atmosphere.

In the resulting polyethylene terephthalate, the titanium atom content was 24 ppm, the magnesium atom content was 24 ppm, the titanium atom/magnesium molar ratio was 0.5, the intrinsic viscosity was 0.760 dl/g, the density was 1.40 g/cm$^3$, and the cyclic trimer content was 0.3% by weight.

In a stainless steel container, 2.5 kg of the polyethylene terephthalate was immersed in 4 kg of a trimethyl phosphate aqueous solution of 0.0695% by weight, and they were kept at room temperature for 4 hours. Thereafter, the particulate polyethylene terephthalate was separated from the trimethyl phosphate aqueous solution, hydro-extracted and then dried at 160° C. for 5 hours in a stream of nitrogen. The cyclic trimer content in the resulting polyethylene terephthalate was 0.30% by weight (x % by weight). Using the polyethylene terephthalate, a stepped square plate molded product was produced by the aforesaid method. The cyclic trimer content in the stepped square plate molded product was 0.35% by weight, a difference in the cyclic trimer content between before and after the molding was 0.05% by weight (y % by weight), and the value of −0.2+0.2 was 0.14. The intrinsic viscosity of the stepped square plate molded product was 0.825 dl/g.

Example 463-2

In a stainless steel container, 2.5 kg of the same particulate polyethylene terephthalate as used in Example 463-1 was immersed in 4 kg of a trimethyl phosphate aqueous solution of 0.0695% by weight. Then, the stainless steel container containing the polyethylene terephthalate and the trimethyl phosphate aqueous solution was externally heated to control the internal temperature to 95° C. and kept for 4 hours at perform heat treatment. Thereafter, the particulate polyethylene terephthalate was separated from the trimethyl phosphate aqueous solution, hydro-extracted and then dried at 160° C. for 5 hours in a stream of nitrogen. The cyclic trimer content in the resulting polyethylene terephthalate was 0.30% by weight (x % by weight). Using the polyethylene terephthalate, a stepped square plate molded product was produced by the aforesaid method. The cyclic trimer content in the stepped square plate molded product was 0.33% by weight (x % by weight), a difference in the cyclic trimer content between before and after the molding was 0.03% by weight (y % by weight), and the value of −0.20+0.2 was 0.134. The intrinsic viscosity of the stepped square plate molded product was 0.811 dl/g.

Example 463-1C

The same particulate polyethylene terephthalate as used in Example 463-1 was molded into a stepped square plate molded product by the aforesaid method, without performing a constant treatment with a phosphorus-containing aqueous solution. The cyclic trimer content in the stepped square plate molded product was 0.52% by weight (x % by weight), a difference in the cyclic trimer content between before and after the molding was 0.22% by weight (y % by weight), and the value of −0.2+0.2 was 0.096. The intrinsic viscosity of the stepped square plate molded product was 0.833 dl/g.

Example 463-3

To a reactor in which 33500 parts by weight of a reaction solution was resident during the steady operation, a slurry prepared by mixing high-purity terephthalic acid (6329 parts by weight/hr), isophthalic acid (129 parts by weight) and ethylene glycol (2615 parts by weight/hr) was continuously fed, and esterification reaction was conducted under the conditions of a temperature of 260° C. and a pressure of 0.9 kg/cm$^2$-G in a nitrogen atmosphere with stirring. In the esterification reaction, a solid titanium compound prepared in the same manner as in Example 463-1 was fed at a rate of 0.112 part by weight/hr in terms of titanium atom, and magnesium acetate was fed at a rate of 0.187 part by weight/hr in terms of magnesium atom. In the esterification reaction, a mixture of water and ethylene glycol was distilled off.

The esterification reaction product (low condensate) was continuously drawn out of the system so that than average residence time was controlled to 3.5 hours.

The number-average molecular weight of the low condensate of ethylene glycol and terephthalic acid was 600 to 1300 (trimer to pentamer)

Then, liquid phase polycondensation reaction of the low condensate was conducted under the conditions of a temperature of 280° C. and a pressure of 1 Torr, with feeding tributyl phosphate at a rate of 0.831 part by weight/hr.

The residence time (liquid phase polymerization time) required to attain an intrinsic viscosity (IV) of 058 dl/g of polyethylene terephthalate was 100 minutes.

The polyethylene terephthalate obtained by the liquid phase polymerization was crystallized at about 170° C. for 2 hours in a nitrogen atmosphere and then filled in a tower type solid phase polymerization reactor to perform solid phase polymerization at 210° C. for 22 hours in a nitrogen atmosphere.

In the resulting polyethylene terephthalate, the titanium atom content was 15 ppm, the magnesium atom content was 25 ppm, the titanium atom/magnesium atom molar ratio was 0.3, the intrinsic viscosity was 0.82 dl/g, the density was 1.40 g/cm$^3$, and the cyclic trimer content was 0.40% by weight.

In a stainless steel container, 2.5 kg of the polyethylene terephthalate was immersed in 4 kg of a trimethyl phosphate aqueous solution of 00695% by weight, and they were kept at room temperature for 4 hours. Thereafter, the particulate polyethylene terephthalate was separated from the trimethyl phosphate aqueous solution, hydro-extracted and then dried at 160° C. for 5 hours in a scream of nitrogen. The cyclic trimer content in the resulting polyethylene terephthalate was 0.40% by weight (x % by weight). Using the polyethylene terephthalate, a stepped square plate molded product was produced by the aforesaid method. The cyclic trimer content in the stepped square plate molded product was 0.48% by weight, a difference in the cyclic trimer content between before and after the molding was 0.08% by weight (y % by weight), and the value of −0.2+0.2 was 0.104. The intrinsic viscosity of the stepped square plate molded product was 0.805 dl/g.

Example 463-4

In a stainless steel container, the polyethylene terephthalate obtained after the solid phase polymerization in Example 463-3 was immersed in isopropanol at 95° C. and kept for 4 hours under heating.

Then, the polyethylene terephthalate was separated from the isopropanol and dried at 160° C. for 5 hours in a stream of nitrogen. The cyclic trimer content in the resulting polyethylene terephthalate was 0.40% by weight (x % by weight). Using the polyethylene terephthalate, a stepped square plate molded product was produced by the aforesaid method. The cyclic trimer content in the stepped square plate molded product was 0.46% by weight, a difference in the cyclic trimer content between before and after the molding was 0.06% by weight (y % by weight), and the value of −0.2+0.2 was 0.12. The intrinsic viscosity of the stepped square plate molded product was 0.810 dl/g.

Example 463-2C

The same particulate polyethylene terephthalate as used in Example 463-2 was molded into a stepped square plate molded product by the aforesaid method, without performing a contact treatment with a trimethyl phosphate aqueous solution. The cyclic trimer content in the stepped square plate molded product was 0.57% by weight (x % by weight), a difference in the cyclic trimer content between before and after the molding was 0.17% by weight (y % by weight), and the value of −0.2+0.2 was 0.086. The intrinsic viscosity of the stepped square plate molded product was 0.811 dl/g.

Example 469-1

To an esterification reactor, 76.81 mol of high-purity terephthalic acid and 86.03 mol of ethylene glycol were fed at 100° C. at atmospheric pressure, and 0.0045 mol of the titanium-containing solid compound prepared in Example 495-1 was further added as a catalyst. Then, the temperature of the reactor was raised to 260° C., and the reaction was conducted for 340 minutes under a pressure of 1.7 kg/cm$^2$-G in a nitrogen atmosphere. Water produced by the reaction was continually distilled off from the system.

Then, the total amount of the solution in the esterification reactor was transferred into a polycondensation reactor beforehand set at 260° C. To he reactor, a solution of 0.0073 mol of tributyl phosphate in 6.44 mol of ethylene glycol was further added at atmospheric pressure, and the temperature of the reactor was raised to 280° C. from 260° C. over a period of 60 minutes, while the pressure was reduced to 2 Torr from atmospheric pressure.

The reaction in the polycondensation reactor was further conducted for 108 minutes, and the reaction product was drawn out of the polycondensation reactor in the form of strands. The strands were immersed in water, cooled and cut into particles by a strand cutter to obtain polyethylene terephthalate. The polyethylene terephthalate has an intrinsic viscosity of 0.65 dl/g and a titanium content, as measured by atomic absorption analysis, of 28 ppm.

The polyethylene terephthalate obtained by the liquid phase polymerization was then transferred into a solid phase polymerization tower, crystallized at 170° C. for 2 hours in a nitrogen atmosphere, and then subjected to solid phase polymerization at 210° C. for 13 hours to obtain particulate polyethylene terephthalate. The intrinsic viscosity of the polyethylene terephthalate was 0.825 dl/g. Using the polyethylene terephthalate, a stepped square plate molded product was produced by the aforesaid method.

The haze of the part C of the stepped square molded product was 17.8%. Then, the polyethylene terephthalate was molded into a blow molded article in the following manner.

A preform having a diameter of 28 mm was produced by an injection molding machine M-100A (manufactured by Meiki Seisakusho) under the conditions of a cylinder preset temperature of 260° C. and a mold temperature of 10° C. In the molding, the injection molding temperature was 276° C. and the molding cycle was 54 seconds.

The preform was then subjected to stretch blow molding by the use of a blow molding machine (model No. LB01, manufactured by CORPOPLAST Co.) under the conditions of a stretch temperature of 110° C. and a blow mold temperature of 30° C., to obtain a 1.5 liter blow molded article.

The appearance of the blow molded article was evaluated in the following manner.

Further, flowability (L/T) of the polyethylene terephthalate was evaluated in the following manner using an injection molding machine of M-70B model manufactured by Meiki Seisakusho. Moreover, an intrinsic viscosity of the resulting L/T specimen was measured. The results are set forth in Table 469-1.

In Examples 469-1 to 469-6 and Comparative Examples 469-1 to 469-4, each property was evaluated in the following manner.

Intrinsic Viscosity (IV)

The intrinsic viscosity of the molded product was determined as follows. Using a mixed solvent of phenol and 1,1,2,2-tetrachloroethane (50/50 by weight), 10 a sample solution having a concentration of 0.5 g/dl was prepared, and the solution viscosity was measured at 25° C. From the solution viscosity, the intrinsic viscosity was calculated. The intrinsic viscosity of the particulate polyethylene terephthalate was determined as follows. 1.2 Grams of the polyethylene terephthalate was dissolved in 15 cc of o-chlorophenol under heating, then cooled, and the solution viscosity was measured at 25° C. From the solution viscosity, the intrinsic viscosity was calculated.

Haze

In a tray dryer, 2 kg of particulate polyethylene terephthalate as a starting material was dried at 140° C. under a pressure of 10 Torr for 1 hours or more, to allow the particulate polyethylene terephthalate to have a water content of not more than 50 ppm.

Then, the dried particulate polyethylene terephthalate was injection molded by a M-70A injection molding machine manufactured by Meiki Seisakusho K.K. under the conditions of a cylinder temperature of 275° C. and a mold cooling water temperature of 15° C., to produce a stepped square plate molded product.

In detail, the stepped square plate molded product was produced by feeding the dried particulate polyethylene terephthalate to an injection molding machine adjusted to have molding conditions of metering of 12 seconds and injection of 60 seconds through a hopper. The residence time of the molter, resin in the molding machine was about 72 seconds. The weight of the resin used per stepped square plate molded product was 75 g. As a specimen for measuring a haze, any one of the eleventh to fifteenth stepped square molded products from the beginning of the injection molding was adopted.

The stepped square plate molded product has a shape shown in FIG. 1, and the thicknesses of the parts A, B and C are about 6.5 mm, about 5 mm and about 4 mm, respectively. In the present invention, the haze of the part C of the stepped square plate molded product was measured using a haze meter (Suga tester) HGM-2DP.

Appearance of Blow Molded Article

A haze value (irregular reflectance of white light) at the almost central portion of a sidewall of the hollow container was measured. Based on the haze value (%), appearance of the blow molded article was evaluated as follows.

AA: 0≦haze value<5

BB: 5≦haze value

Flowability (L/T) Measuring Method

The flowability was measured by the method described in the specification.

Examples 469-2 to 469-5

Polyethylene terephthalate was produced in the same manner as in Example 469-1, except that the polycondensation catalyst and the polymerization conditions were changed as shown in Table 409-1.

Using the polyethylene terephthalate, a blow molded article was produced in the same manner as in Example 469-1, and appearance thereof was evaluated. Further, flowability (L/T) and an intrinsic viscosity of the L/T specimen were measured in the same manner as in Example 469-1. The results are set forth in Table 469-1.

Comparative Example 469-1

Polyethylene terephthalate (intrinsic viscosity: 0.825 dl/g; type of a catalyst determined by atomic absorption analysis: antimony compound; and the antimony content: 235 ppm) was used.

Using the polyethylene terephthalate, a blow molded article was produced in the same manner as in Example 469-1, and appearance thereof was evaluated. Further, flowability (L/T) and an intrinsic viscosity of the L/T specimen were measured In the same manner as in Example 469-1. The results are set forth in Table 469-1.

Comparative Example 469-2

Polyethylene terephthalate (intrinsic viscosity: 0.843 dl/g; the type of a catalyst determined by atomic absorption analysis: antimony compound; and the antimony content: 232 ppm) was used.

Using the polyethylene terephthalate, a blow molded article was produced in the same manner as in Example 469-1, the appearance thereof was evaluated. Further, flowability (L/T) and an intrinsic viscosity of the L/T specimen were measured in the same manner as in Example 469-1. The result are set forth in Table 469-1.

Comparative Example 469-3

Polyethylene terephthalate (intrinsic viscosity: 0.778 dl/g; the type of a catalyst determined by atomic absorption analysis: germanium compound; and the germanium content: 56 ppm.) was used.

Using the polyethylene terephthalate, a blow molded article was produced in the same manner as in Example 469-1, and appearance thereof was evaluated. Further, flowability (L/T) and an intrinsic viscosity of the L/T specimen were measured in the same manner as in Example 469-1. The results are set forth in Table 469-1.

Comparative Example 469-4

Polyethylene terephthalate (intrinsic viscosity: 0.823 dl/g; type of catalyst determined by atomic absorption analysis; germanium compound; and the germanium content: 42 ppm) was used.

Using the polyethylene terephthalate, a blow molded article was produced in the same manner as in Example 469-1, and appearance thereof was evaluated. Further, flowability (L/T) and an intrinsic viscosity of the L/T specimen were measured in the same manner as in Example 469-1. The results are set forth in Table 469-1.

Example 469-6

Preparation of Titanium-containing Solid Compound

Deionized water of 500 ml was weighed out and introduced into a 1000 ml glass beaker. To the deionized water, 0.15 g of anhydrous magnesium hydroxide was added to give a dispersion. The dispersion in the beaker was cooled in an ice bath, and thereto was dropwise added 5 g of titanium tetrachloride with stirring. The liquid became acidic, and the magnesium hydroxide was dissolved. When production of hydrogen chloride stopped, the beaker containing the reaction solution was taken out of the ice bath, and 25% aqueous ammonia was dropwise added with stirring, to adjust pH of the solution to 8. The precipitate of titanium-containing complex hydroxide produced was separated from the supernatant liquid by centrifugation of 2500 revolutions for 15 minutes. Then, the precipitate of titanium-containing complex hydroxide was washed five times with deionized water. After the washing, solid-liquid separation was carried out by centrifugation of 2500 revolutions for 15 minutes. The washed titanium-containing complex hydroxide was vacuum dried at 70°0 C. under a pressure of 10 Torr for 18 hours to remove water content, whereby a titanium-containing solid compound was obtained.

In the titanium-containing solid compound, the ratio between titanium atom and magnesium atom was 91:9 by mol. Prior to use as a polycondensation catalyst, the titanium-containing solid compound was pulverized into particles of about 10μ.

Polycondensation reaction, granulation and solid polymerization reaction were carried out in the same manner as in Example 469-1, except that the titanium-containing solid compound prepared above was used as the polycondensation catalyst. Using the resulting polyethylene terephthalate, a blow molded article was produced in the same manner as in Example 469-1, and appearance thereto was evaluated. Further, flowability (L/T) and an intrinsic viscosity of the L/T specimen were measured in the same manner as in Example 469-1. The results are set forth in Table 469-1.

As shown in Table 409-1, the polyethylene terephthalate according to the invention has higher flowability than conventional polyethylene terephthalate, and therefore the polyethylene terephthalate of the invention is excellent in moldability. The blow molded article obtained from the polyethylene terephthalate of the invention has excellent appearance similarly to the blow molded article obtained from the conventional polyethylene terephthalate.

TABLE 469-1

| | Polycondensation catalyst (I) | | | Co-catalyst compound (II) | | | | | | | |
|---|---|---|---|---|---|---|---|---|---|---|---|
| | Type | Amount added *3 (% by mol) | Residue *4 (ppm) | Type | Amount added *3 (% by mol) | Residue *4 (ppm) | Intrinsic viscosity (dl/g) | Haze (%) | Flow-ability L/T | Intrinsic viscosity of L/T specimen (dl/g) | Appearance |
| Ex. 469-1 | *1 | 0.013 | 28 | — | — | — | 0.825 | 17.8 | 275 | 0.761 | AA |
| Ex. 469-2 | *1 | 0.013 | 27 | $Mg(OAc)_2$ | 0.020 | 22 | 0.803 | 1.5 | 277 | 0.749 | AA |
| Ex. 469-3 | *1 | 0.013 | 13 | $Mg(OAc)_2$ | 0.020 | 25 | 0.813 | 2.4 | 267 | 0.767 | AA |
| Ex. 469-4 | *1 | 0.013 | 25 | $Mg(OAc)_2$ | 0.010 | 16 | 0.820 | 13.7 | 272 | 0.763 | AA |
| Ex. 469-5 | *1 | 0.013 | 29 | $Zn(OAc)_2$ | 0.020 | 59 | 0.807 | 13.7 | 267 | 0.769 | AA |
| Ex. 469-6 | *2 | Ti: 0.013<br>Mg: 0.001 | Ti: 27<br>Mg: 4 | — | — | — | 0.815 | 7.2 | 276 | 0.769 | AA |
| Comp. Ex. 469-1 | Sb | — | 235 | — | — | — | 0.825 | 3.5 | 263 | 0.760 | AA |
| Comp. Ex. 469-2 | Sb | — | 232 | — | — | — | 0.843 | 2.7 | 259 | 0.772 | AA |
| Comp. Ex. 469-3 | Ge | — | 56 | — | — | — | 0.778 | 6.3 | 271 | 0.745 | AA |
| Comp. Ex. 469-4 | Ge | — | 42 | — | — | — | 0.823 | 2.1 | 256 | 0.774 | AA |

*1: titanium-containing solid compound prepared in Example 495-3
*2: solid titanium compound prepared in Example 496-6
*3: in terms of metal atom based on terephthalic acid unit
*4: content of metal atom based on particulate polyethylene terephthalate
$Mg(OAc)_2$: magnesium acetate
$Zn(OAc)_2$: zinc acetate

What is claimed is:

1. A catalyst for polyester production, comprising a solid titanium compound (I-a) which is obtained by dehydro-drying a hydrolyzate obtained by hydrolyzing a titanium halide and has a molar ratio (OH/Ti) of a hydroxyl group (OH) to titanium (Ti) exceeding 0.09 and less than 4.

2. A catalyst for polyester production, comprising a titanium-containing solid compound (I-b) which is obtained by dehydro-drying a hydrolyzate obtained by hydrolyzing a mixture of a titanium halide and a compound of at least one element selected from elements other than titanium or a precursor of the compound and has a molar ratio (OH/Ti) of a hydroxyl group (OH) to titanium (Ti) exceeding 0.09 and less than 4.

3. The catalyst for polyester production as claimed in claim 2, wherein the compound of at least one element selected from elements other than titanium or the precursor of the compound is a compound of at least one element selected from the group consisting of beryllium, magnesium, calcium, strontium, barium, scandium, yttrium, lanthanium, zirconium, hafnium, vanadium, niobium, tantalum, chromium, molybdenum, tungsten, manganese, iron, ruthenium, cobalt, rhodium, nickel, palladium, cooper, zinc, boron, aluminum, gallium, silicon, germanium, tin, antimony and phosphorus or a precursor of the compound.

4. A catalyst for polyester production comprising:

a polycondensation catalyst component comprising the solid titanium compound (I-a) of claim 1 or the titanium-containing solid compound (I-b) of claim 2, and (II) a co-catalyst component comprising a compound of at least one element selected from the group consisting of beryllium, magnesium, calcium, strontium, barium boron, aluminum, gallium, manganese, cobalt, zinc, germanium, antimony and phosphorus.

5. A catalyst for polyester production, comprising a solid titanium compound (I-f) obtained by a process comprising bringing a titanium halide into contact with water to hydrolyze the titanium halide and thereby obtain an acid solution containing a hydrolyzate of the titanium halide, adjusting pH of the solution to 2 to 6 by the use of a base, and dehydro-drying the resulting precipitate.

6. A catalyst for polyester production, comprising a solid titanium compound (I-i) which is obtained by dehydro-drying titanium hydroxide and has a crystallinity, as calculated from an X-ray diffraction pattern having 2θ (diffraction angle) of 18° to 35°, of not more than 50%.

7. A catalyst for polyester production, comprising:

(I) a polycondensation catalyst component comprising the solid titanium compound (I-i) of claim 6, and (II) a co-catalyst component comprising a compound of at least one element selected from the group consisting of beryllium, magnesium, calcium, strontium, barium, boron, aluminum, gallium, manganese, cobalt, zinc, germanium, antimony and phosphorus.

8. A catalyst for polyester production, comprising a slurry obtained by heating a mixture of:

(A-1) a hydrolyzate (I-j) obtained by hydrolyzing a titanium compound or a hydrolyzate (I-k) obtained by hydrolyzing a mixture of a titanium compound and a compound of at least one element selected from elements other than titanium or a precursor of the compound, (B) a basic compound, and (C) an aliphatic diol.

9. The catalyst for polyester production as claimed in claim 8, wherein the basic compound (B) is at least one compound selected from tetraethylammonium hydroxide, tetraethylammonium hydroxide, aqueous ammonia, sodium hydroxide, potassium hydroxide, N-ethylmorpholine and N-methylmorpholine.

10. The catalyst for polyester production as claimed in claim 8 or 9, wherein the aliphatic diol (C) is ethylene glycol.

11. A catalyst for polyester production, comprising:

(A-2) a hydrolyzate (I-m) obtained by hydrolyzing a titanium halide or a hydrolyzate (I-n) obtained by hydrolyzing a mixture of a titanium halide and a compound of at least one element selected from elements other than titanium or a precursor of the compound, and (D) a metallic phosphate containing at least one element selected from beryllium, magnesium, calcium, strontium, boron, aluminum, gallium, manganese, cobalt and zinc.

12. The catalyst for polyester production as claimed in claim 11, wherein the metallic phosphate (D) is magnesium hydrogenphosphate or trimagnesium diphosphate.

13. A catalyst for polyester production, comprising a slurry obtained by heating a mixture of:

(A-2) a hydrolyzate (I-m) obtained by hydrolyzing a titanium halide or a hydrolyzate (I-n) obtained by hydrolyzing a mixture of a titanium halide and a component of at least one element selected from elements other than titanium or a precursor of the compound, (E) a metallic compound containing at least one element elected from beryllium, magnesium, calcium, strontium, boron, aluminum, gallium, manganese, cobalt and zinc, (F) at least one phosphors compound selected from phosphoric acid and phosphoric esters, and (G) an aliphatic diol.

14. The catalyst for polyester production as claimed in claim 13, wherein the metallic compound (E) is a magnesium compound, the phosphatic compound (F) is phosphoric acid or trimethyl phosphate, and the aliphatic diol (G) is ethylene glycol.

15. The catalyst for polyester production as claimed in claim 13 or 14, wherein the heating temperature of the mixture or the components (A-2), (E), (F) and (G) is in the range of 100 and 200° C., and the heating time is in the range of 3 minutes to 5 hours.

16. A process for producing a polyester comprising polycondensing an aromatic dicarboxylic acid or an ester-forming derivative thereof and an aliphatic diol or an ester-forming derivative thereof in the presence of the catalyst as claimed in any one of claims 1, 2, 5, 6, 8, 11, 13.

17. A process for producing a polyester, comprising an esterification step in which an aromatic dicarboxylic acid or an ester-forming derivative thereof and an aliphatic diol an ester-forming derivative thereof are esterified to form a low condensate and a polycondensation step in which the low condensate is polycondensed in the presence of a polycondensation catalyst to increase the molecular weight, wherein:

the polycondensation catalyst used is a catalyst comprising:

(I) a polycondensation catalyst component comprising a hydrolyzate (I-j) obtained by hydrolyzing a titanium compound or a hydrolyzate (I-k) obtained by hydrolyzing a mixture of a titanium compound and a compound of at least one element selected from elements other than titanium or a precursor of the compound, and (II) a co-catalyst component comprising a compound of at least one element selected from the group consisting of beryllium, magnesium, calcium, strontium, barium, boron, aluminum, gallium, manganese, cobalt, zinc, germanium, antimony and phosphorus; and the polycondensation catalyst component (I) is added to the esterification reactor before the beginning of the esterification reaction or immediately after the beginning of the esterification reaction.

18. The process for producing a polyester as claimed in claim 17, wherein the co-catalyst component (II) is a magnesium compound.

19. A process for producing a polyester, comprising polycondensation an aromatic dicarboxylic acid or an ester-forming derivative thereof and an aliphatic diol or an ester-forming derivative thereof in the presence of a polycondensation catalyst selected from the following catalysts (1) to (3) and a phosphoric ester to produce a polyester;

(1) a polycondensation catalyst comprising a hydrolyzate (I-m) obtained by hydrolyzing a titanium halide, (2) a polycondensation catalyst comprising a hydrolyzate (I-n) obtained by hydrolyzing a mixture of a titanium halide and a compound of at least one element selected from elements other than titanium or a precursor of the compound, and (3) a polycondensation catalyst comprising:

the hydrolyzate (I-m) or (I-n), and a compound of at least one element selected from the group consisting of beryllium, magnesium, calcium, strontium, barium, boron, aluminum, gallium, manganese, cobalt, zinc, germanium and antimony, a phosphate or a phosphite.

20. The process for producing a polyester as claimed in claim 19, wherein the phosphoric ester is tributyl phosphate, trioctyl phosphate or triphenyl phosphate.

21. A process for producing a polyester, comprising polycondensing an aromatic dicarboxylic acid or an ester-forming derivative thereof and an aliphatic diol or an ester-forming derivative thereof in the presence of a polycondensation catalyst selected from the following catalyst (1) to (3) and at least one compound selected from cyclic lactone compounds and hindered phenol compounds to produce a polyester;

(1) a polycondensation catalyst comprising a hydrolyzate (I-m) obtained by hydrolyzing a titanium halide, (2) a polycondensation catalyst comprising a hydrolyzate (I-n) obtained by hydrolyzing a mixture of a titanium halide and a compound of at least one element selected from elements other than titanium or a precursor of the compound, and (3) a polycondensation catalyst comprising:

the hydrolyzate (I-m) or (I-n), and a compound of at least one element selected from the group consisting of beryllium, magnesium, calcium, strontium,, barium, boron, aluminum, gallium, manganese, cobalt, zinc, germanium and antimony, a phosphate or a phosphite.

22. The process for producing a polyester as claimed in claim 21, wherein at least one phosphorus compound selected from phosphoric acid and phosphoric esters is further used in combination.

23. The process for producing a polyester as claimed in claim 21 or 22, wherein the at least one compound selected from cyclic lactone compounds and hindered phenol compounds is a mixture of 5,7-t-butyl-3-(3,4-dimethylphenyl)-3H-benzofuran-2-one, tetrakis(methylene-3(3,5-di-t-butyl-4-hyroxyphenyl)propionate)methane and tris(2,4-di-t-butylphenyl)phosphite.

24. A process for producing a polyester, comprising an esterification step in which an aromatic dicarboxylic acid or an ester-forming derivative thereof and an aliphatic diol or an ester-forming derivative thereof are esterified to form a low condensate and a polycondensation step in which the low condensate is polycondensed in the presence of a polycondensation catalyst to increase the molecular weight, wherein:

the polycondensation catalyst used is a catalyst comprising:

(I) a polycondensation catalyst component comprising a hydrolyzate (I-m) obtained by hydrolyzing a titanium halide or a hydrolyzate (I-n) obtained by hydrolyzing a mixture of a titanium halide and a compound of at least one element selected from elements other than titanium or a precursor of the compound, and (II) a co-catalyst component comprising a compound of at least one element selected from the group consisting of beryllium, magnesium, calcium, strontium, barium, boron, aluminum, gallium, manganese, cobalt, zinc, germanium, antimony and phosphorus; and a tint adjusting agent is added in the esterification step or the polycondensation step.

25. The process for producing a polyester as claimed in claim 24, wherein the tint adjusting agent is at least one agent selected from Solvent Blue 104, Pigment Red 263, Solvent Red 135, Pigment Blue 29, Pigment Blue 15:1, Pigment Blue 15:3, Pigment Red 187 and Pigment Violet 19.

26. The process for producing a polyester as claimed in claim 24 or 25, wherein the co-catalyst component (II) is a magnesium compound.

27. A method for treating a polyester, comprising bringing a polyester, which is obtained by the use of titanium compound catalyst and in which the reaction has been completed, into contact with a phosphorus acid aqueous solution, a phosphoric ester aqueous solution, a phosphorous ester aqueous solution or a hypophosphorous ester aqueous solution, each of said solution having a concentration of not less than 10 ppm in terms of phosphorus atom.

28. The method for treating a polyester as claimed in claim 27, wherein the polyester has an intrinsic viscosity of not less than 0.50 dl/g, a density of not less than 1.37 g/cm$^3$ and an acetaldehyde content of not more than 5 ppm.

29. The method for treating a polyester as claimed in claim 27 or 28, wherein polyethylene terephthalate, which is obtained by the use of a titanium compound catalyst and in which the reaction has been completed, is treated.

30. A method for treating a polyester, comprising bringing a polyester, which is obtained by the use of a titanium compound catalyst and in which the reaction has been completed, into contact with an organic solvent.

31. The method for treating a polyester as claimed in claim 30, wherein the polyester has an intrinsic viscosity of not less than 0.50 dl/g, a density of not less than 1.37 g/cm$^3$ and an acetaldehyde content of not more than 5 ppm.

32. The method for treating a polyester as claimed in claim 30 or 31, wherein the organic solvent is a solvent selected from alcohols, saturated hydrocarbons and ketones.

33. The method for treating a polyester as claimed in any one of claims 30 to 31, wherein the organic solvent is isopropanol or acetone.

34. The method of treating a polyester as claimed in any one of claims 30 to 31, wherein polyethylene terephthalate, which is obtained by the use of a titanium compound catalyst and in which the reaction has been completed, is treated.

35. A method for treating a polyester, comprising bringing polyester, which is obtained by the use of a titanium compound catalyst and in which the reaction has been completed, into contact with an organic solvent solution of phosphoric acid, an organic solvent solution of phosphoric ester, an organic solvent solution of phosphorous acid, an organic solvent solution of hypophosphorous acid, an organic solvent solution of a phosphorous ester or an organic solvent solution of a hypophosphorous ester, each of said solutions having a concentration of not less than 10 ppm in terms of phosphorus atom.

36. The method for treating a polyester as claimed in claim 35, wherein the polyester has an intrinsic viscosity of not less than 0.50 dl/g, a density of not less than 1.37 g/cm$^3$ and an acetaldehyde content of not more than 5 ppm.

37. The method for treating a polyester as claimed in claim 35 or 36, wherein the phosphoric ester is tributyl phosphate, triphenyl phosphate or trimethyl phosphate.

38. The method for treating a polyester as claimed in claim 35, wherein the organic solvent is selected from alcohols, saturated hydrocarbons and ketones.

39. The method for treating a polyester as claimed in claim 35, wherein the organic solvent is isopropanol or acetone.

40. The method for treating a polyester as claimed in claim 35, wherein polyethylene terephthalate, which is obtained by the use of a titanium compound catalyst and in which the reaction has been completed, is treated.

41. A polyester (P-1) obtained by polycondensing an aromatic dicarboxylic acid or an ester-forming derivative thereof and an aliphatic diol or an ester-forming derivative thereof in the presence of a catalyst for polyester production comprising:

a polycondensation catalyst component comprising a solid titanium compound (I-c) obtained by dehydrodrying a hydrolyzate obtained by hydrolyzing a titanium halide, and (II) a co-catalyst comprising a compound of at least one element selected from the group consisting of beryllium, magnesium, calcium, strontium, barium, boron, aluminum, gallium, manganese, cobalt, zinc, germanium, antimony and phosphorus, wherein the titanium content is in the range 1 to 100 ppm, the magnesium content is in the range of 1 to 200 ppm, and the weight ratio (Mg/Ti) of magnesium to titanium is not less than 0.01.

42. The polyester (P-1) as claimed in claim 41, which is polyethylene terephthalate.

43. A polyester (P-2) having the following properties:

a titanium atom is contained in an amount of 0.1 to 200 ppm, a metal atom M selected from beryllium, magnesium, calcium, strontium, barium, boron, aluminum, gallium, manganese, cobalt, zinc and antimony is contained in an amount of 0.1 to 500 ppm, the molar ratio (titanium atom/metal atom M) of the titanium atom to the metal atom M is in the range of 1/50 to 50/1, and a tint adjusting agent is contained in an amount of 0.01 to 100 ppm.

44. A polyester (P-3) having the following properties:

the intrinsic viscosity is not less than 0.50 dl/g, a titanium atom is contained in an amount of 0.1 to 200 ppm, a metal atom M selected from beryllium, magnesium, calcium, strontium, barium, boron, aluminum, gallium, manganese, cobalt, zinc and antimony is contained in an amount of 0.1 to 500 ppm, the molar ratio (titanium atom/metal atom M) of the titanium atom to the metal atom M is in the range of 0.05 to 50, and the content of acetaldehyde is not more than 4 ppm, and when this acetaldehyde content is taken as $W_0$ ppm and a content of acetaldehyde in a stepped square plate molded product obtained by heating said polyester to a temperature of 275° C. to melt it and molding the molten polyester is taken as $W_1$ ppm, the value of $W_1-W_0$ is not more than 10 ppm.

45. The polyester (P-3) as claimed in claim 44, wherein the titanium atom is derived from a polycondensation catalyst obtained by hydrolysis of a titanium halide.

46. The polyester (P-3) as claimed in claim 44 or 45, which is polyethylene terephthalate.

47. A polyester (P-4) having the following properties:

the intrinsic viscosity is not less than 0.50 dl/g, a titanium atom is contained in an amount of 0.1 to 200 ppm, a metal atom M selected from beryllium, magnesium, calcium, strontium, barium, boron, aluminum, gallium, manganese, cobalt, zinc and antimony is contained in an amount of 0.1 to 500 ppm, the molar ratio (titanium atom/metal atom M) of the titanium atom to the metal atom M is in the range of 0.05 to 50, and the content of a cyclic trimer is not more than 0.5% by weight, and when this cyclic trimer content is taken as x % by weight and [a content of a] *an increase in* cyclic trimer in a stepped square plate molded product obtained by heating said polyester to a temperature of 290° C. to melt it and molding the molten polyester is taken as y % by weight, x and y satisfy the following relation $$[y \leqq -0.2x-0.2]\, y \leqq -0.2x+0.2.$$

48. The polyester (P-4) as claimed in claim 47, wherein the titanium atom is derived from a polycondensation catalyst obtained by hydrolysis of at titanium halide.

49. The polyester (P-4) as claimed in claim 47 or 48, which is polyethylene terephthalate.

50. A molded product obtained from the polyester (P-1) as claimed in any one of the claims 41 or 42.

51. The molded product as claimed in claim 50, which is a blow molded article.

52. The molded product as claimed in claim 50, which is a film or a sheet.

53. The molded product as claimed in claim 50, which is a fiber.

54. A blow molded article obtained from the polyester (P-4) as claimed in any of claims 47 or 48 and having a cyclic trimer content of not more than 0.6% by weight.

55. A perform for a blow molded article which is obtained from a polyester (P-5) having the following properties:

when the ratio (L/T) of a flow length (L) to a flow thickness (T) in the injection molding of said polyester at 290° C. is taken as Y and the intrinsic viscosity of a molded product obtained by the injection molding is taken as X(dl/g), X and Y satisfy the following relation $$Y \geqq 647-500X.$$

56. A blow molded article obtained from the perform of claim 55.

* * * * *